United States Patent
Burwell et al.

(10) Patent No.: US 10,070,727 B2
(45) Date of Patent: Sep. 11, 2018

(54) CHAIR AND SUPPORTS

(71) Applicant: FORMWAY FURNITURE LIMITED, Wellington (NZ)

(72) Inventors: Damon Gregory Burwell, Wellington (NZ); Paul Michael Wilkinson, Wellington (NZ); Aaron Michael Young, Lower-Hutt (NZ); Christopher Warren Bisman, Porirua (NZ); Stuart Gregory Munro, Lower Hutt (NZ); James Clifford Prier, Wellington (NZ)

(73) Assignee: Formway Furniture Limited, Lower Hutt, Wellington (NZ)

( * ) Notice: Subject to any disclaimer, the term of this patent is extended or adjusted under 35 U.S.C. 154(b) by 460 days.

(21) Appl. No.: 14/430,496

(22) PCT Filed: Oct. 10, 2013

(86) PCT No.: PCT/IB2013/059247
§ 371 (c)(1),
(2) Date: Mar. 23, 2015

(87) PCT Pub. No.: WO2014/060910
PCT Pub. Date: Apr. 24, 2014

(65) Prior Publication Data
US 2015/0250319 A1    Sep. 10, 2015

Related U.S. Application Data

(60) Provisional application No. 61/715,044, filed on Oct. 17, 2012.

(51) Int. Cl.
| | |
|---|---|
| *E04B 9/12* | (2006.01) |
| *A47C 7/00* | (2006.01) |
| *A47C 7/44* | (2006.01) |
| *A47C 1/03* | (2006.01) |
| *A47C 1/032* | (2006.01) |
| *A47C 7/46* | (2006.01) |

(Continued)

(52) U.S. Cl.
CPC .................. *A47C 7/44* (2013.01); *A47C 1/03* (2013.01); *A47C 1/03255* (2013.01);
(Continued)

(58) Field of Classification Search
CPC ....... E04B 9/122; E04C 2/242; A63F 3/00634
See application file for complete search history.

(56) References Cited

U.S. PATENT DOCUMENTS 3,242,628 A * 3/1966 Jahn ........................ E04B 9/122
52/506.07
3,554,853 A * 1/1971 Mercer et al. ...... B29C 47/0033
156/244.15

(Continued)

FOREIGN PATENT DOCUMENTS

| CN | 101319496 A1 | 12/2008 |
|---|---|---|
| EP | 0 532 476 A1 | 3/1993 |

(Continued)

OTHER PUBLICATIONS

International Search Report dated Mar. 3, 3014, issued in PCT/IB2013/059247, filed Oct. 10, 2013.

(Continued)

*Primary Examiner* — Francisco W Tschen
(74) *Attorney, Agent, or Firm* — Workman Nydegger

(57) ABSTRACT

An adjustable support assembly for use in a chair has a mounting member 602, a support 605 for supporting part of the body of a chair occupant, and a carrier 611 slidably carrying the support 605. The support has a plurality of engagement features 621 and the carrier has an engagement member 615 that is selectively engageable with the engagement features to enable the support to be selectively positioned relative to the carrier at a plurality of positions. A biasing arrangement 607 operatively connects the carrier 611 to the mounting member 603 and forwardly biases the (Continued)

carrier 611 and support 605. The engagement between the engagement member 615 and an engaged engagement feature 621 increases upon application of rearward force to the support.

22 Claims, 74 Drawing Sheets

(51) Int. Cl.
  *A47C 3/00*  (2006.01)
  *A47C 5/12*  (2006.01)
  *B32B 3/14*  (2006.01)
  *B32B 3/30*  (2006.01)
  *B29L 31/44*  (2006.01)
  *B29K 105/04*  (2006.01)

(52) U.S. Cl.
  CPC ...... *A47C 1/03266* (2013.01); *A47C 1/03277* (2013.01); *A47C 3/00* (2013.01); *A47C 5/12* (2013.01); *A47C 7/46* (2013.01); *A47C 7/462* (2013.01); *B32B 3/14* (2013.01); *B32B 3/30* (2013.01); *B29K 2105/04* (2013.01); *B29L 2031/443* (2013.01); *B32B 2250/02* (2013.01); *B32B 2479/00* (2013.01); *Y10T 428/24058* (2015.01)

(56) References Cited

U.S. PATENT DOCUMENTS

| | | | |
|---|---|---|---|
| 3,777,432 A * | 12/1973 | Wyles | E04B 9/345 403/341 |
| 3,840,269 A | 10/1974 | Ambrose | |
| 4,060,950 A * | 12/1977 | Rackard | E06B 3/685 52/456 |
| 4,201,814 A | 5/1980 | Gilbert et al. | |
| 6,761,406 B2 | 7/2004 | Kinoshita et al. | |
| 2009/0140568 A1 | 6/2009 | Chan et al. | |
| 2009/0302662 A1 | 12/2009 | Groelsma et al. | |
| 2010/0133893 A1 | 6/2010 | Raftery et al. | |

FOREIGN PATENT DOCUMENTS

| | | |
|---|---|---|
| EP | 2 364 616 A1 | 9/2011 |
| JP | 6-87174 | 3/1994 |
| JP | 2007-112147 | 5/2007 |
| WO | 1999/013004 | 3/1999 |
| WO | 99/22160 | 5/1999 |
| WO | 2007/133458 A2 | 11/2007 |
| WO | 2007/144703 A1 | 12/2007 |
| WO | 2008/041868 A2 | 4/2008 |
| WO | 2008/094865 A1 | 8/2008 |
| WO | 2009/126051 A1 | 10/2009 |
| WO | 2010/068122 A1 | 6/2010 |

OTHER PUBLICATIONS

International Preliminary Report on Patentability dated Jul. 24, 2014 and Notification of Decision Concerning Request for Rectification dated Aug. 21, 2014, issued in PCT/IB2013/059247, filed Oct. 10, 2013.

Extended European Search Report dated Sep. 6, 2016, in European Patent Application No. 13846395.5, filed Oct. 10, 2013.

European Partial Search Report dated Apr. 26, 2016, in European Patent Application No. 13846395.5, filed Oct. 10, 2013.

* cited by examiner

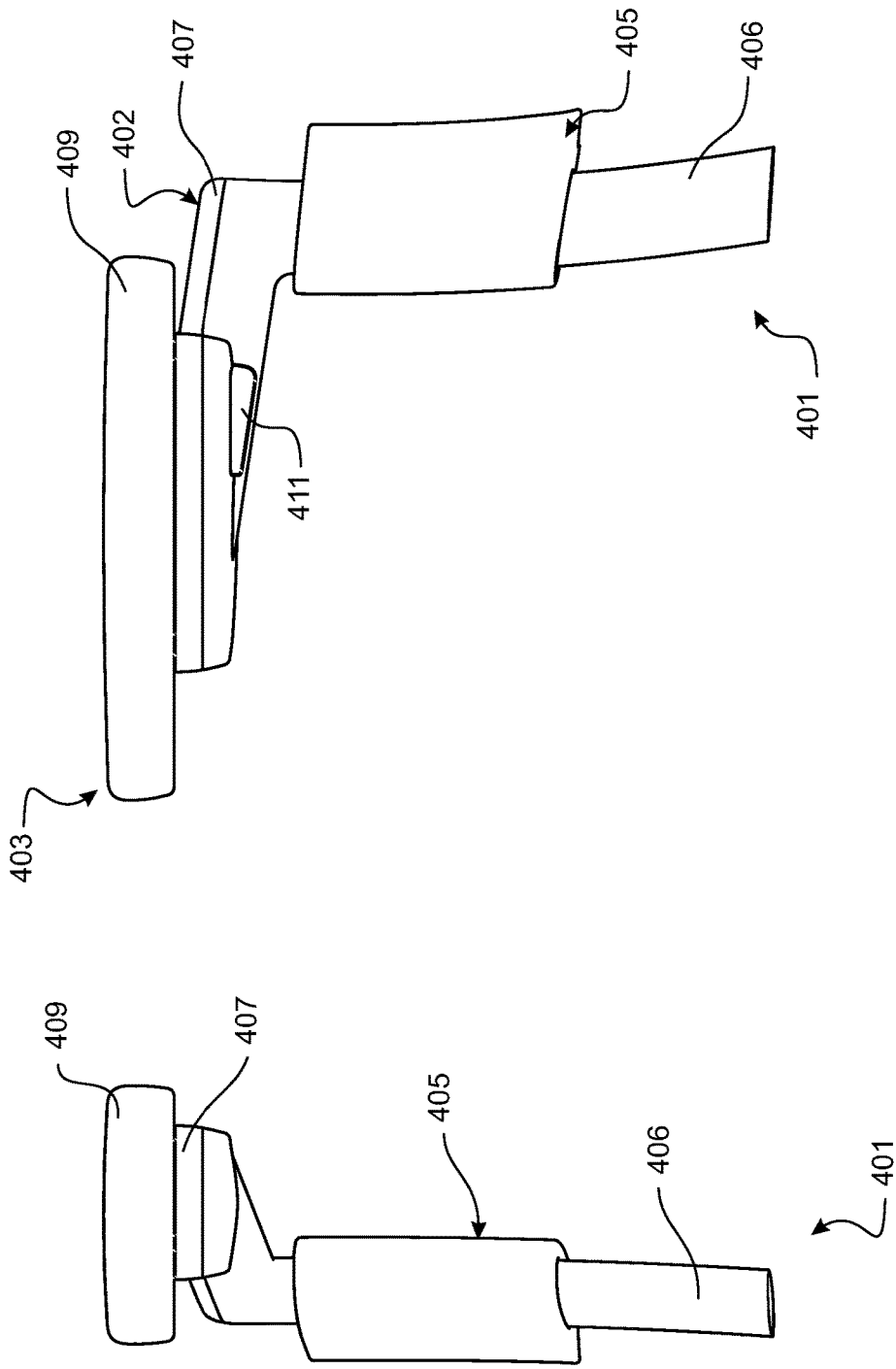

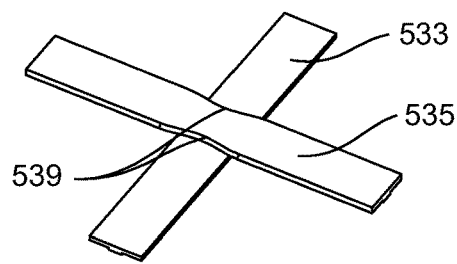
(a)
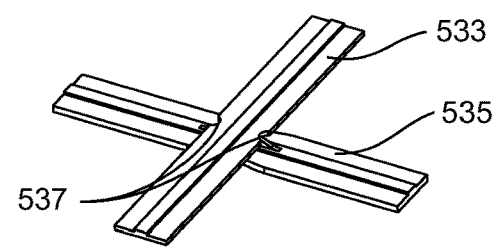
(b)
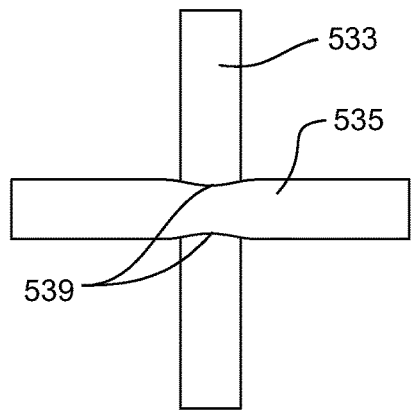
(c)
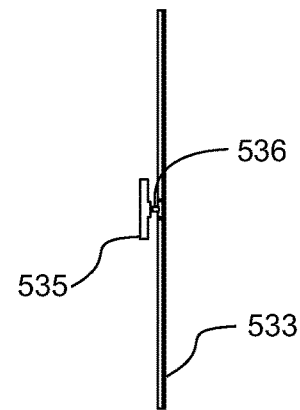
(d)
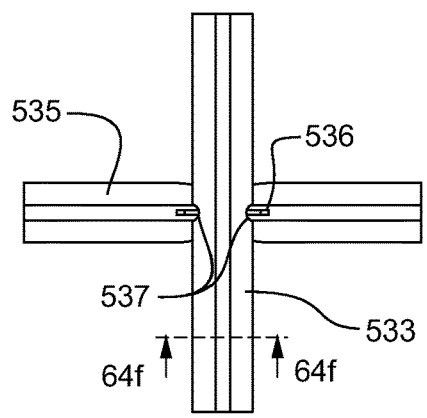
(e)
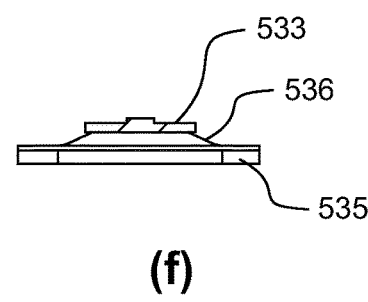
(f)
FIGURE 64

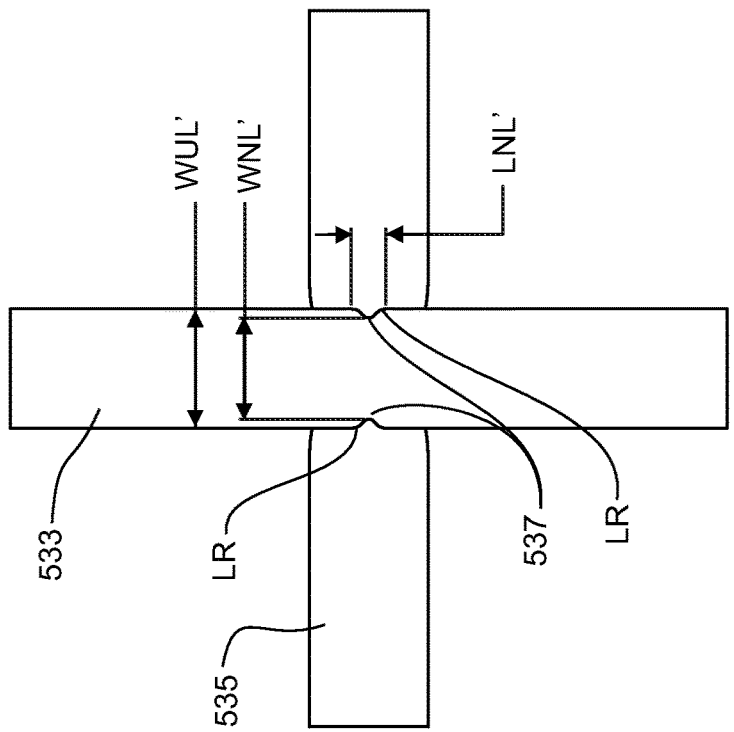
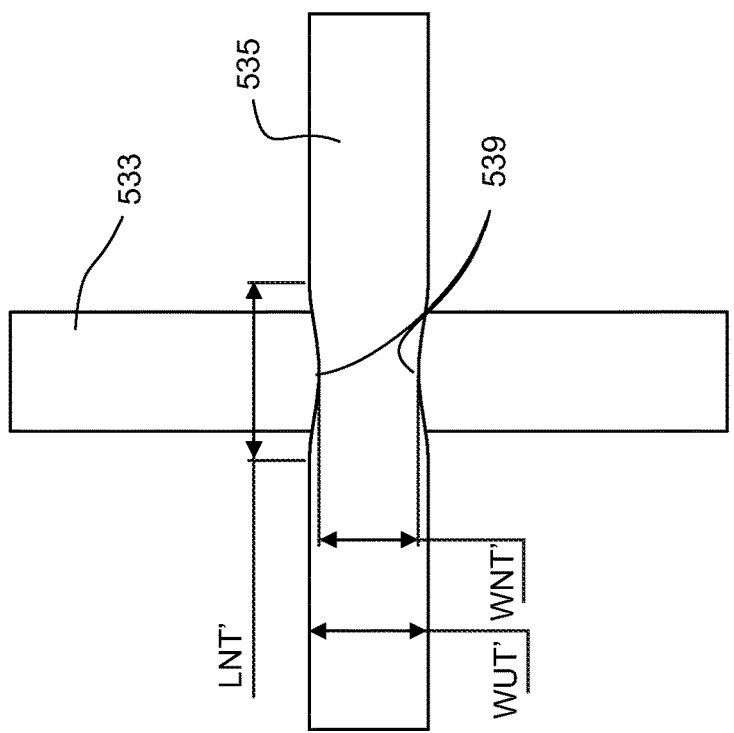
FIGURE 67(b)
FIGURE 67(a)

CHAIR AND SUPPORTS

FIELD OF THE INVENTION

The invention relates generally to chairs and associated supports. More particularly, although not exclusively, the invention relates to office chairs.

BACKGROUND TO THE INVENTION

Traditionally chairs have been designed to support an occupant in a single 'correct' seating position. More recently, chairs have been provided with recline mechanisms between the support frame, seat and/or back of the chair, which enable the seat and back to move relative to the support frame so that an occupant can move from an upright to a reclined position. Such chairs sometimes also include additional flexibility or adjustments, to enable an occupant to sit in a less standard side-sitting or angled position while still being fully supported by the chair.

Unlike most traditional chairs which have plush-looking cushioning, the more recent adjustable chairs are targeted at the 'progressive' end of the market. The appearance of those modern chairs, can, in some instances, challenge a user's understanding, as the chairs will often look highly mechanistic and won't have the perceived volume and comfort of a cushioned textile-covered chair. Additionally, some people can associate a modern mechanistic chair design with high cost, meaning they may be less likely to want to purchase the chair, particularly in times of financial hardship.

There is a need for a chair that has a more conventional and traditional appearance, while still providing the ergonomic benefits and functionality of the more modern 'progressive' chairs. There is also a need for such a chair at a low cost point.

Chairs are also often provided with adjustable supports, such as lumbar, head or neck support assemblies. Often, the supports are height adjustable. Typically, there are two types of adjustment mechanisms for such supports. The first type requires the release of an actuator by a user, to release a position lock and enable the user to adjust the position of the support. Such arrangements are typically mechanically complex and may be expensive. An alternative type of support may be adjusted through the use of force, with the force that is manually applied by a user to adjust the position of the support overriding friction provided within the adjustment mechanism. Often, the purpose of such a support is to apply a forwardly-directed support force to an occupant when the occupant applies a rearward force against the support with a body part. With a friction-type mechanism, if the occupant force is not applied directly rearwardly and instead comprises an up or down component, the user can inadvertently cause the height of the support to adjust when leaning back against the support.

It is an object of at least preferred embodiments of the present invention to provide a chair or component that addresses at least one of the disadvantages outlined above, or that at least provides the public with a useful choice.

SUMMARY OF THE INVENTION

In accordance with a first aspect of the present invention, there is provided an adjustable support assembly for use in a chair, the support assembly comprising:
 a mounting member;
 a support for supporting part of the body of a chair occupant;
 a carrier slidably carrying the support, the support comprising a plurality of engagement features and the carrier comprising an engagement member that is selectively engageable with the engagement features to enable the support to be selectively positioned relative to the carrier at a plurality of positions; and
 a biasing arrangement operatively connecting the carrier to the mounting member and configured to forwardly bias the carrier and support;
 wherein the engagement between the engagement member and an engaged engagement features increases upon application of rearward force to the support.

In an embodiment, the biasing arrangement comprises a biasing member that acts on the engagement member to bias the engagement member toward the support. In an embodiment, the biasing member resists rearward movement of the engagement member toward the mounting member more than it resists rearward movement of the carrier toward the mounting member, upon application of the rearward force to the support.

In an embodiment, the biasing arrangement comprises: an intermediate member operatively connected to the mounting member and to the carrier; a first biasing member arranged between the mounting member and the intermediate member; and a second biasing member arranged between the carrier and the intermediate member.

In an embodiment, the first and second biasing members are oppositely oriented torsion springs.

In an embodiment, the intermediate member is pivotable relative to the mounting member about a first axis and the carrier is pivotable relative to the intermediate member about a second substantially parallel axis. In an embodiment, the adjustable support further comprises at least one link arm with a first end that is pivotable relative to either the mounting member or the intermediate member and a second end that is slidable relative to the other of the mounting member or the intermediate member. In an embodiment, the adjustable support comprises two link arms, each arm having a first end slidable in a slot on the mounting member and a second end pivotable about the intermediate member second axis.

In an embodiment, the engagement member engages the engagement features in a forward-rearward direction.

In an embodiment, the support is tiltable relative to the mounting member.

In an embodiment, the support is height adjustable.

In an embodiment, the engagement member is resilient.

In an embodiment, the carrier comprises a guide for slidably engaging a complementary guide feature on a rear side of the support. In an embodiment, the guide feature on the support comprises a guide projection or flange, and the carrier comprises at least one guide channel for slidably receiving the guide projection or flange.

In an embodiment, the guide feature on the support is provided by a guide member fixed to the support.

In an embodiment, the engagement features comprise rearward facing, arcuate notches; and the engagement member comprises an arcuate forwardly directed projection.

In an embodiment, the support is a lumbar support. Alternatively, the support could be a different type of support such as a head or neck support for example.

In an embodiment, the support is forwardly concave in plan view, and comprises a central, substantially vertical recess to accommodate the spine of a user.

In an embodiment, the mounting member is configured for mounting to a back frame of a chair.

In accordance with a second aspect of the present invention, there is provided a chair comprising a back frame having two side members, and an adjustable support as outlined in relation to the first aspect above, wherein the mounting member is attached to the two side members.

In an embodiment, the mounting member is fixed relative to the two side members. Alternatively, the mounting member could be moveable relative to the side members.

In an embodiment, the back frame supports a compliant back portion, and the support is positioned rear of the compliant back portion.

In an embodiment, the support is rearwardly spaced from the back portion in the absence of a rearward load on the back portion, and at least a part of the back portion is moved rearward to contact the support upon application of a sufficient rearward force to the compliant back portion.

In accordance with a third aspect of the present invention, there is provided a moulded article suitable for strain orientation, the article comprising:
  a plurality of first elongate straps formed in a first layer;
  a plurality of second elongate straps formed in a second layer, so that at least some of the first elongate straps overlap with at least some of the second elongate straps; and
  a plurality of joiner members that are integrally moulded with the first elongate straps and with the second elongate straps, and that connect between the first elongate straps and the second elongate straps in the regions in which the first elongate straps and the second elongate straps overlap.

In an embodiment, at least a portion of the first elongate straps, at least a portion of the second elongate straps, and at least a portion of the joiner members are suitable for strain orientation. In an embodiment, substantially the entire first elongate straps, substantially the entire second elongate straps, and substantially the entire joiner members are suitable for strain orientation.

In an embodiment, the first elongate straps comprise necked regions adjacent the joiner members, to compensate for a reduction in strain orientation due to the additional material of the joiner members. In an embodiment, the necked regions are formed by notches or recesses extending into sides of the first elongate straps. In an embodiment, the notches or recesses are configured such that post-strain orientation, the sides of the first elongate straps are substantially parallel along substantially their entire lengths.

In an embodiment, the second elongate straps comprise necked regions adjacent the joiner members, to compensate for a reduction in strain orientation due to the additional material of the joiner members. In an embodiment, the necked regions are formed by notches or recesses extending into sides of the second elongate straps. In an embodiment, the notches or recesses are configured such that post-strain orientation, the sides of the second elongate straps are substantially parallel along substantially their entire lengths.

In an embodiment, the moulded article is formed from a polymeric resin. As used herein, a 'polymeric resin' is a plastic raw material suitable for injection moulding. The resin may be a single plastic material, or may comprise a plurality of plastic materials. In an embodiment, the moulded article is moulded from a resin comprising a thermoplastic polyester elastomer.

In an embodiment, the thermoplastic polyester elastomer comprises a block copolymer. In an embodiment, the block copolymer comprises a hard segment and a soft segment. In an embodiment, the thermoplastic polyester elastomer is a block copolymer of polybutylene terephthalate and polyether glycol.

In an embodiment, the resin is selected such that the moulded article, prior to strain orientation, has a hardness in the range of about 30D to about 55D when tested in accordance with ASTM 2240. In an embodiment, the resin is selected such that prior to strain orientation, the moulded article has a hardness in the range of about 30D to about 46D, preferably in the range of about 35D to about 45D, preferably in the range of about 36D to about 44D, more preferably in the range of about 37D to about 43D, more preferably in the range of about 38D to about 42D, more preferably in the range of about 39D to about 41D, most preferably about 40D.

The thermoplastic polyester resin is preferably one of HYTREL 4069, HYTREL 4556, HYTREL 5526, HYTREL 5556, HYTREL 3078. The resin may additionally include stabilisers and/or additives to achieve desired properties, for example to improve its resistance to UV light, fire, heat aging, moisture, and/or to make the resin a suitable colour.

It will be appreciated that the article could be moulded from other resins having suitable properties.

The first elongate straps may comprise a plurality of elongate straps extending in a first generally longitudinal direction. The second elongate straps may comprise a plurality of elongate straps extending in a second direction that is generally transverse to the first generally longitudinal direction, for example. Alternatively, the straps may be oriented in any suitable way relative to one another. It is preferred that the first elongate straps in the first layer extend longitudinally, and the second elongate straps in the second layer extend transversely.

The generally longitudinally extending elongate straps may differ from the generally transversely extending elongate straps. For example, the generally longitudinally extending elongate straps may have a smaller cross-section than the generally transversely extending elongate straps. However, it is preferred that the cross-sections of the generally longitudinally extending elongate straps are substantially the same as the generally transversely extending elongate straps, at least in the unnecked regions of the straps.

Preferably, at least some of the elongate straps of the moulded article have a cross-sectional dimension of about 12 mm or less, more preferably of about 2.5 mm or less. Preferably, at least a majority of the elongate straps of the moulded article have a cross-sectional dimension of about 12 mm or less, more preferably of about 5 mm or less, more preferably of about 2.5 mm or less. Preferably, at least some of the elongate straps of the moulded article have a depth of about 1.5 mm or about 2 mm.

In an embodiment, the pre-strain orientation depth of each strap is about 1.5 mm or about 2 mm, the generally transversely extending straps have a cross-sectional width (in the longitudinal direction) in the unnecked regions of about 12 mm and in the necked regions of about 10 mm, and the generally longitudinally extending straps have a cross-sectional width (in the transverse direction) in the unnecked regions of about 12 mm and in the necked regions of about 9.4 mm. Preferably, the dimensions are configured such that post-strain orientation, the depth of each strap is about 1.0 mm, the generally transversely extending straps have a cross-sectional width (in the longitudinal direction) in the necked and unnecked regions of about 8 mm, and the generally longitudinally extending straps have a cross-sectional width (in the transverse direction) in the necked and unnecked regions of about 8 mm.

It will be appreciated that the entire moulded article may be formed of the first elongate straps and the second elongate straps. Preferably, at least a major part of the moulded article is formed of the first elongate straps and the second elongate straps.

Alternatively, only part of the moulded article may be formed of the first and second elongate straps, and the moulded article may additionally be provided with attachment features that are integrally moulded into the article.

At least part of the moulded article may have a curved profile that is formed as part of the moulding process. By way of example only, at least part of the moulded article may have a curved side profile and/or a curved top profile that is formed as part of the moulding process. As an alternative, the moulded article may be substantially flat but may for example be held in a contoured non-flat shape when supported by a frame in use.

Preferably, at least part of the article is capable of being stretched to at least about 400%, preferably at least about 450%, preferably at least about 500%, preferably at least about 600%, preferably at least about 700%, preferably at least about 800%, preferably at least about 900%, of an initial dimension without failure, such that strain orientation occurs. Preferably the straps are stretched to about 450% of their initial lengths to cause strain orientation, and have a post-relaxation length of about 210% of their initial lengths.

The article may be a support surface for a chair. For example, the article may be a back support or seat support for a chair that is subsequently mounted to a frame to support the membrane to form a compliant suspended support surface. However, the method may be used to form any other suitable type of article.

In accordance with a fourth aspect of the present invention, there is provided a method of assembling a support, comprising:
  providing a frame;
  providing a moulded article as outlined in relation to the third aspect above, wherein at least part of the moulded article has an as-moulded dimension less than a corresponding dimension of the frame;
  stretching said at least part of the article so as to have a stretched dimension greater than the corresponding dimension of the frame and such that strain orientation of at least a portion of the first elongate straps and at least a portion of the second elongate straps occurs;
  relaxing said at least part of the article so as to have a post-relaxation dimension between the as-moulded dimension and the stretched dimension;
  and supporting the article from the frame.

In an embodiment, the frame comprises an opening that is at least partly bounded by frame members, and the method comprises supporting the article from the frame with part of the article extending across the opening, to form a compliant suspended support surface. For example, the frame may comprise side members and upper and lower members (or front and rear members in the case of a seat frame), and the frame members may bound one or more openings that are covered by the article when supported by the frame.

In an embodiment, the first elongate straps comprise generally longitudinally extending straps, and the second elongate straps comprise generally transversely extending straps. In an embodiment, the method comprises stretching and relaxing the generally longitudinally extending straps before stretching and relaxing the generally transversely extending straps. In an alternative embodiment, the method comprises stretching and relaxing the generally transversely extending straps before stretching and relaxing the generally longitudinally extending straps. In yet another embodiment, the method comprises stretching and relaxing the generally transversely extending straps concurrently with stretching and relaxing the generally longitudinally extending straps.

In an embodiment, the step of stretching at least part of the article results in stretching of the joiner members such that strain orientation of the joiner members occurs. In an embodiment, the joiner members are strain oriented in both a longitudinal direction and a transverse direction.

In an embodiment, the joiner members are elongate members having as moulded dimensions of 18.5 mm length, 1.0 mm width, and 2.0 mm depth (to form a gap between the connected straps of 2.0 mm). In an embodiment, the joiner members have a post-strain orientation relaxed dimensions of about 28.5 mm long, 0.8 mm wide, and 1.8 mm deep. The joiner members could alternatively have different dimensions or could be any other suitable shape.

In an embodiment, the first elongate straps comprise necked regions adjacent the joiner members to compensate for a reduction in strain orientation due to the additional material of the joiner members. In an embodiment, the necked regions are formed by notches or recesses extending into sides of the first elongate straps, and wherein the sides of the first elongate straps in the relaxed article are substantially parallel along substantially their entire lengths.

In an embodiment, the second elongate straps comprise necked regions adjacent the joiner members to compensate for a reduction in strain orientation due to the additional material of the joiner members. In an embodiment, the necked regions are formed by notches or recesses extending into sides of the second elongate straps, and wherein the sides of the second elongate straps in the relaxed article are substantially parallel along substantially their entire lengths.

The article may be stretched and relaxed in both the transverse and longitudinal dimensions, or in any other suitable direction. The step of stretching may comprise stretching the article in 360°. That is particularly useful if the article comprises an irregular pattern of members and/or diagonal members.

The method may comprise stretching and relaxing the entire article, or may comprise stretching and relaxing part of the article. That is, in the finished support, some parts of the article may have been strain oriented, and other parts may not have been strain oriented. In an embodiment, substantially all of the first and second elongate straps and joiner members of the article have been strain orientated in two directions, and the remainder of the article may not have been strain oriented.

Depending on the material used, in one embodiment the straps are stretched to between about 4 and about 5 times their as-moulded lengths, and preferably about 4.5 times. In an embodiment, the post-strain orientation relaxed lengths of the straps is between about 1.5 and about 2.7 times the as moulded length, preferably about 2.1 times the as-moulded length.

The step of relaxing and supporting may occur concurrently. For example, the article may comprise pockets or the like to capture respective parts of the frame, and the parts may be captured by the pockets as the article is relaxed. Alternatively, the article may be connected to the frame after relaxing the article. For example, following relaxing of the article, the article may be stretched a small amount and then supported from the frame. The stretched dimension for supporting the article from the frame is preferably about 1.1 times its post-strain orientation relaxed dimension, but that will depend on the frame configuration and the preferred strap tension.

The article may be directly connected to the frame such as by portions of one of the article and the frame being received in respective complementary recesses of the other of the article and the frame. For example, the article may be provided with integrally moulded joiner members around at least part of its periphery and that receive hooks or projections on the frame to connect the article to the frame. Alternatively, separate fasteners could be used to connect the article and the frame. As another alternative, one or more retaining strips could be used to connect the article to the frame. Preferably, the article is directly connected to the frame by attachment features that are integrally moulded with the article as part of the moulding process, from the same material as the remainder of the article. The part of the article having the integral attachment features would generally not be strain oriented.

In an embodiment, a surface texture is inmolded on the article as part of the moulding method.

The method may comprise stretching different parts of the article different amounts, to obtain varying properties in the article. However, in a preferred embodiment, the percentage stretch of the first elongate straps is substantially the same as the percentage stretch of the second elongate straps, so they undergo substantially the same amount of strain orientation.

One or more of the first elongate straps may differ in length from other(s) of the first elongate straps. However, each of the first elongate straps is preferably stretched by substantially the same percentage increase in length, to provide substantially the same amount of strain orientation in each of the first elongate straps.

One or more of the second elongate straps may differ in length from other(s) of the second elongate straps. However, each of the second elongate straps is preferably stretched by substantially the same percentage increase in length, to provide substantially the same amount of strain orientation in each of the second elongate straps.

In accordance with a fifth aspect of the present invention, there is provided a back portion for a chair when assembled using the method as outlined in relation to the fourth aspect above.

In accordance with a sixth aspect of the present invention, there is provided a seat portion for a chair when assembled using the method as outlined in relation to the fourth aspect above.

In accordance with a seventh aspect of the present invention there is provided a chair comprising:
 a supporting frame;
 a seat portion for supporting a seated occupant;
 a back portion for supporting the back of a seated occupant and that is reclinable relative to the supporting frame; and
 a recline mechanism configured to lift the seat portion upon a reclining action of the back portion, the recline mechanism comprising a back support arm operatively connected to the back portion and that is pivotally connected to the supporting frame and is pivotally connected to a relatively forward portion of the seat portion, and a rocker arm that is pivotally connected to the supporting frame, pivotally connected to a relatively rearward portion of the seat portion, and operatively connected to the back support arm to move relative to the back support arm.

In an embodiment, the seat portion moves upwardly and rearwardly when the back portion is reclined. The seat portion may initially move upwardly and forwardly from its initial position during initial recline of the back portion, and then move upwardly and rearwardly so as to move upwardly and rearwardly overall from its initial position.

In an embodiment, the seat portion has a rearward tilt angle when the back portion is not reclined, and the seat portion has a greater rearward tilt angle when the back portion is fully reclined.

In an embodiment, the rocker arm is downwardly forwardly angled when the back portion is not reclined, and is upwardly forwardly angled when the back portion is fully reclined.

In an embodiment, a portion of the back support arm is approximately horizontal when the back portion is not reclined, and is upwardly forwardly angled when the back portion is fully reclined.

In an embodiment, the rocker arm is downwardly forwardly angled when the back portion is not reclined, and is upwardly forwardly angled when the back portion is fully reclined, and wherein a portion of the back support arm is approximately horizontal when the back portion is not reclined, and is upwardly forwardly angled when the back portion is fully reclined, wherein the upward and forward angle of the rocker arm is greater than the upward and forward angle of the portion of the back support arm. In an embodiment, the downward and forward angle of the rocker arm is about 13 degrees below horizontal, and the upward and forward angle of the rocker arm is about 24 degrees above horizontal, and wherein the upward and forward angle of the portion of the back support arm is about 17 degrees above horizontal.

In an embodiment, the pivot connection of the back support arm and the supporting frame is forward of the operative connection of the rocker arm to the supporting frame. In an embodiment, the pivot connection of the rocker arm and the supporting frame is positioned at or adjacent a rear portion of the supporting frame. In an embodiment, the pivot connection of the back support arm and the supporting frame is positioned adjacent and forward of the pivot connection of the rocker arm and the supporting frame. In an embodiment, the pivot connection of the rocker arm and the seat portion is generally aligned with the pivot connection of the back support arm and the supporting frame, in a forward-rearward direction of the chair.

In an embodiment, the pivot connection of the back support arm to the relatively forward portion of the seat portion comprises a pivot and slide connection.

In an embodiment, the rocker arm is operatively connected to the back support arm via a connecting link that is pivotally connected to the back support arm and pivotally connected to the rocker arm. In an embodiment, the pivot connection of the rocker arm and the connecting link is positioned substantially vertically above the pivot connection of the connecting link and the back support arm, when the back portion is not reclined.

In an embodiment, the rocker arm is operatively connected to the back support arm via a pivot and slide connection. In an embodiment, the pivot and slide connection comprises a pin on the rocker arm and a slot in the back support arm. In an embodiment, the pivot and slide connection comprises a roller rotatably mounted on the rocker arm and slidable along a surface of the back support arm.

In an embodiment, the recline mechanism comprises two back support arms operatively connected to the back portion and that are pivotally connected to the supporting frame and are pivotally connected to the relatively forward portion of the seat portion, two rocker arms that are pivotally connected to the supporting frame, pivotally connected to a relatively rearward portion of the seat portion, and operatively connected to a respective one of the back support arms. In an embodiment, the two rocker arms are movably connected relative to the back support arms via two connecting links that are each pivotally connected to a respective one of the back support arms and to a respective one of the rocker arms.

In an embodiment, the supporting frame comprises a transom having a base and a pair of spaced apart side walls, and wherein a portion of each back support arm is positioned inwardly of the side walls of the transom. In an embodiment, each back support arm is pivotally connected to respective one of the side walls of the transom.

In an embodiment, the seat portion comprises a seat support and a seating surface for supporting a seated occupant, wherein the seating surface is selectively moveable in a forward and rearward direction relative to the seat support, and wherein the rocker arm(s) and the back support arm(s) are pivotally connected to the seat support.

In an embodiment, the chair further comprises a recline resistance mechanism to resist movement of the back portion toward the reclined position, wherein the amount of resistance provided by the recline resistance mechanism is selectively adjustable.

In an embodiment, the seat comprises a shell beneath the seating surface and having a central recess in the underside of the shell, and wherein the recline mechanism is substantially housed in the central recess when the back portion is not reclined.

In an embodiment, a vertical height of the recline mechanism is about 40 mm when the back portion is not reclined.

In an embodiment, a forward end of the rocker arm is configured to engage with the seat portion to provide a recline stop that defines the maximum rearward recline of the back portion.

In an embodiment, a forward end of the back support arm is configured to engage with the supporting frame to provide an upright stop that defines the upright position of the back portion.

In accordance with an eighth aspect of the present invention, there is provided a chair comprising:
 a supporting frame;
 a seat portion for supporting a seated occupant;
 a back portion for supporting the back of a seated occupant, the back portion being reclinable relative to the supporting frame between a generally upright position and a generally reclined position; and
 a recline resistance mechanism to resist movement of the back portion toward the generally reclined position, the recline resistance mechanism comprising a resistance device operatively connected to one of the back portion, the seat portion, or the supporting frame, the recline resistance mechanism further comprising a first retainer and a second retainer that are both operatively connected to another one of the back portion, the seat portion, or the supporting frame, wherein the second retainer is movable to adjust a reaction point between the resistance device and said another one of the back portion, seat portion, or supporting frame, to vary the amount of recline resistance provided by the recline resistance mechanism, wherein the first retainer preloads the resistance device when the back portion is in the generally upright position, and wherein the second retainer is movable to at least one position wherein in the reclined position of the back portion, the reaction point is provided by the second retainer.

In an embodiment, movement of the second retainer does not alter the preload on the resistance device when the back portion is in the generally upright position.

In an embodiment, the first retainer engages the resistance device such that the recline resistance mechanism provides a first level of recline resistance. In an embodiment, the second retainer is movable to a position in which it provides a second level of recline resistance that differs from the first level of recline resistance provided by the first retainer. In an embodiment, the first level of recline resistance provided by the first retainer is a relatively low level of recline resistance, and the second level of recline resistance provided by the second retainer is a relatively high level of recline resistance.

In an embodiment, the second retainer is selectively movable between an engaged position in which the second retainer engages the resistance device when the back portion is reclined from the generally upright position, and a disengaged position. In an embodiment, in the engaged position, the second retainer does not engage the resistance device when the back portion is in the generally upright position.

In an embodiment, the first retainer contacts the resistance device when the back portion is not reclined, whether or not the second retainer is selectively engaged.

In an embodiment, at least one of the retainers is movable relative to the resistance device between a plurality of engagement positions, to provide differing levels of recline resistance.

In an embodiment, the resistance device is operatively connected to the back portion, and the first and second retainers are operatively connected to the supporting frame.

In an embodiment, the resistance device comprises a leaf spring. In an embodiment, the leaf spring has an effective length, a reaction length, and an amount of deflection when the back portion is in the generally reclined position, and wherein in a first position of the second retainer, the effective length, the reaction length, and the amount of deflection are all greater than if the second retainer is in a second position, such that the level of resistance provided by the recline resistance device is relatively high when the second retainer is in the first position and relatively low when the second retainer is in the second position.

In an embodiment, the first position is an engaged position in which the second retainer engages the leaf spring when the back portion is reclined from the generally upright position, and the second position is a disengaged position. Alternatively, the first and second positions may be different engaged positions in which the second retainer engages the leaf spring when the back is reclined from the generally upright position.

In an embodiment, the leaf spring is operatively connected to the back portion to move with the back portion and the first and second retainers are operatively connected to the supporting frame. In an embodiment, the second retainer is pivotally connected to the supporting frame and is selectively engageable with a forward end of the leaf spring.

In an embodiment, the leaf spring is operatively connected to the supporting frame, and the first and second retainers are operatively connected to the back portion to move with the back portion.

In an embodiment, the resistance device comprises a torsion spring. In an embodiment, the torsion spring comprises a leg portion, and the first retainer engages the leg portion.

In an embodiment, the second retainer is movable to engage and disengage an end of the leg portion and wherein the effective spring rate of the torsion spring and thereby the recline resistance is higher when the second retainer is engaged with the end of the leg portion.

In an embodiment, the torsion spring further comprises another leg portion that is operatively connected to the back portion. In an embodiment, the torsion spring comprises a body and two leg portions, and wherein the body is positioned on or spaced apart from the pivot axis of the back portion to the supporting frame.

In an embodiment, the resistance device comprises a plurality of springs, and wherein the first retainer and/or the second retainer is/are engageable with the plurality of springs. By way of example, the springs could be leaf springs, could be torsion springs, or could differ from each other.

The term 'comprising' as used in this specification means 'consisting at least in part of'. When interpreting each statement in this specification that includes the term 'comprising', features other than that or those prefaced by the term may also be present. Related terms such as 'comprise' and 'comprises' are to be interpreted in the same manner.

As used herein the term 'and/or' means 'and' or 'or', or both.

As used herein '(s)' following a noun means the plural and/or singular forms of the noun It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

The chair may be any suitable form of chair. For example, the chair may be an office chair. The chair could be a different type of chair, including but not limited to a vehicle seat such as a car seat, aircraft seat, or boat seat, or a lounge chair or theatre chair.

Optional features of different embodiments of the invention are described in the accompanying dependent claims.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting. Where specific integers are mentioned herein which have known equivalents in the art to which this invention relates, such known equivalents are deemed to be incorporated herein as if individually set forth.

The invention consists in the foregoing and also envisages constructions of which the following gives examples only.

BRIEF DESCRIPTION OF THE DRAWINGS

In order that the invention may be more fully understood, some embodiments will now be described by way of example with reference to the accompanying figures in which:

FIG. 32(*b*) is a section view of the arrangement of FIG. 26;

FIG. 37 is a front elevation view of a preferred form left side arm support assembly of the chair of FIGS. 1 to 7 or 8 to 11;

FIG. 38 is a side elevation view of the arm support assembly of FIG. 37;

FIGS. 64(a) to (f) are views showing one of the joiner members that connect the longitudinally extending straps to the transversely extending straps, in the as-moulded form, where 64(a) is a rear perspective view, 64(b) is a front perspective view, 64(c) is a rear plan view, 64(d) is a side elevation in the transverse direction, 64(e) is a front plan view, and 64(f) is a section view taken through line 64f-64f of FIG. 64(e);

FIGS. 67(a) and (b) are views showing alternative exemplary as-moulded dimensions of the necked regions of the transverse straps and longitudinal straps respectively;

DETAILED DESCRIPTION OF PREFERRED FORMS

Figure 1:
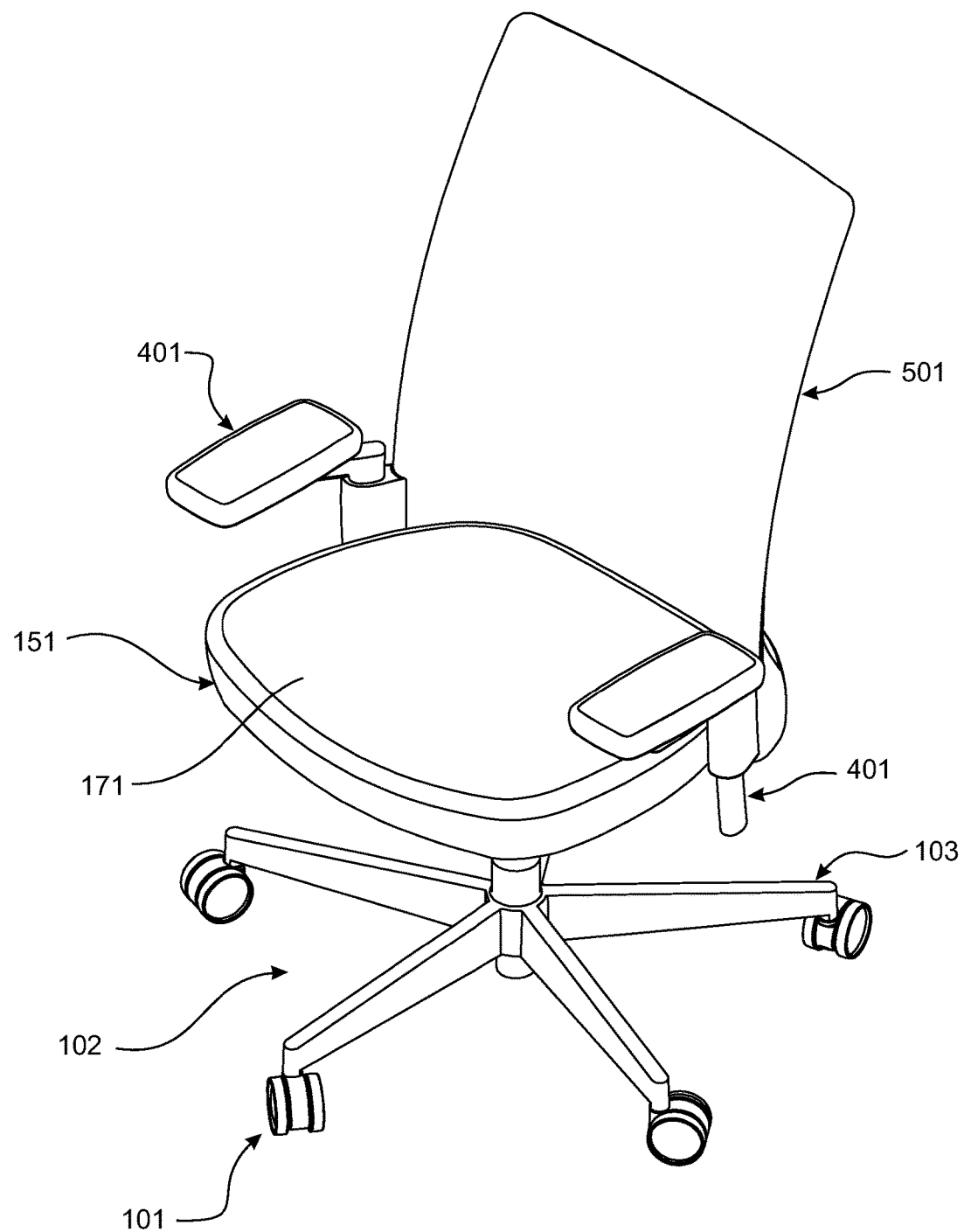
FIG. 1 is a perspective view of a preferred form chair.
Figure 2:
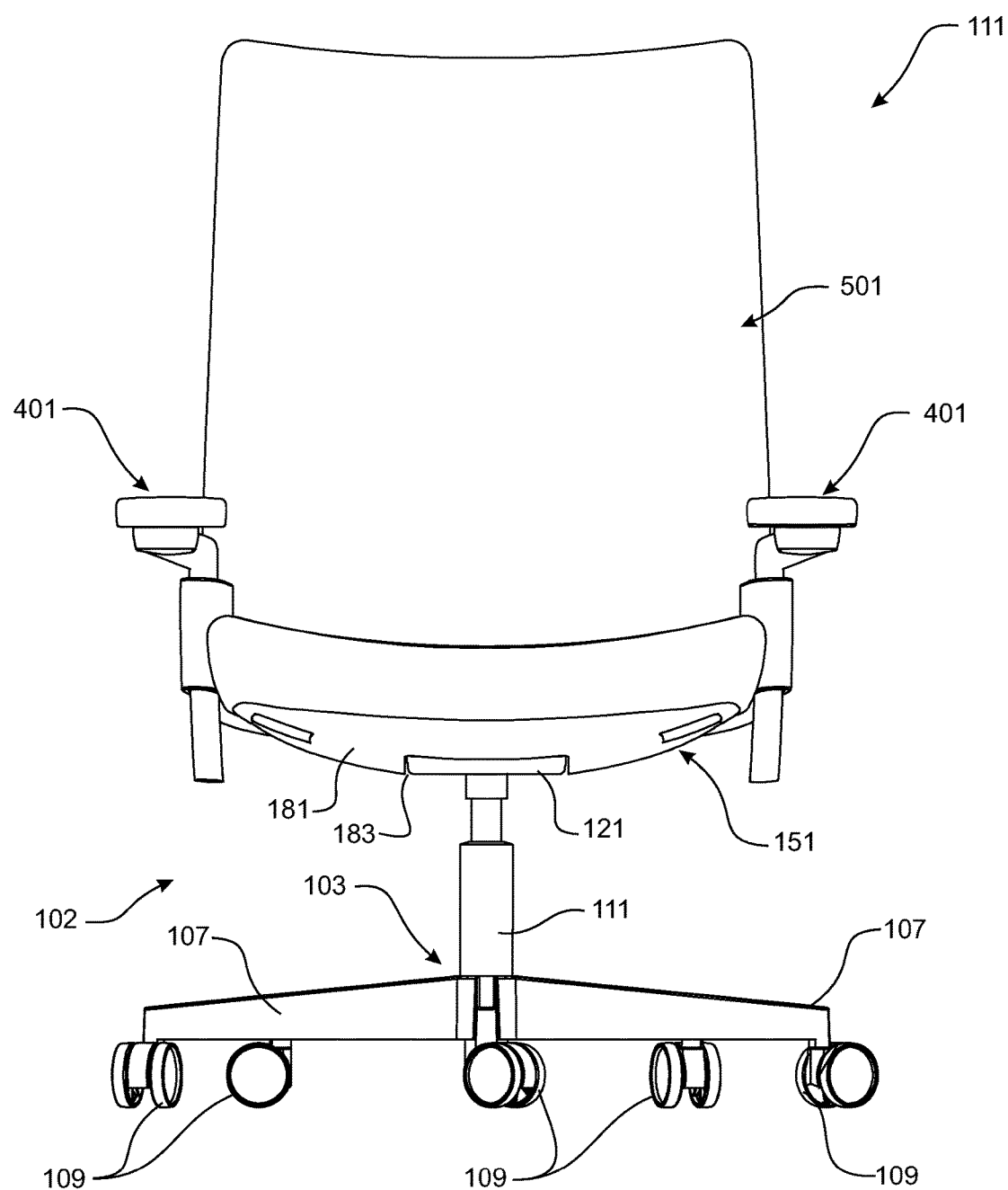
FIG. 2 is a front elevation view of the chair of FIG. 1.
Figure 3:
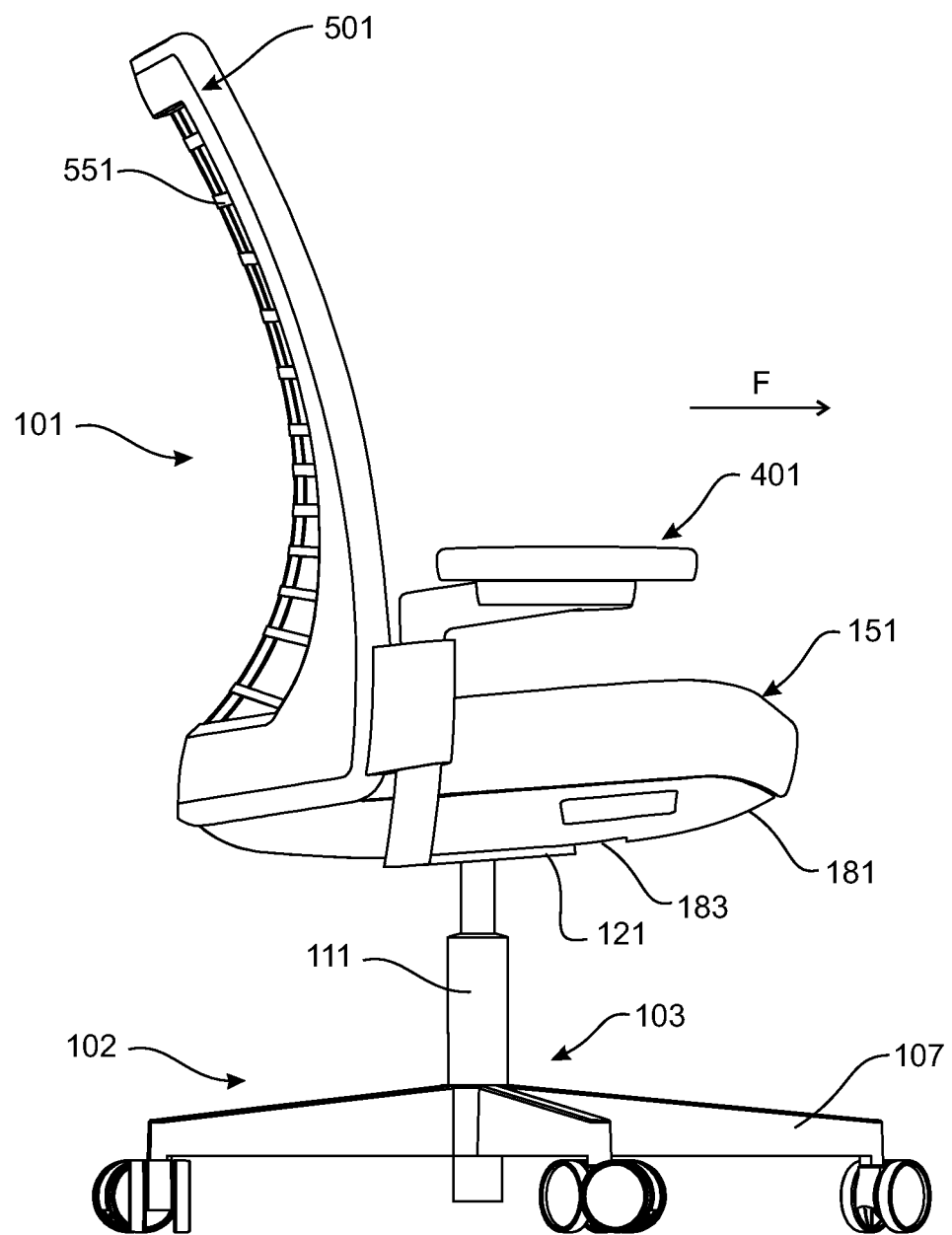
FIG. 3 is a side elevation view of the chair of FIGS. 1 and 2.
Figure 4:
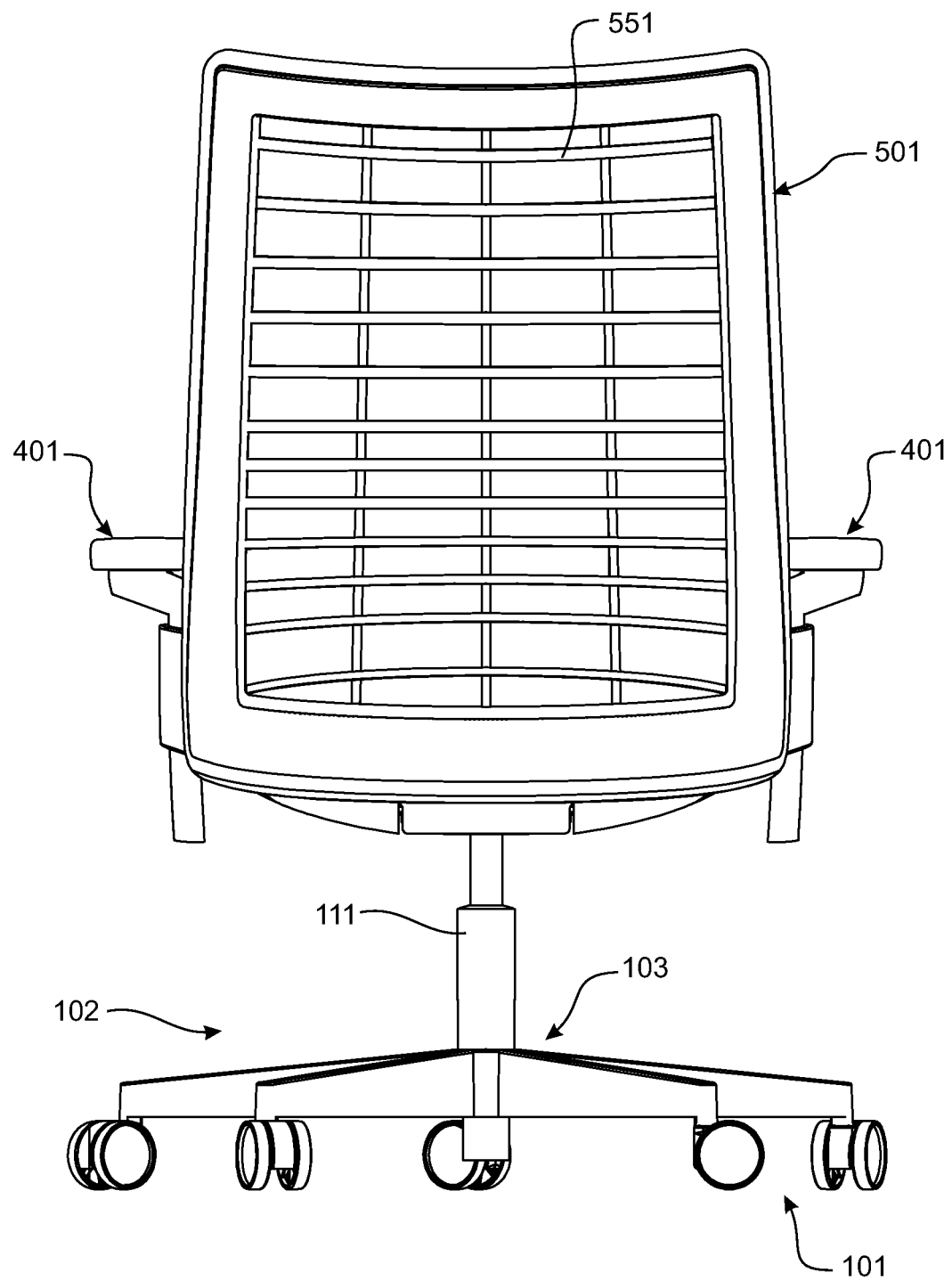
FIG. 4 is a rear elevation view of the chair of FIGS. 1 to 3.
Figure 5:
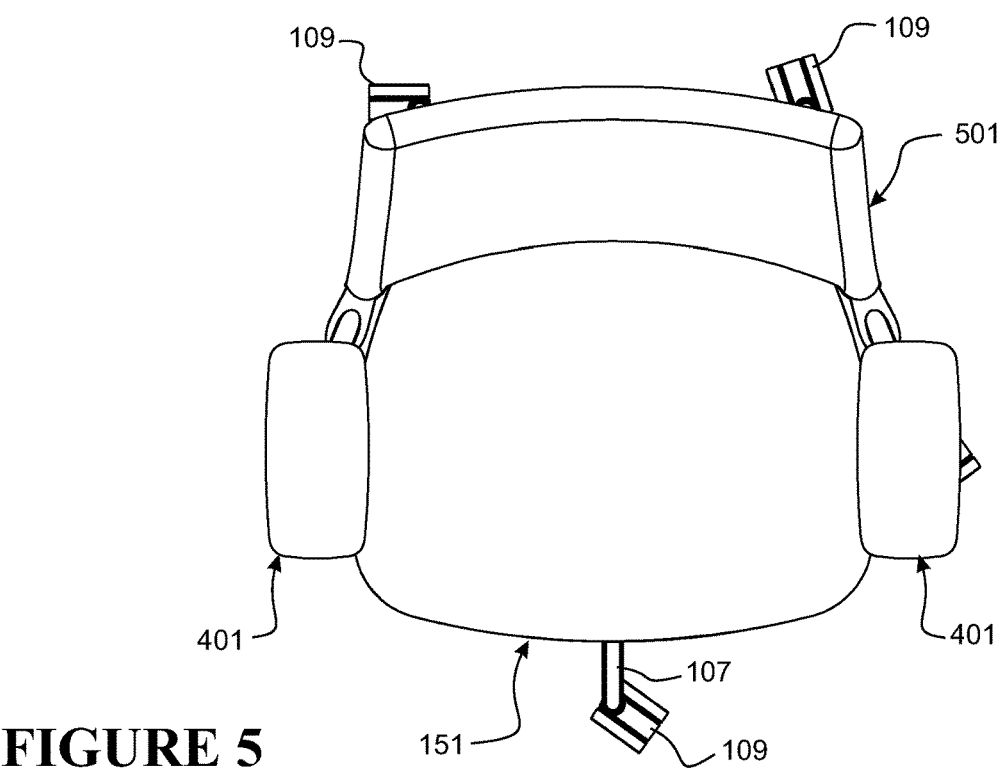
FIG. 5 is a plan view of the chair of FIGS. 1 to 4.

Since the figures illustrate the preferred form chairs from various different angles as convenient to explain certain parts, an arrow marked 'F' has been inserted into some of the figures where appropriate to indicate a forward direction of the chair. Accordingly the terms forward, rearward, left side, and right side (or similar) should be construed with reference to the forward direction F of the chair, not necessarily with reference to the orientation shown in the particular figure.

The features of the preferred form chairs are described and shown herein to give a full understanding of the components and operation of the preferred form chair. It will be appreciated that not all of the features described herein need be provided in every chair.

FIGS. 1 to 7 show a chair 101 in accordance with a first preferred form of the present invention. FIGS. 8 to 11 show a chair 101' in accordance with a second preferred form of the present invention. Both of the chairs may have any one or more of the features described below. The primary difference between the first preferred form chair 101 and the second preferred form chair 101', is that the first preferred form chair is a 'mid-back' chair, with a back portion 501 sized and configured to support a seated occupant's back portion up to approximately their shoulder blade region. The second preferred form chair 101' is a 'high-back' chair, with the back portion 501' sized and configured to support a seated occupant's back portion up to and including their shoulder region. As the chairs are otherwise substantially the same, like reference numerals indicate like parts in the figures, with a prime (') indicating the sections that differ.

Each chair has a supporting frame 102 comprising a base 103 for supporting the chair on a floor surface. In the form shown the base is a castered base 103 having a plurality of radially extending legs 107 extending outwardly from a single central hub. In the form shown, there are five legs. However, it will be appreciated that there may be more or less legs. A caster or roller 109 is rotatably mounted at the end of radially-extending leg 107 opposite to the central hub. The casters enable a chair occupant to move the base 103 and thereby the chair along the ground surface. In an alternative configuration, the chair may comprise a fixed base that does not provide for rolling movement of the chair on the ground surface.

A height adjustable column 111 is coupled to the central hub of the base and extends upwardly therefrom. The height adjustable column can be any suitable type of pneumatic or gas spring, which enables height adjustment of the chair seat portion 171 and back portion 501, 501' relative to the ground surface. A main transom 121 of the supporting frame is coupled to an upper end of the height adjustable column 111, such that height adjustment of the column causes height adjustment of the transom 121 and supported components.

A seat portion 151 for supporting a seated occupant and a back portion 501, 501' supporting the back of a seated occupant are coupled to the transom 121 via a recline mechanism described below, so that the seat portion 151 and back portion are movable relative to the supporting frame. The seat portion 151 and back portion 501 will be described in further detail below.

The chairs 101, 101' may be provided with or without arm support assemblies 401 to support an occupant's arms.

Recline Mechanism

Figure 7:
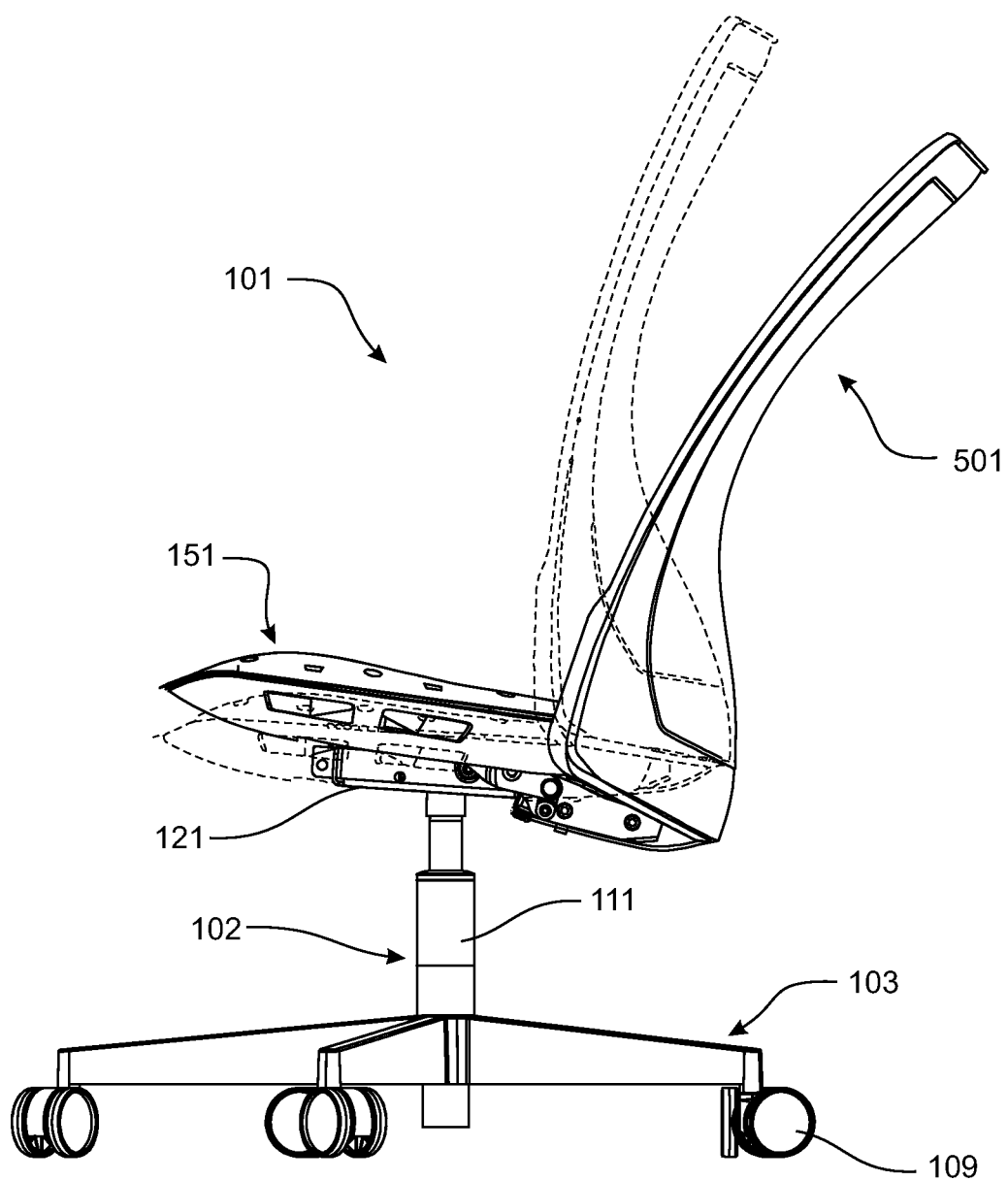
FIG. 7 is a schematic side elevation view showing the back portion 501 and seat portion 151 in an upright position in broken lines, and in a fully reclined position in solid lines.

In the preferred form chairs, the back portion 501, 501' of the chair is reclinable relative to the supporting frame 102 between an upright position (FIGS. 3 and 10) and a reclined position (FIG. 7). The chair comprises a recline mechanism 201, 202 coupling the back portion 501, 501' to the seat portion and the transom 121. The recline mechanism is configured to lift the seat portion 151 as the back portion 501, 501' reclines.

FIGS. 12 to 17 show a first preferred form recline mechanism 201. In this embodiment, the recline mechanism comprises a back support arm 203, a rocker arm 211, and a connector link 215. The back support arm 203 is fixed to the back portion 501, 501' and extends forward from the back portion 501, 501'. The angle between the back frame 503 and the back support arm 203 is preferably fixed and about 90°. The back support arm 203 is a rigid member and has a kinked arrangement, with a rearward section 203a extending forward from its rear end to pivot 219, an upwardly and forwardly angled intermediate section 203b between pivots 219 and 205, and a forward section 203c between pivots 205 and 207. Preferably, a portion 203c of the back support arm 203 is approximately horizontal when the back portion 501, 501' is upright, and is upwardly forwardly angled when the back portion is reclined.

The back support arm 203 is pivotally connected to the transom 121 by a pivot 205, and a front end 203c of the back support arm 203 is pivotally connected to a relatively forward portion of the seat portion 151 via the support 161 by a pivot and slide 207. Preferably, the front end of the back support arm 203 is connected to the front of the seat portion 151. The rocker arm 211 is pivotally connected to the transom 121 by a pivot 213 and has a first relatively forward end pivotally connected to a relatively rearward portion of the seat portion 151 and a second relatively rearward end pivotally connected to the connector link 215, to operatively connect the rocker link 211 to the back support arm 203 to move relative to the back support arm 203.

The pivot connection 213 between the rocker arm 211 and the transom 121 is positioned at or adjacent a rear portion of the transom 121. The pivot connection 205 between the back support arm 203 and the transom 121 is adjacent and forward of the pivot 213 between the rocker arm 211 and the transom 121. The pivot connection 209 between the rocker arm and the seat portion 151 is generally aligned with the pivot connection of the back support arm 203 and the transom 121 in a forward-rearward direction of the chair, in both the fully reclined and fully upright configurations of the back portion.

Figure 12:
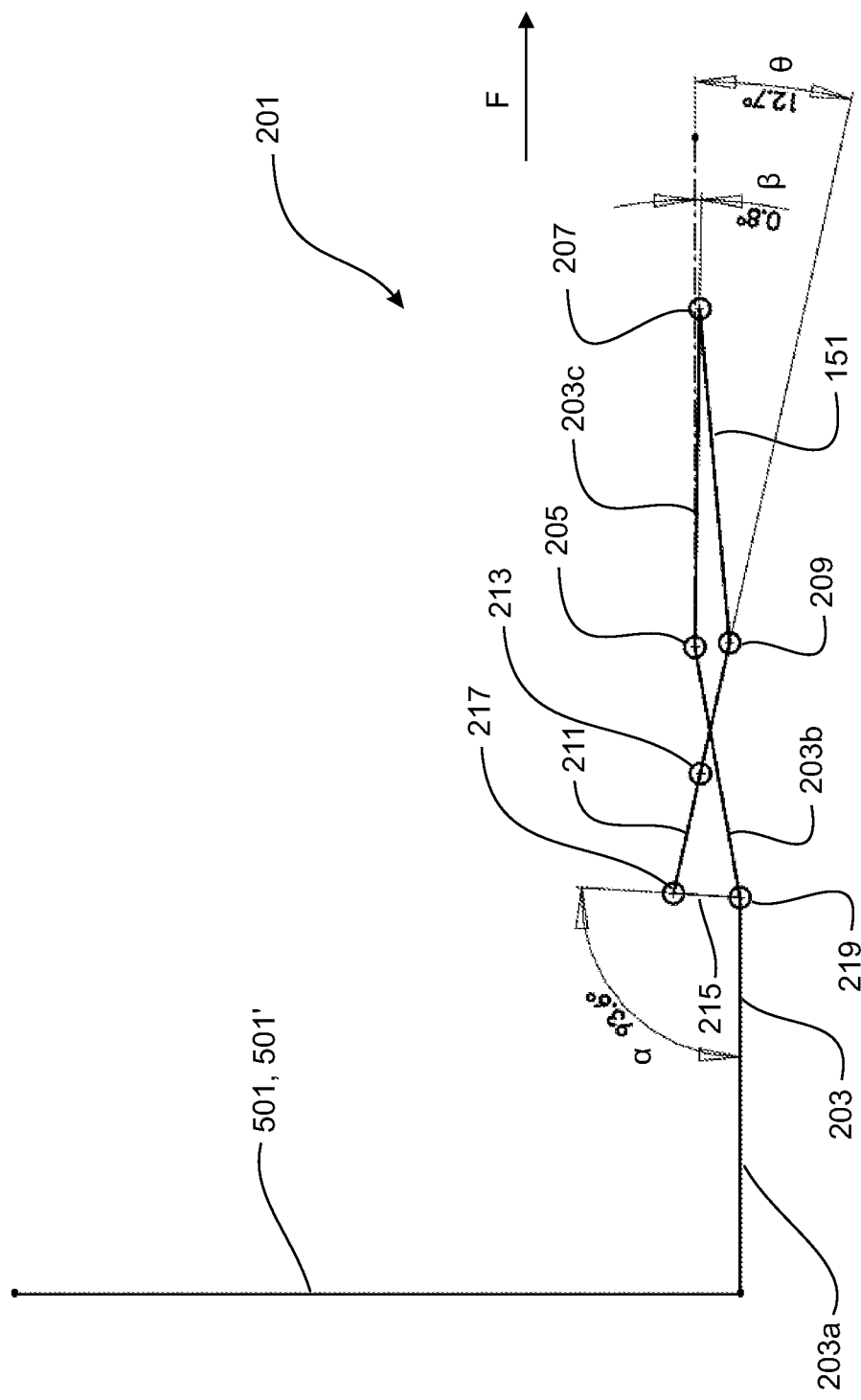
FIG. 12 is a schematic diagram showing the connections between the links in a first preferred form back recline mechanism of the first or second preferred form chair with the back portion in an upright position.
Figure 13:
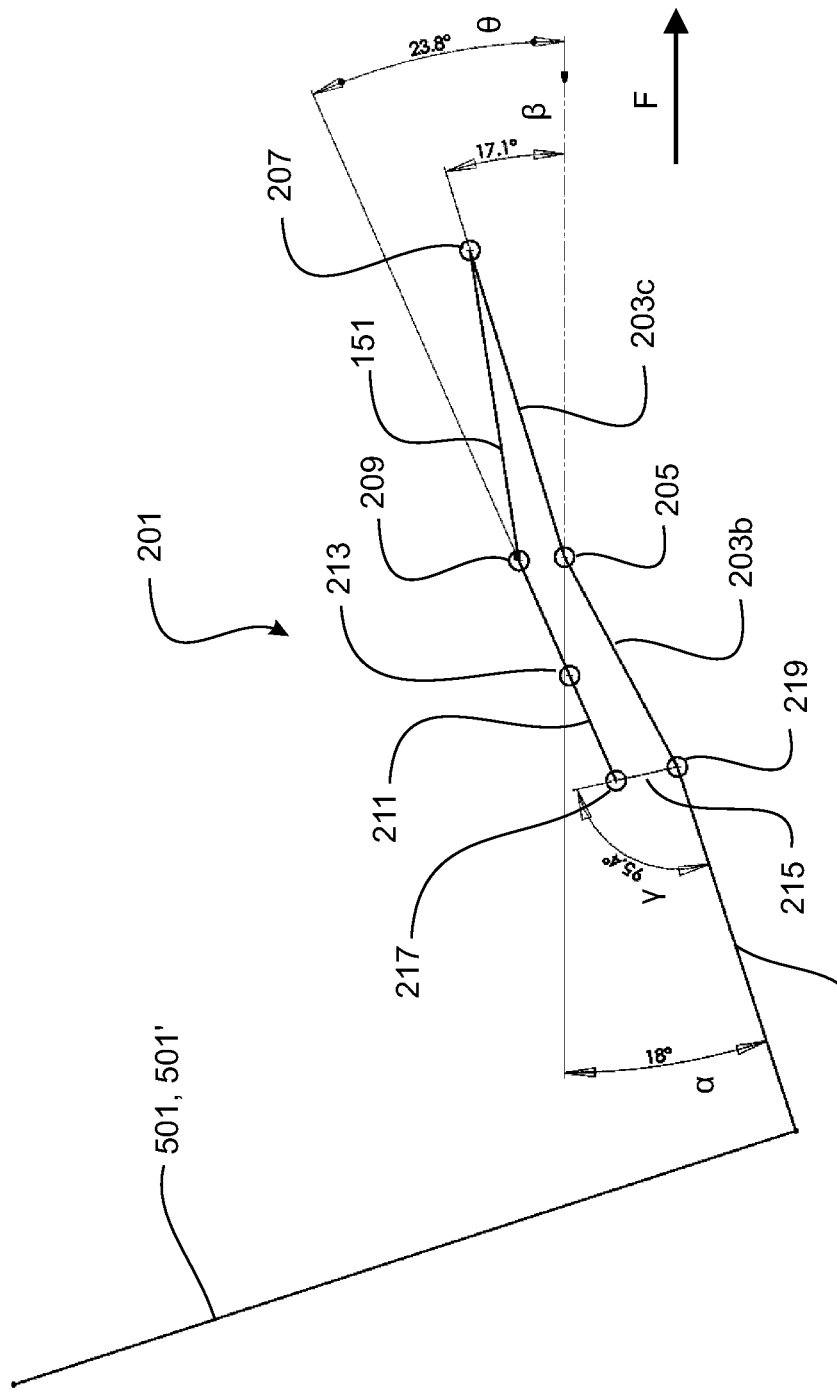
FIG. 13 is a diagram corresponding to FIG. 12 but with the back portion in a reclined position.

In the first embodiment 201, the pivot connection 217 of the rocker arm 211 and the connecting link 215 is positioned substantially vertically above the pivot connection 219 of the connecting link 215 and the back support arm 203 both when the back portion is fully upright and fully reclined. As shown in FIGS. 12 and 13, during recline of the back portion 501 through an angle α of about 18° from upright, the angle γ between the connecting link 215 and the back support arm 203 changes less than about 2°, from about 93.6° to about 95.4°. During that recline, the rocker arm 211 pivots from a downwardly forwardly angled orientation, from an angle θ of about 13°, preferably about 12.7°, below horizontal when the back portion is fully upright, to an upwardly forwardly angled orientation of about 24°, preferably about 23.8°, above horizontal when the back portion is fully reclined. In the reclined configuration, the upward and forward angle θ of the rocker link 211 is greater than the upward and forward angle of the portion 203c of back support arm 203 that extends from the transom pivot 205 to the seat portion pivot 207. In this embodiment, the upward and forward angle is about 17.1° in the reclined configuration, and the downward and forward angle is about 0.8° when the back portion is upright.

Figure 14:
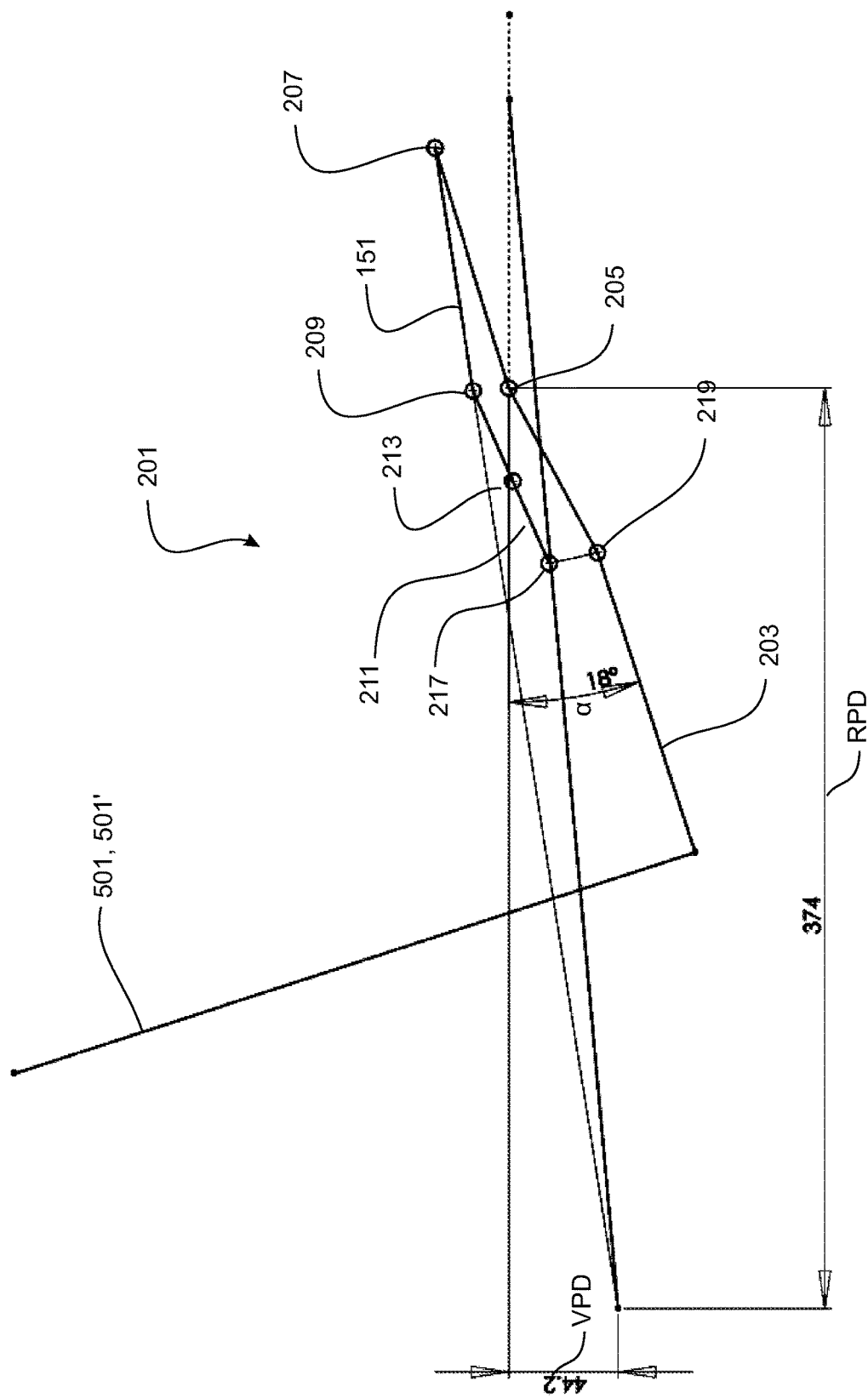
FIG. 14 is a diagram corresponding to FIG. 13 and showing the effective pivot point of the seat during recline of the back portion.
Figure 15:
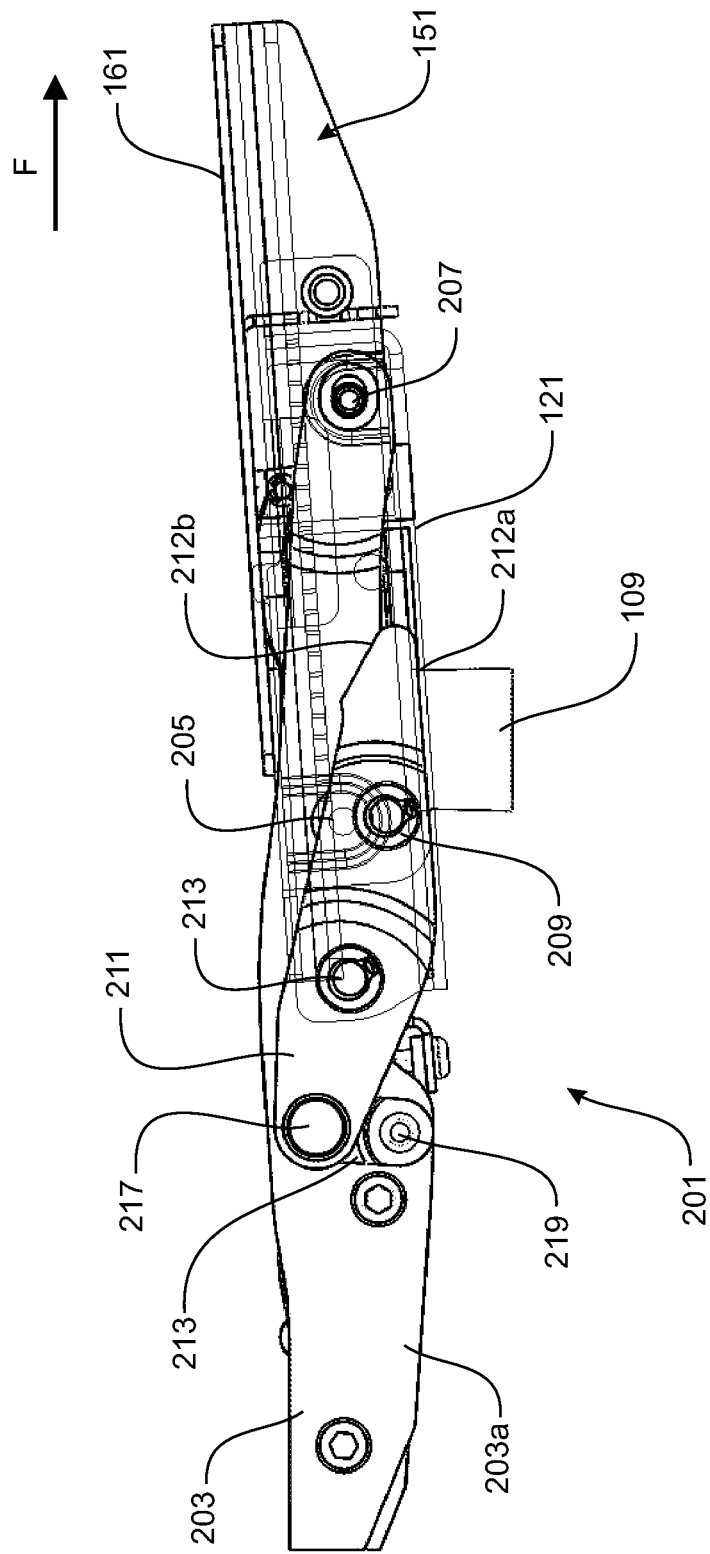
FIG. 15 is a side view of the recline mechanism of FIGS. 12 to 14, with the back portion in an upright position.
Figure 16:
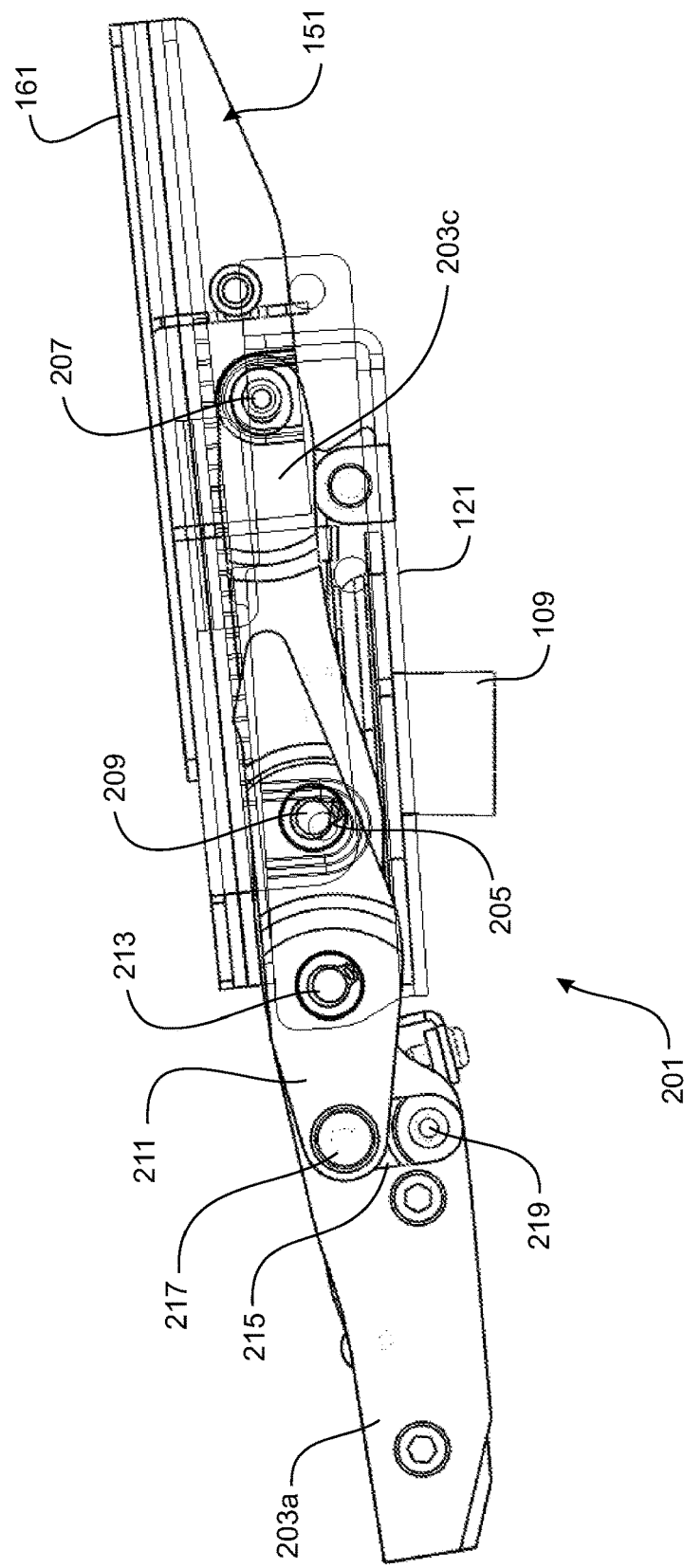
FIG. 16 is a view corresponding to FIG. 15, with the back portion in a partially reclined position.
Figure 17:
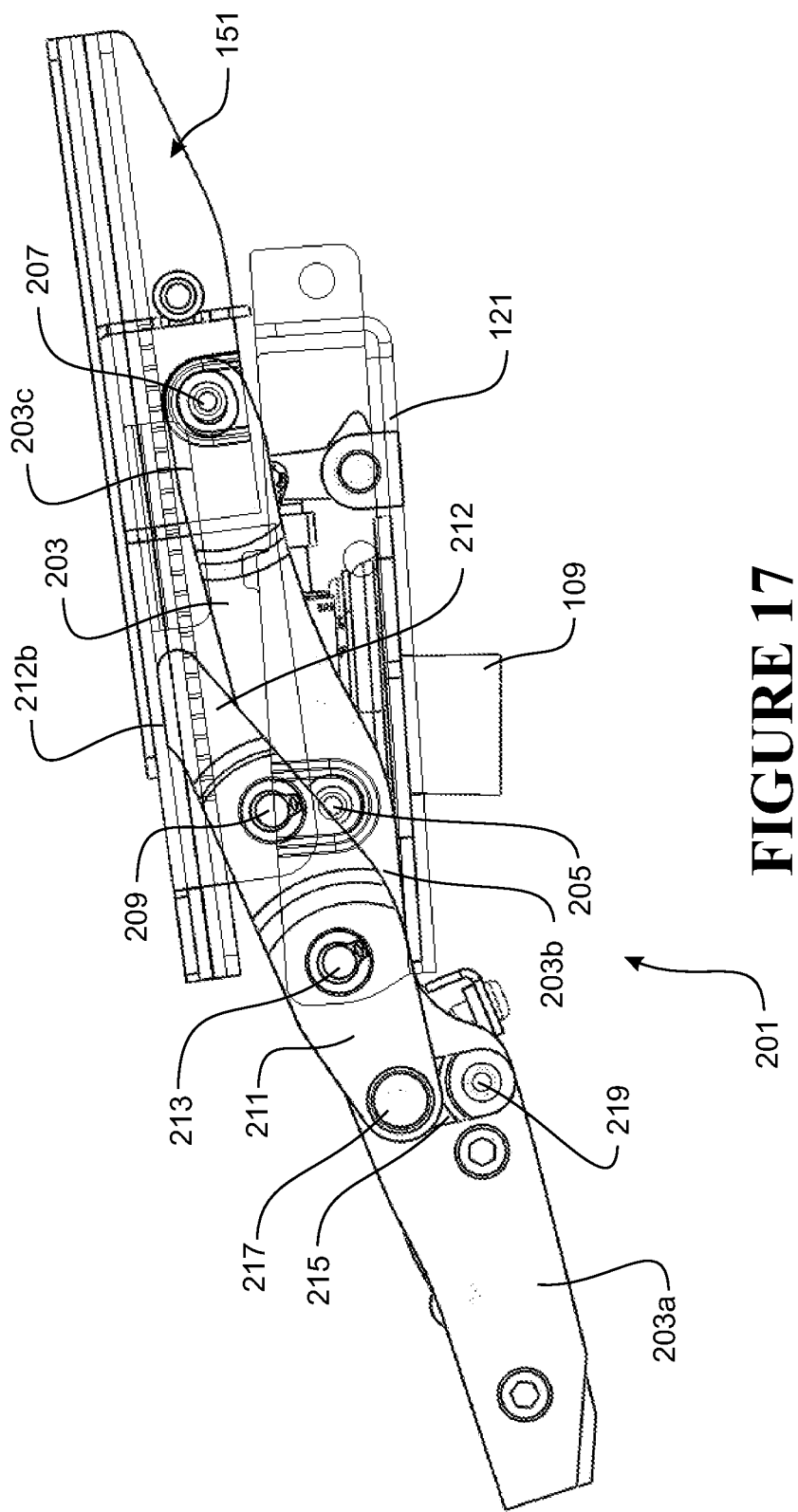
FIG. 17 is a view corresponding to FIGS. 15 and 16, with the back portion in a fully reclined position.
Figure 18:
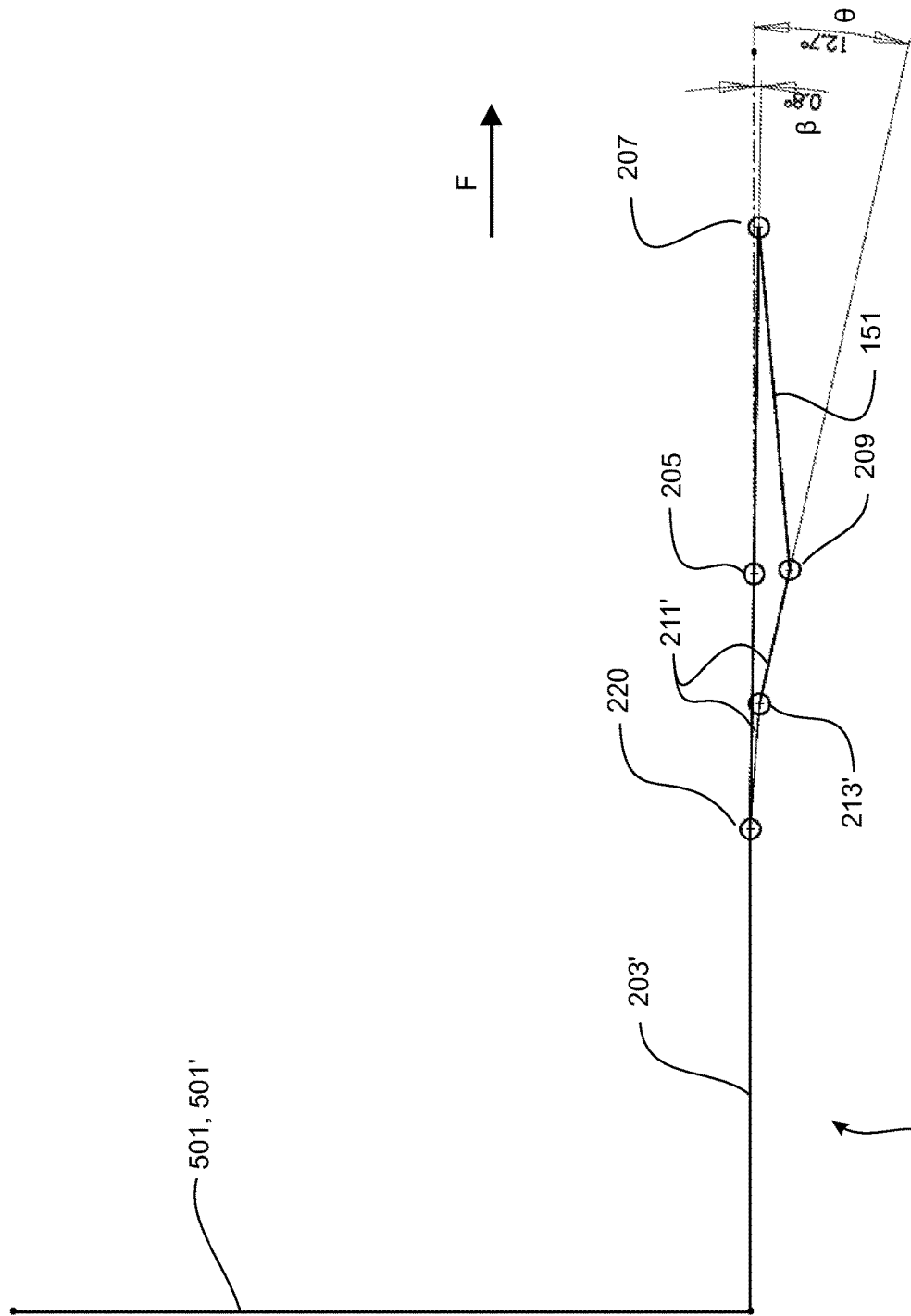
FIG. 18 is a schematic diagram showing the connections between the links in a second preferred form back recline mechanism of the first or second preferred form chair, with the back portion in an upright position.
Figure 19:
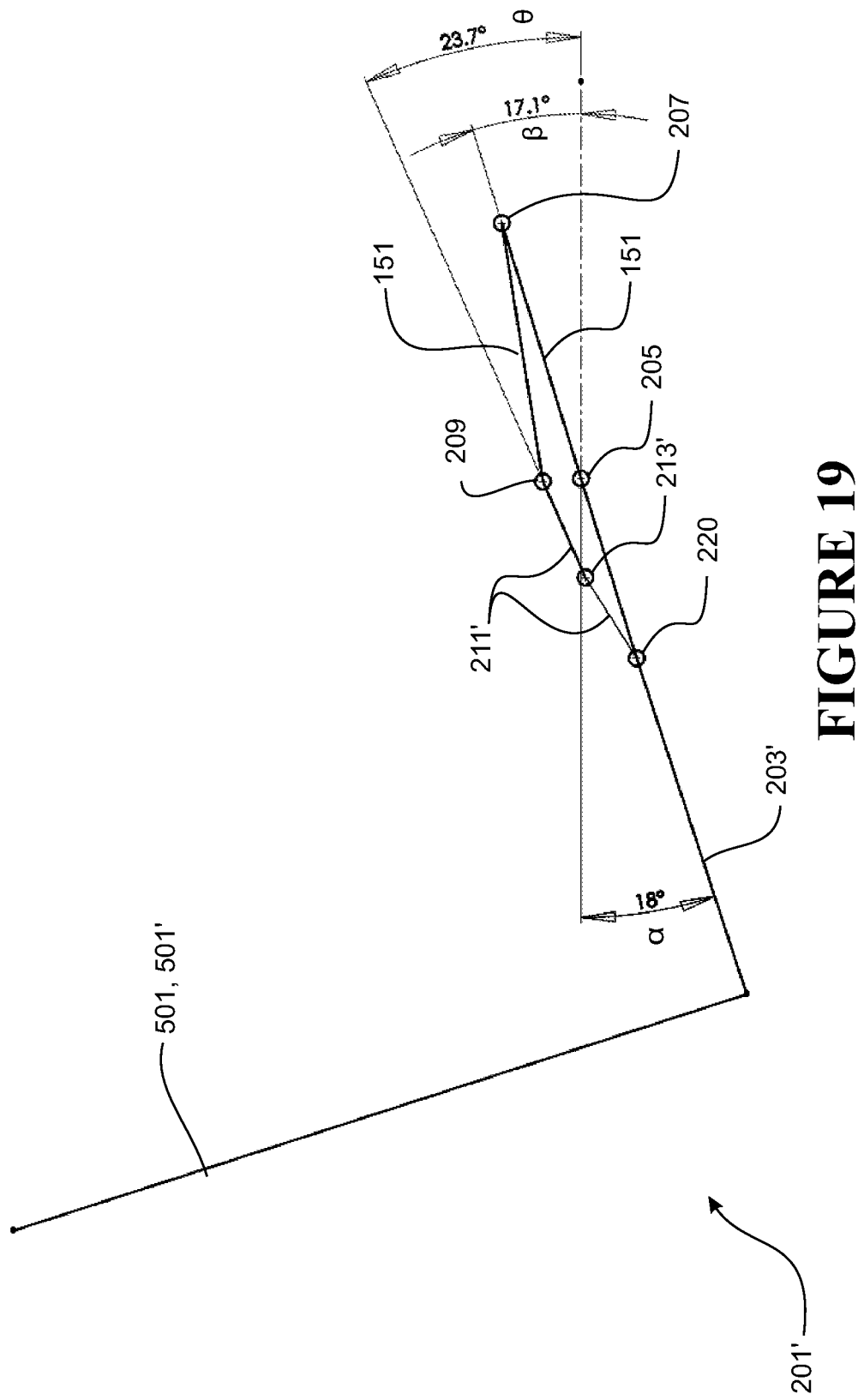
FIG. 19 is a diagram corresponding to FIG. 18 but with the back portion in a reclined position.

FIGS. 15 to 17 show side views of the recline mechanism of FIGS. 12 to 14, with the back portion 501, 501' in a fully upright (FIG. 15), intermediate (FIG. 16), and fully reclined (FIG. 17) position.

Figure 27:
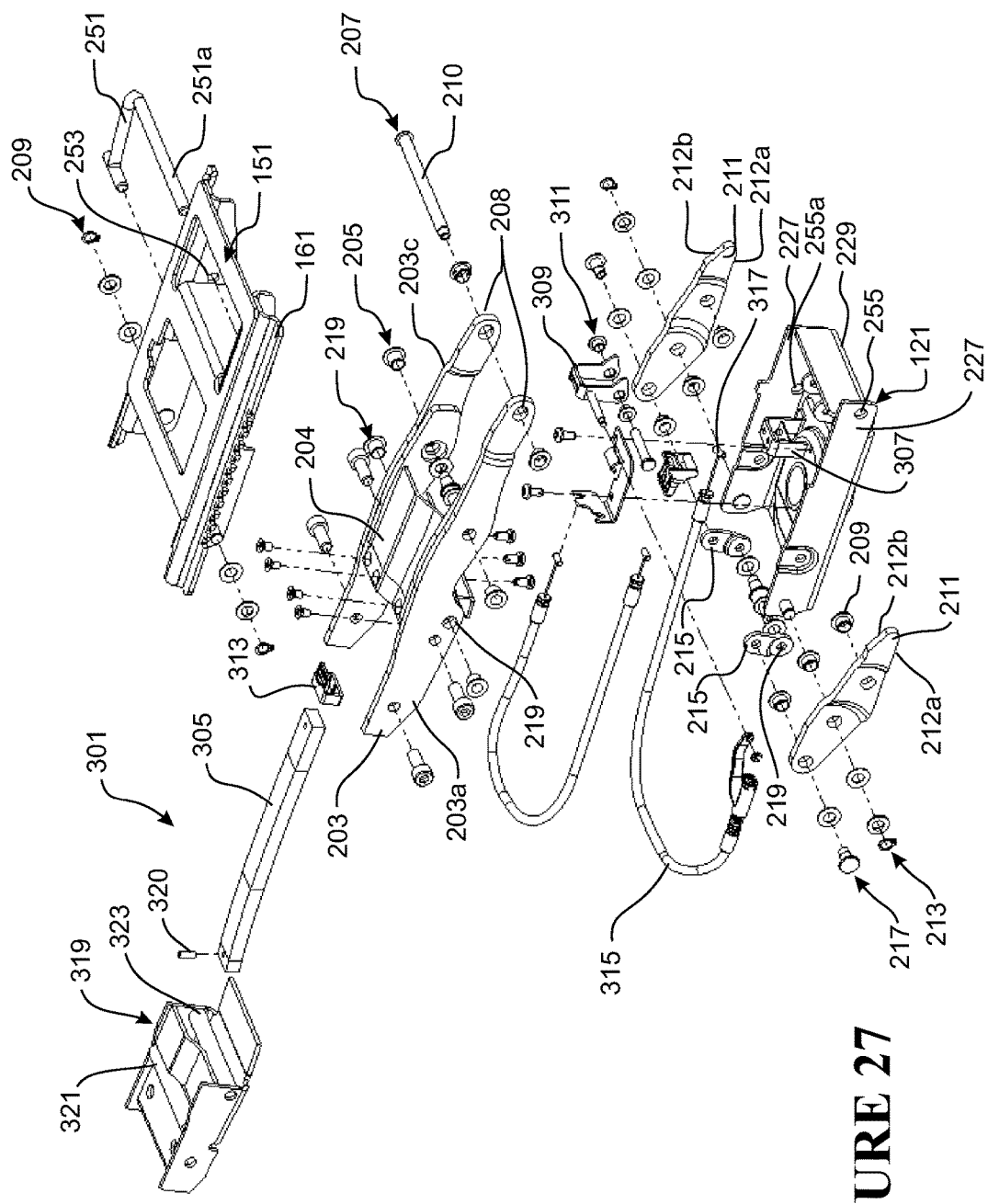
FIG. 27 is an exploded perspective view of the recline mechanism of FIGS. 12 to 17 and the RRM of FIGS. 25 and 26.

As shown in FIG. 27, the pivot and slide 207 between the back support arm 203 and the seat portion 151 comprises a pin 210 fixed to an underside of a front portion of the seat portion 151, and at least one slot 208 in a front end 203c of the back support arm 203. The slot 208 is a slightly elongated aperture that allows between about 1.5 mm and about 2 mm movement of the pin 210 along the slot 208 during recline. Alternatively, the pivot and slide 207 could comprise any other sliding connection, for example a pin or protrusion at a front end of the back support arm 203 that slides in a slot in the seat portion 103.

FIGS. 18 to 22 show a second preferred form recline mechanism 202. That embodiment has similar features and functioning to the embodiment of FIGS. 12 to 17, and like numerals indicate like parts, with a prime (') indicating the sections that differ. This embodiment differs in that, in place of the connector link 215, the rocker link 211' is operatively connected to the back support arm 203' to move relative to the back support arm, via a pivot and slide connection 220. The rocker link 211' is pivoted to the transom 121 at a pivot 213' intermediate its two ends.

The forward-rearward position of the pivot and slide connection 220 is selected to enable the forward portion of the rocker link 211' between the transom pivot 213' and the seat pivot 209 to move through the same angle during recline of the back portion 501, 501' as for the first embodiment, such that the movement imparted to the seat portion 151 on recline of the back portion 501, 501' is substantially the same for both the first and second embodiments 201, 202. The pivot and slide connection 207 between the seat portion 151 and the back support arm 203' is substantially the same for both the first and second embodiments 201, 202. It can be seen that the pivots 220, 205, 207 of the back support arm are more linear in this embodiment than in the embodiment of FIGS. 12 to 17.

Figure 20:
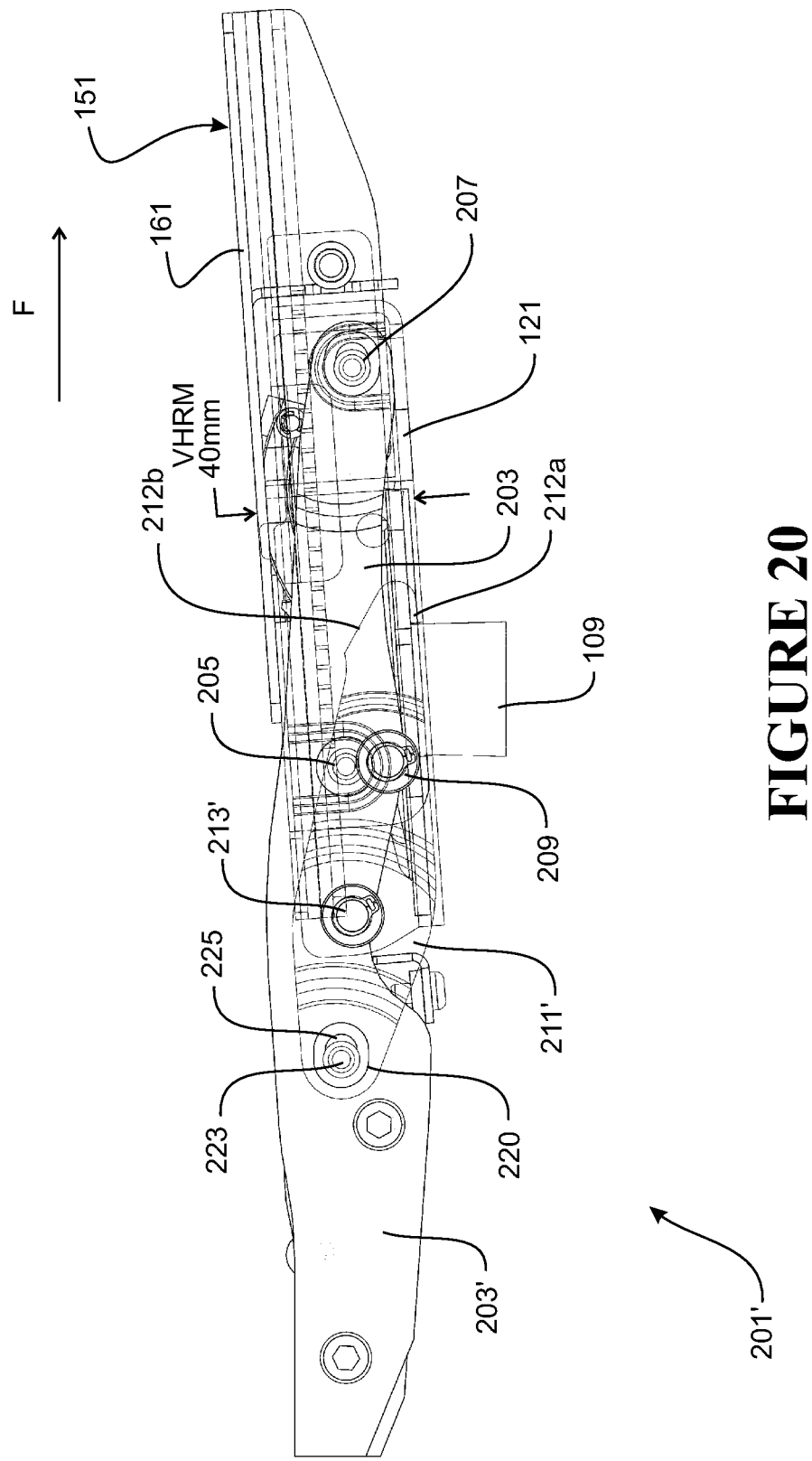
FIG. 20 is a side view of the recline mechanism of FIGS. 18 and 19, with the back portion in an upright position.
Figure 21:
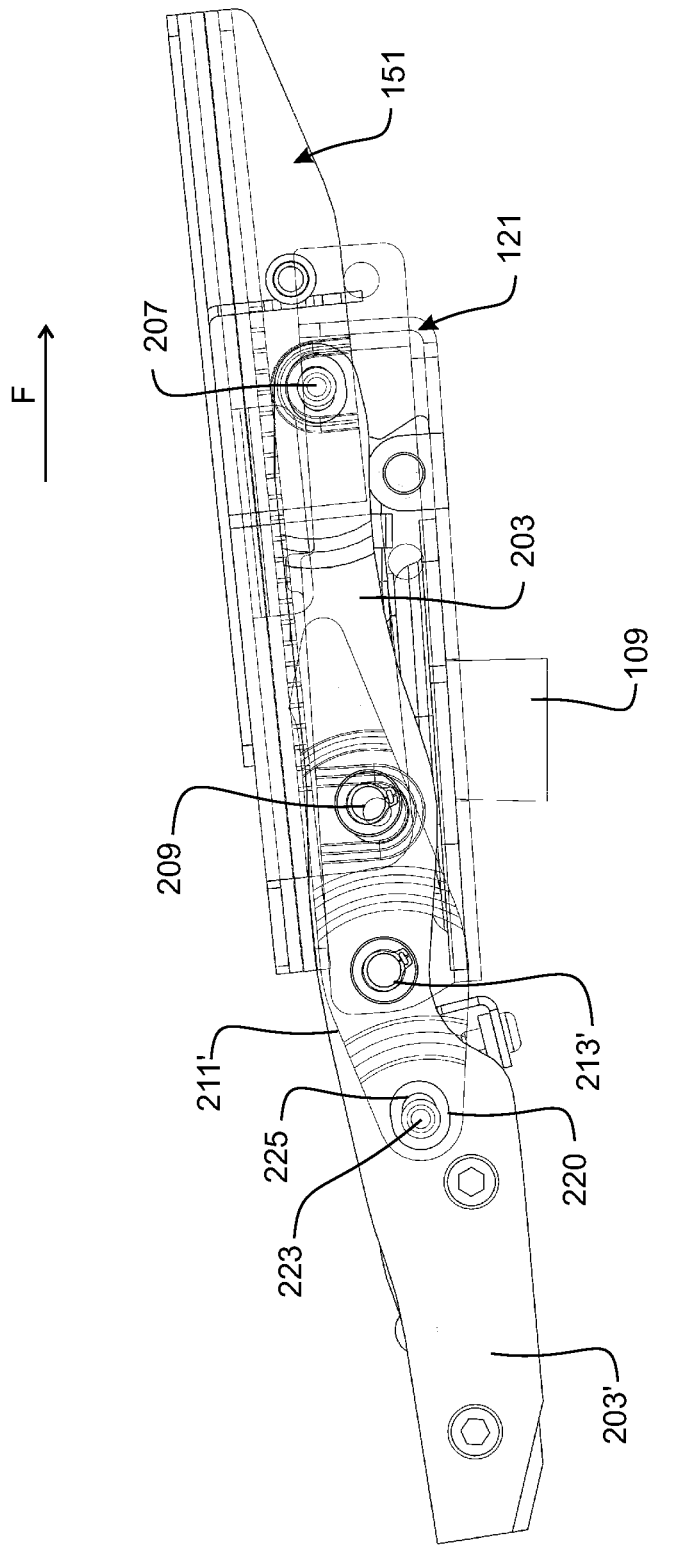
FIG. 21 is a view corresponding to FIG. 20, with the back portion in a partially reclined position.
Figure 22:
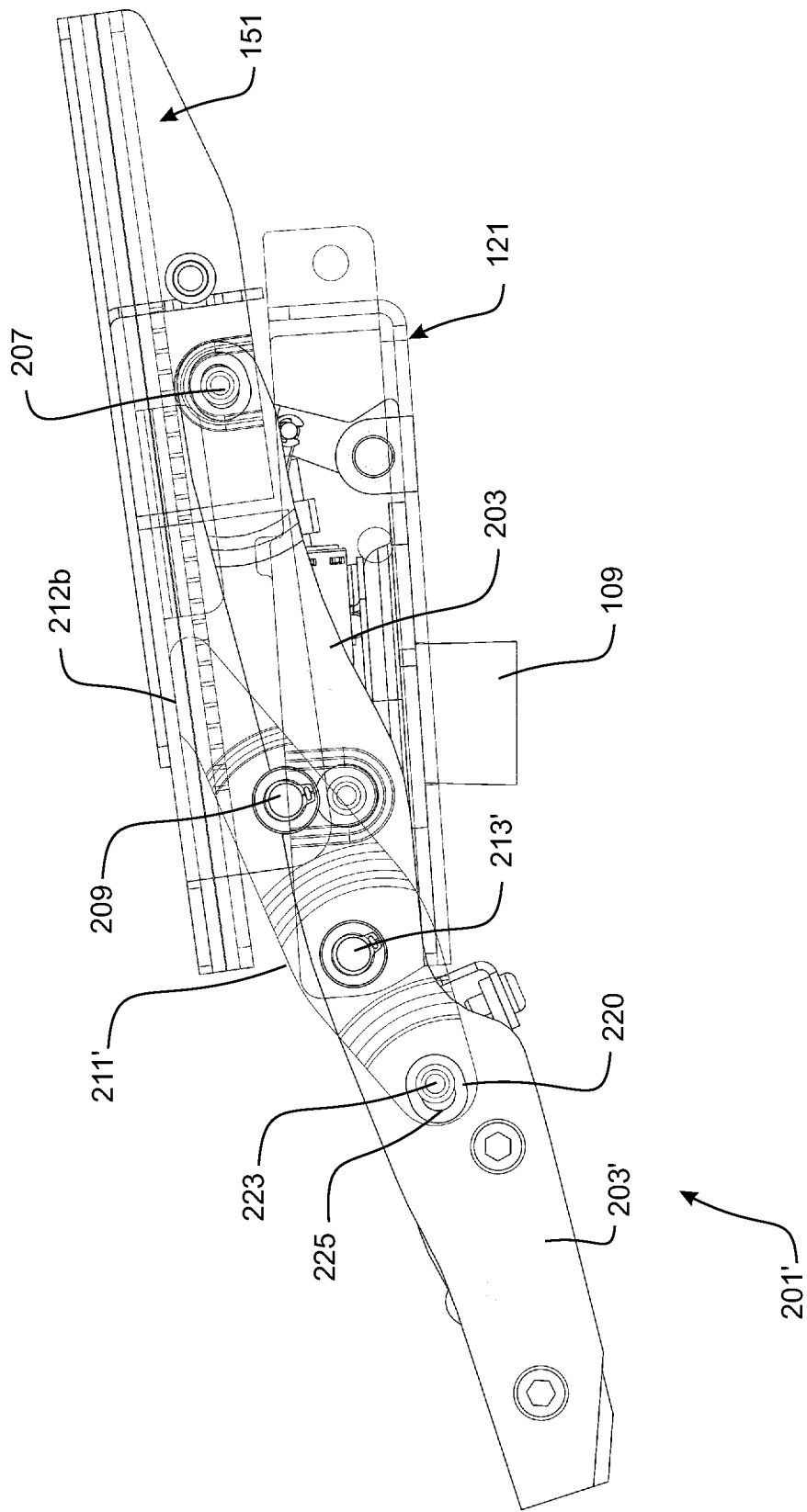
FIG. 22 is a view corresponding to FIGS. 20 and 21, with the back portion in a fully reclined position.

Preferably, the pivot and slide connection 220 comprises a pin 223 on the rocker arm 211' and a slot 225 in the back support arm 203', as shown in FIGS. 20 to 22. Preferably, between about 2 and about 3 mm, most preferably approximately 2.5 mm of sliding movement is provided by the pivot and slide connection 220. The amount of sliding movement provided by the pivot and slide connection 220 depends on the vertical position of the connection 220 relative to the back support arm 203' and pivot 213'. For a given fore-aft position of the pivot and slide connection 220, a lower position of the pivot and slide connection will require more sliding movement than a higher position. Alternatively, the sliding connection may comprise any other suitable sliding connection, for example, a roller rotatably mounted on the rocker arm 211' that is slidable along a surface of the back support arm 203'.

The recline mechanisms may comprise a single back support arm 203, 203', rocker arm 211, 211', and/or rocker link 215 or pivot and slide 220, which may be generally centrally mounted in the chair. Preferably, the chair comprises a pair of back support arms 203, 203', a pair of rocker arms 211, 211', and a corresponding pair of rocker links 215 or pivot/slides 220 that are spaced apart across a transverse width of the chair to provide stability to recline mechanism movement. The two back support arms 203, 203' may comprise a single integral member connected via a crossmember, with two forwardly extending arms, or may comprise two separate support arms both operatively connected to the back portion 501, 501'.

As shown in FIGS. 25 to 30 the transom 121 preferably comprises a pair of spaced apart side walls 227 and a base 229. The back support arms 203, 203' are preferably positioned inwardly of the transom side walls 227, and pivotally connected at pivot 213, 213' to a respective side wall 227. The rocker links 211, 211' are preferably positioned outwardly of the transom side walls.

FIGS. 15 to 17 and 20 to 22 show side views of the recline mechanism with the back portion 501, 501' upright, partly reclined and fully reclined. During recline, the seat portion 151 first moves upwardly and forward, until the rocker links 211, 211' are horizontal, and then moves upwardly and rearwardly. When the back portion 501, 501' is upright, the seat portion 151 is angled rearwardly 4°. An underside first surface 212a on a front end of the back support arm 203 abuts a portion of the transom 121 to provide an upright stop to define the upright position of the back portion.

As the back portion 501, 501' reclines and the seat portion 151 lifts, the rearward tilt of the seat increases, but at a lesser rate than the angular change of the back portion 501, 501'. The first surface 212a on the back support arm 203 moves out of contact with the transom 121 during recline. FIG. 17 shows the seat portion 151 when the back portion 501, 501' is fully reclined. In the fully reclined position, a second upper surface 212b on a front end of the rocker link 211, 211' abuts a surface on the seat portion 151 to provide a recline stop and define the maximum rearward recline of the back portion 501, 501'. In a preferred embodiment, the seat portion is rearwardly tilted about 4° when the back portion is in the upright position, and rearwardly tilted about 7.8° when the back portion is fully reclined.

It can be seen that the seat portion 151 preferably lifts upwardly and rearwardly and increases in rearward tilt angle, as the back portion 501, 501' is reclined. The lifting of the seat portion provides a 'weight-compensated' recline mechanism, meaning more force is required for a heavier seated occupant to recline the back portion than for a lighter seated occupant to do so. As shown in FIG. 14, the effective pivot point 221 of the seat portion relative to the transom 121 is a rearward distance RPD of about 374 mm behind the pivot connection 205 of the back portion to the transom, and is a vertical distance VPD of about 44.2 mm below that pivot connection 205. These dimensions are examples only, and may vary.

Due to the main back support arms 203, 203' extending forward under a major part of the seat portion 151 and connecting to a relatively forward portion of the seat portion, the primary lifting of the seat portion during recline of the back portion 501, 501' is a lifting of the forward portion of the seat portion. The rocker arms 211, 211' by their operative connection to the back support arms 203, 203' act as followers to the movement, and lift the rear portion of the seat portion.

The seat portion 151 comprises a seat support 161 and a seating surface 171 for supporting a seated occupant. In a preferred embodiment, the seating surface 171 is selectively moveable in a forward and rearward direction relative to the seat support 161 to selectively adjust seat depth relative to the back portion 501, 501'. The rocker arms 211, 211' and the back support arms 203, 203' are pivotally connected at pivots 207, 209 to the seat support 161. Alternatively, the seating surface 171 may be fixed to the seat support 161 and not depth adjustable. In the form shown, the seating surface 171 is a cushioned and upholstered surface. Alternatively, it may be a compliant slotted seat panel, or a combination of a slotted seat panel and a cushioned and upholstered surface for example.

The recline mechanism 201, 201' is a low profile mechanism. As shown in FIG. 20, the vertical height VHRM between top and bottom surfaces of the recline mechanism is preferably about 40 mm. As shown in FIGS. 1 to 11, an underside of the seat portion may comprise a shell 181 with a central recess. A substantial portion of the recline mechanism including the transom 121, is housed within the central recess when the back portion of the chair is upright.

Figure 6:
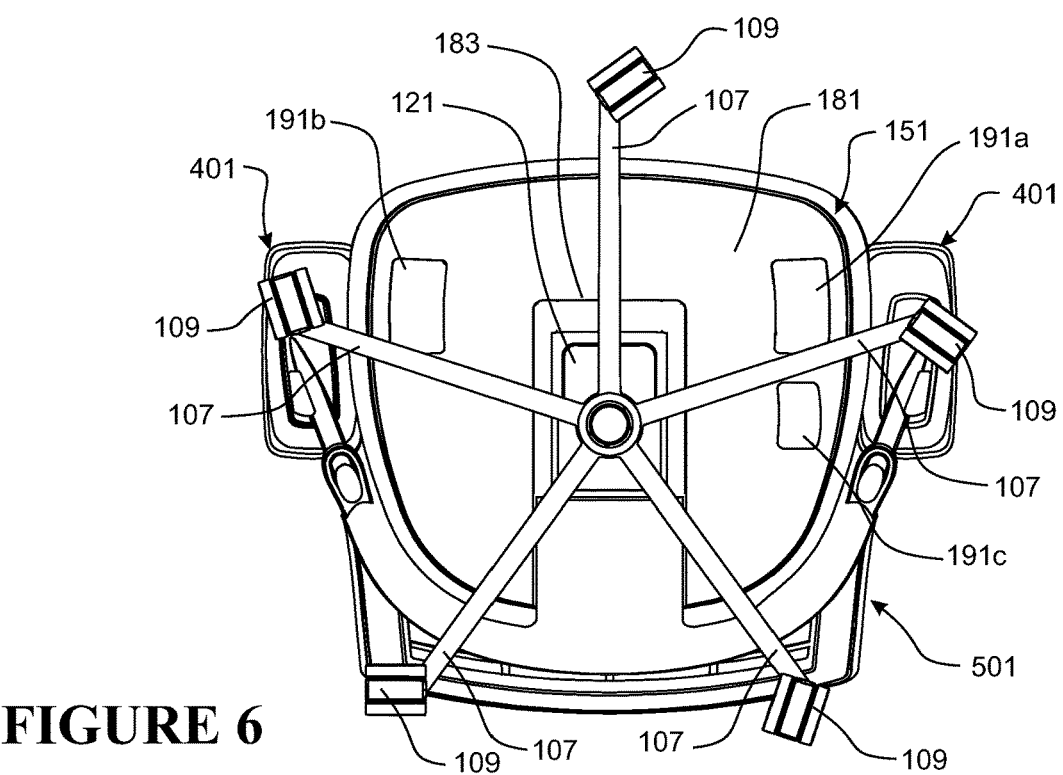
FIG. 6 is a bottom view of the chair of FIGS. 1 to 5.
Figure 9:
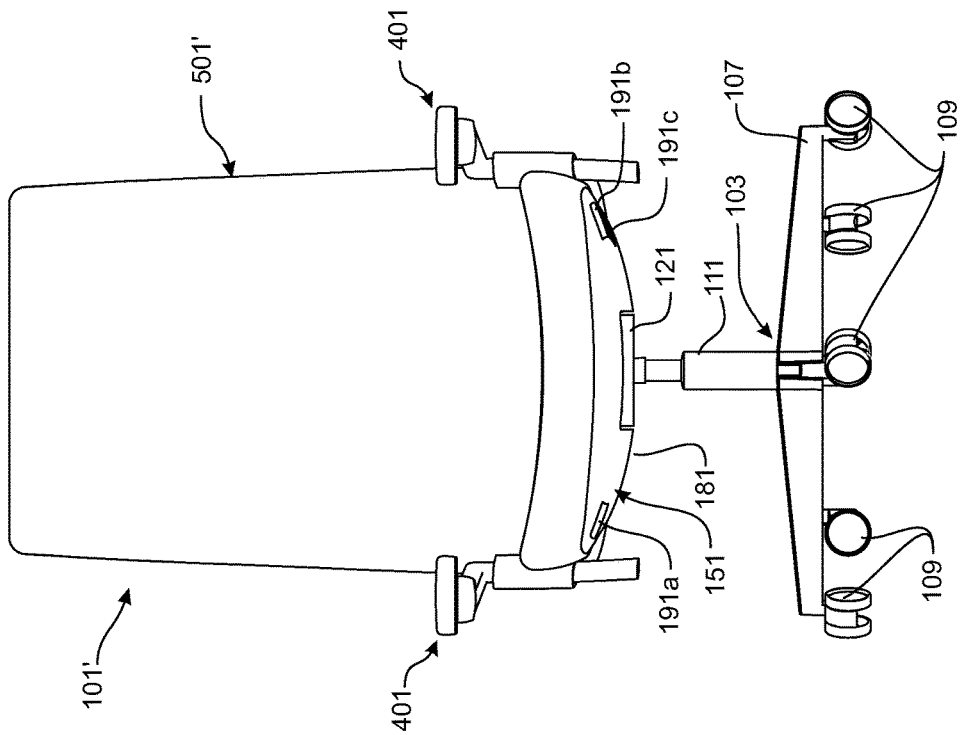
FIG. 9 is a front elevation of the chair of FIG. 8.
Figure 8:
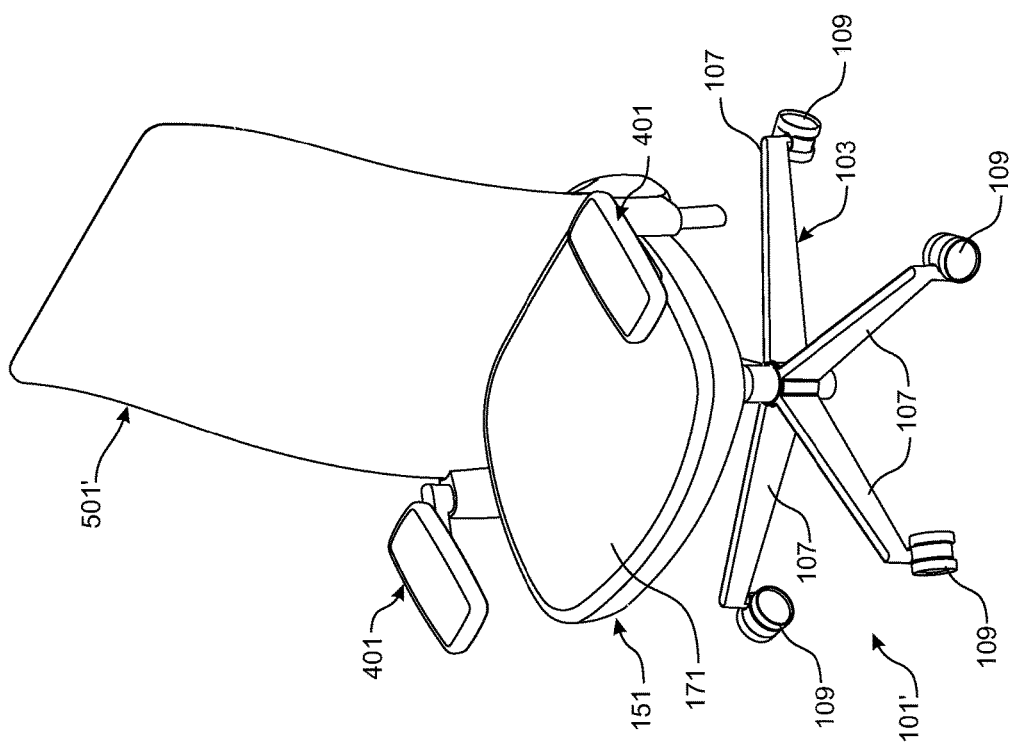
FIG. 8 is a perspective view of an alternative preferred form chair having a high back.
Figure 11:
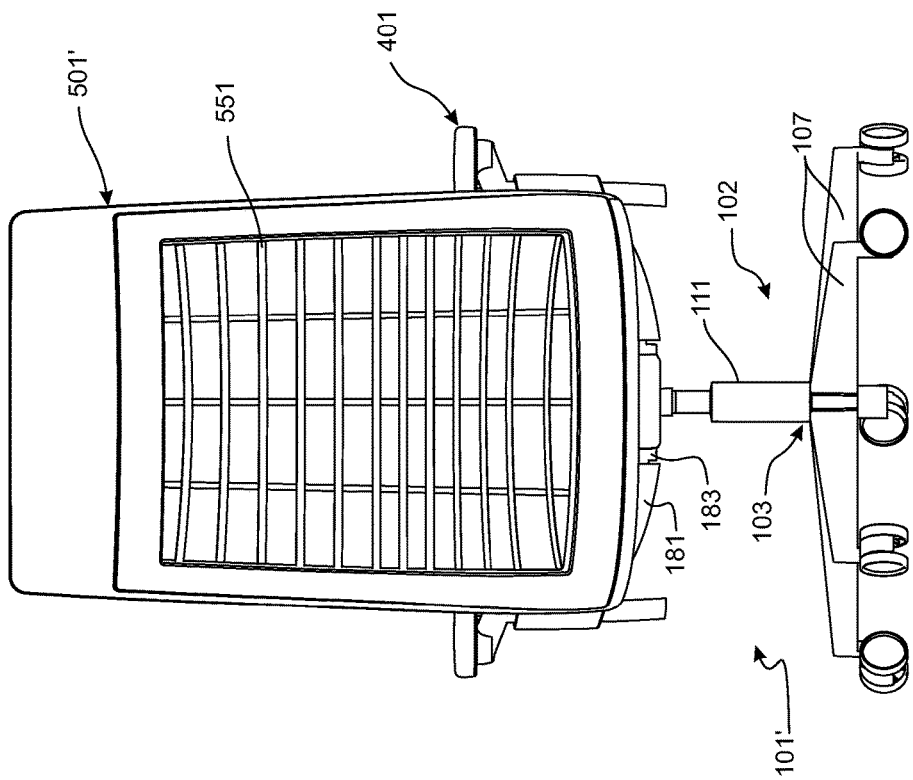
FIG. 11 is a rear elevation of the chair of FIGS. 8 to 10.
Figure 10:
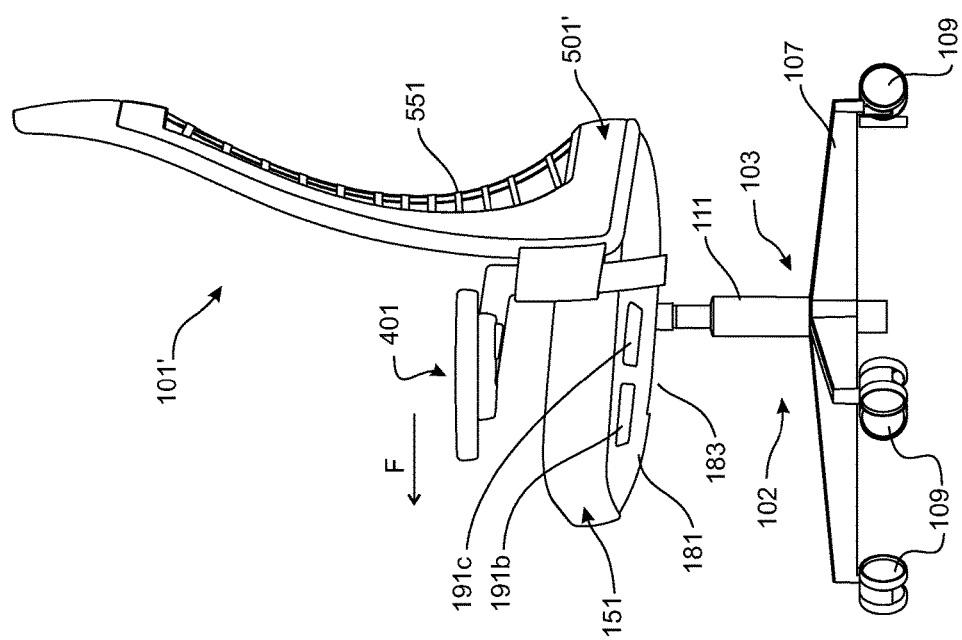
FIG. 10 is a side elevation of the chair of FIGS. 8 and 9.

As shown in FIGS. 6, 9 and 10, three actuators 191a, 191b, 191c are flush-mounted in the underside shell 181, and are provided to enable the occupant to adjust features of the chair by moving the actuators. In one embodiment, the front actuator 191a on the left hand side of the chair adjusts the recline resistance (described in more detail below), the actuator 191b on the right hand side of the chair adjusts the height and depth of the seating surface 171, and the rear actuator 191c on the left hand side of the chair actuates an upright lock 251 to prevent recline of the back portion.

Figure 23:
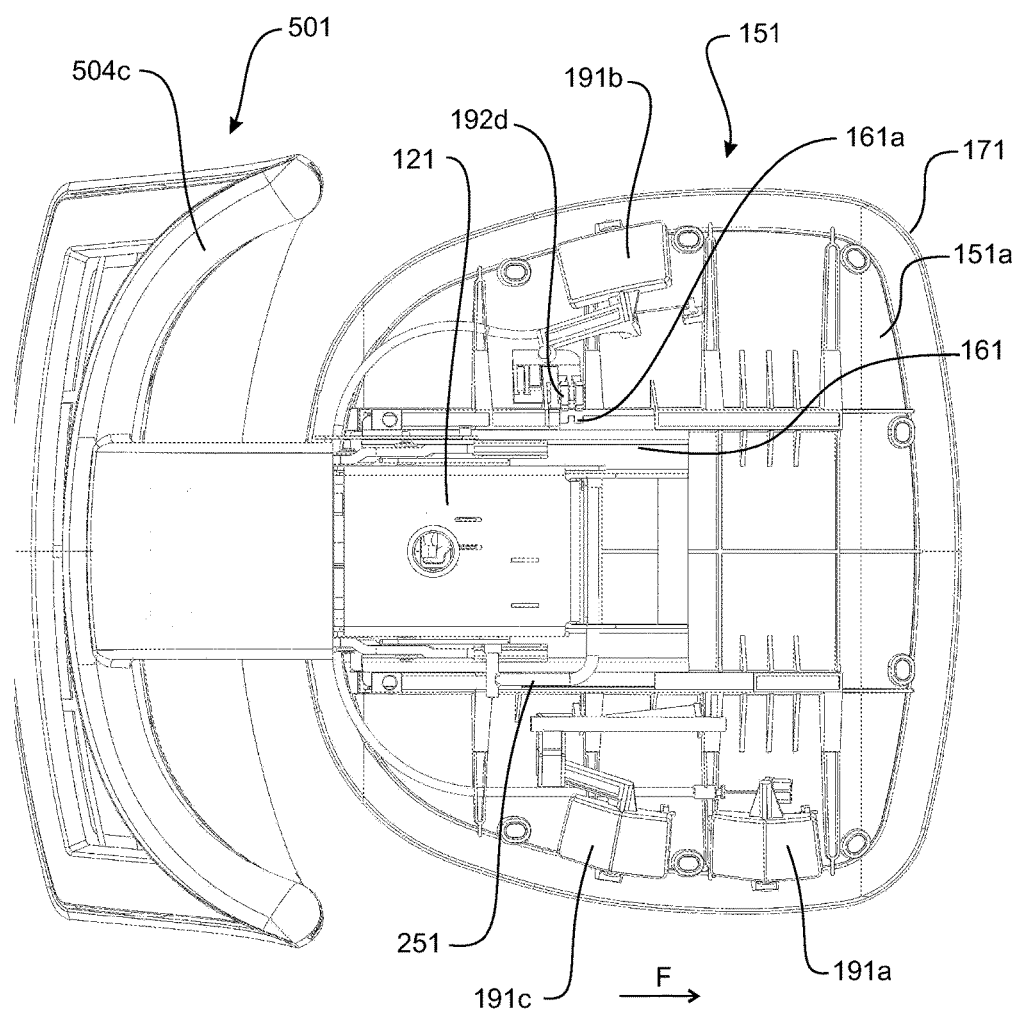
FIG. 23 is an underside plan view of one of the preferred form chairs, showing the seat portion in a forwardmost depth adjusted position.
Figure 24:
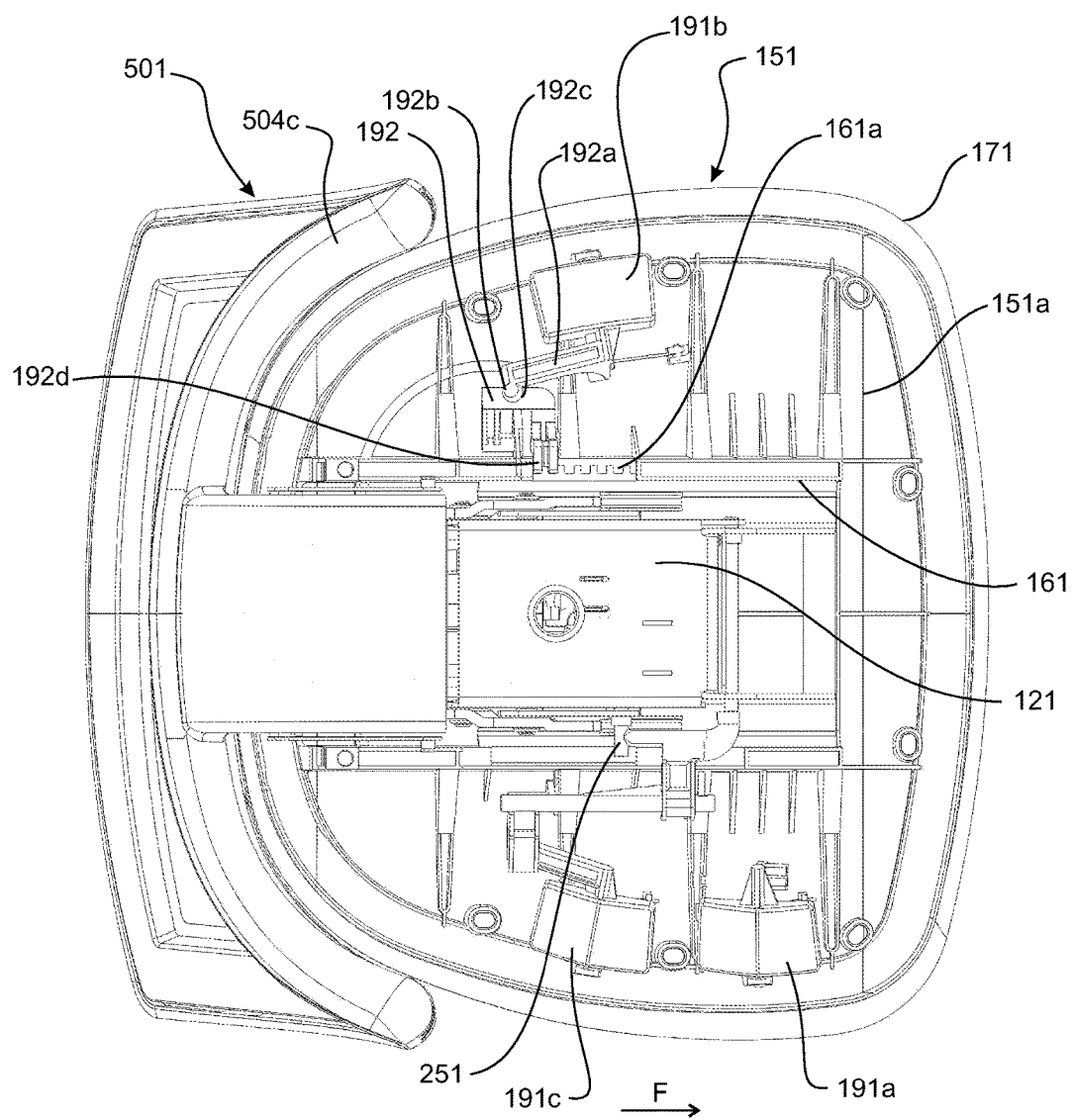
FIG. 24 is an underside plan view similar to FIG. 23, but showing the seat portion in a rearmost depth adjusted position.
Figure 25:
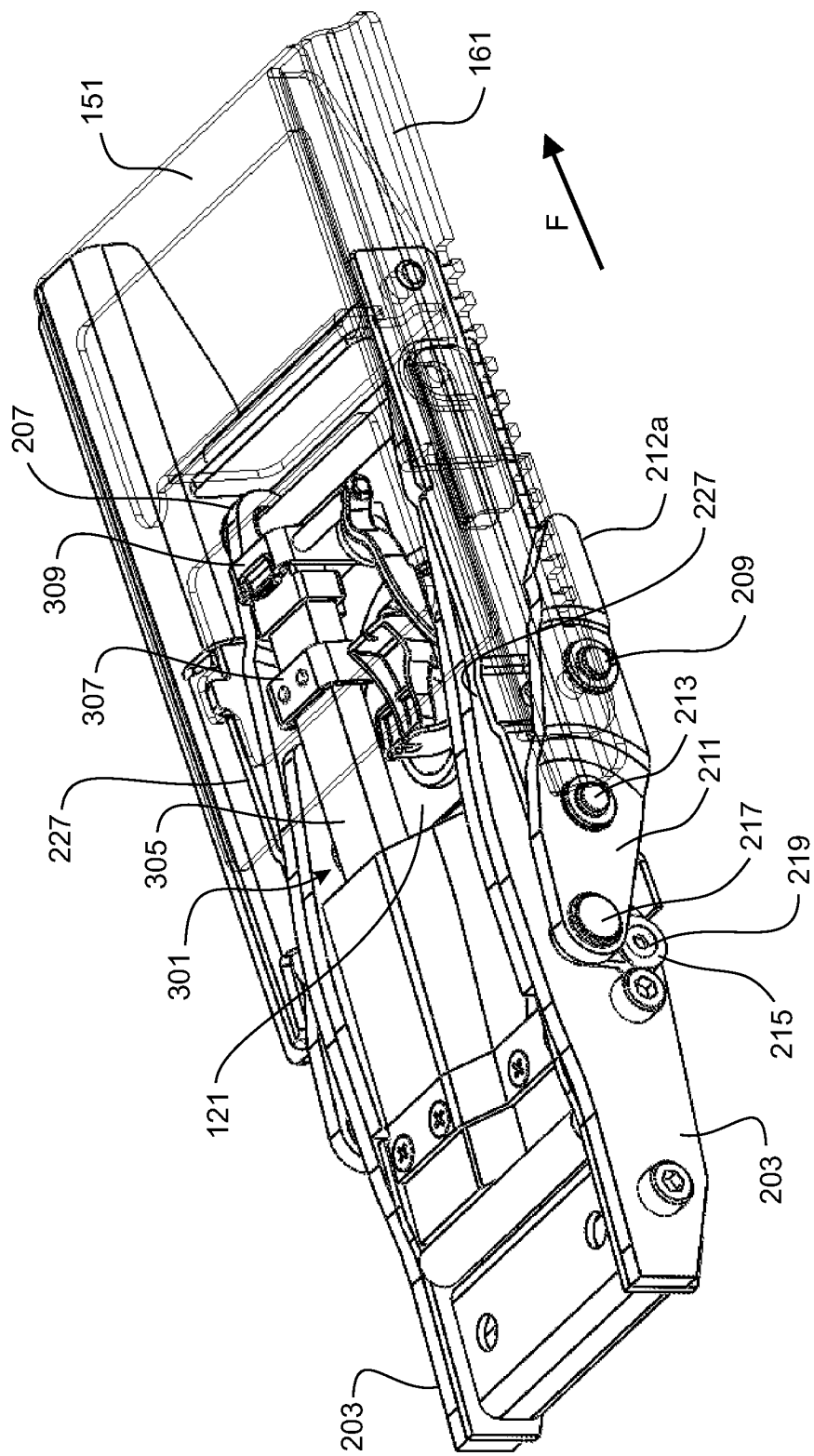
FIG. 25 is a perspective view showing a first preferred form recline resistance mechanism (RRM) of the recline mechanism of FIGS. 12 to 17 (but which also has application, for example, in the recline mechanism of 18 to 22), with the back portion upright and the RRM in a high resistance configuration.
Figure 26:
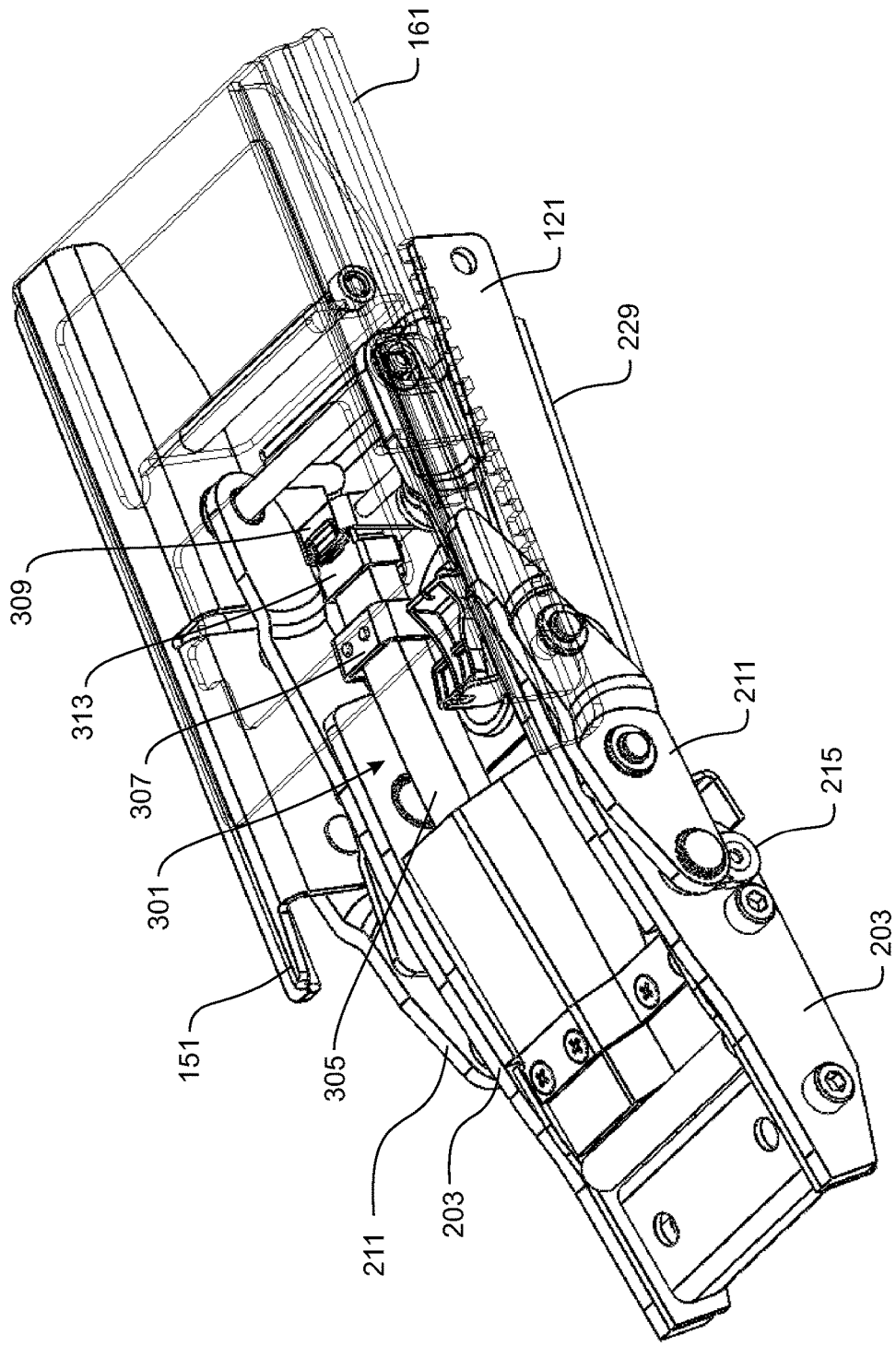
FIG. 26 is a view corresponding to FIG. 25, but with the back portion reclined.

FIGS. 23 and 24 show details of the seat depth mounting on support 161. Transversely spaced portions of the seat panel 151a capture corresponding portions of the support 161, to slidably mount the panel 151a on the support. The support is provided with a rack comprising a plurality of spaced slots 161a. A catch body 192 is mounted to the panel 151a, and has teeth 192d that are movable transversely into and out of engagement with the slots 161a. When engaged (FIG. 24), the depth position of the seating surface 171 is locked relative to the support 161. When disengaged (FIG. 23), the depth position of the seating surface 171 can be adjusted by a chair occupant. To adjust the depth, the occupant moves the actuator 191b in one direction from neutral which, via coupling link 192a and its ball 192b and socket 192c connection with the catch body 192, moves the catch body out of engagement from the track connection with the rack. Upon release of the actuator, a biasing force will cause the catch body 192 to reengage with the rack to lock the seating surface in one of a plurality of depth adjusted positions. Movement of the actuator in the other direction from neutral will release the gas spring 111, enabling the height of the seat portion 151 to be adjusted.

As shown in FIG. 27, the chair is preferably provided with a generally L-shaped lock member 251 that is operatively connected to the seat portion 151, and is selectively transversely slideable relative to the seat portion 151 and the transom 121. The elongate portion 251a of the lock member 251 extends through an aperture 253 in the seat portion, and is selectively engageable in aperture 255 of the transom 121. A shorter portion 251b of the lock member 251 extends through an aperture in the seat portion and engages an aperture 255a on the other side of the transom 121 to the aperture 255, when the elongate portion is engaged. When the lock member 251 is engaged in the apertures 255a, 255, the seat portion 151 and back portion 501, 501' are locked in the upright position. When disengaged from the apertures 255a, 255, the seat portion 151 and back portion 501, 501' can be reclined.

Recline Resistance Mechanism

The chair 101, 101' additionally comprises a recline resistance mechanism 301 or 302 to resist movement of the back portion 501, 501' toward the reclined position. The amount of resistance provided by the recline resistance mechanism 301 or 302 is selectively adjustable.

FIGS. 25 to 32(b) show the first preferred form recline resistance mechanism 301.

The recline resistance mechanism 301 comprises a first retainer 307, a resistance device 305, and a movable second retainer 309. The resistance device comprises a leaf spring 305 operatively fixed at one end to the back portion 501, 501' by being connected to the back support arm 203. The first retainer 307 is attached to the transom 121 and engages an upper surface of the leaf spring 305 at least when the back portion 501, 501' is in the upright position. In the upright position, surface 212a of the back support arm 203 engages a surface of the transom 121 and the first retainer 307 applies a downward force to the leaf spring, preloading the leaf spring 305 and biasing the back portion 501, 501' upright.

Figure 28:
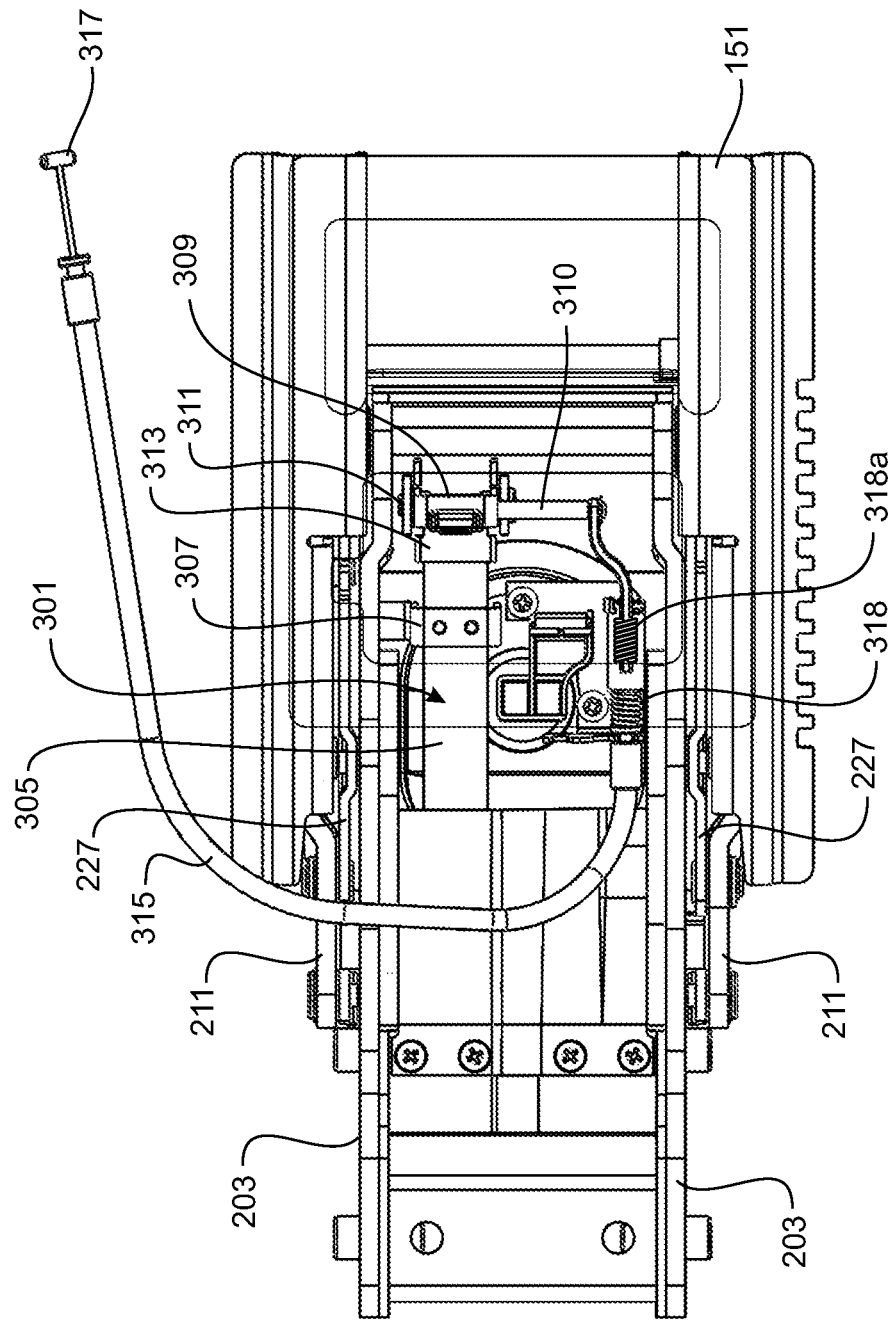
FIG. 28 is a plan view of the RRM of FIG. 25.
Figure 29:
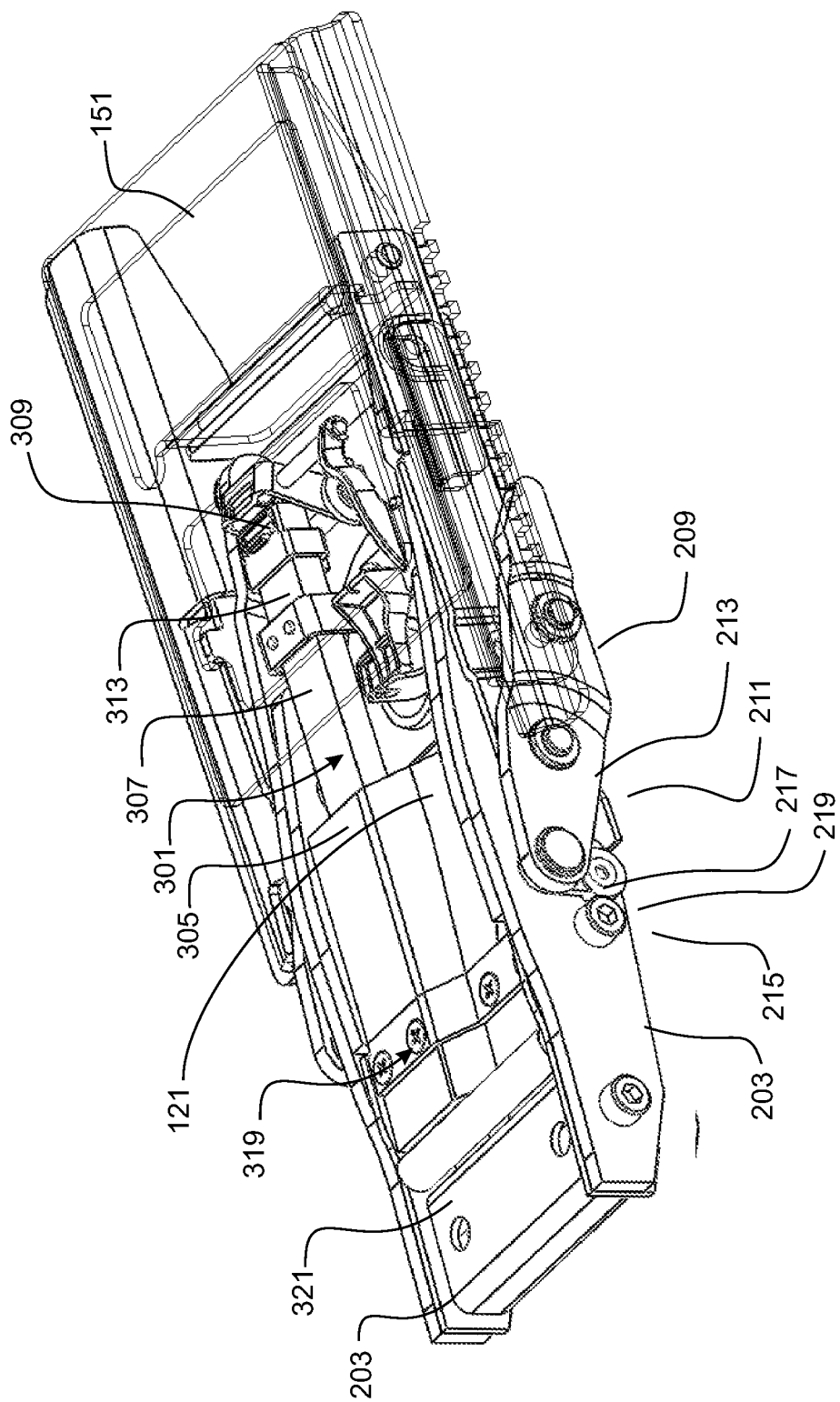
FIG. 29 is a view corresponding to FIG. 25, but with the RRM in a low resistance configuration.
Figure 30:
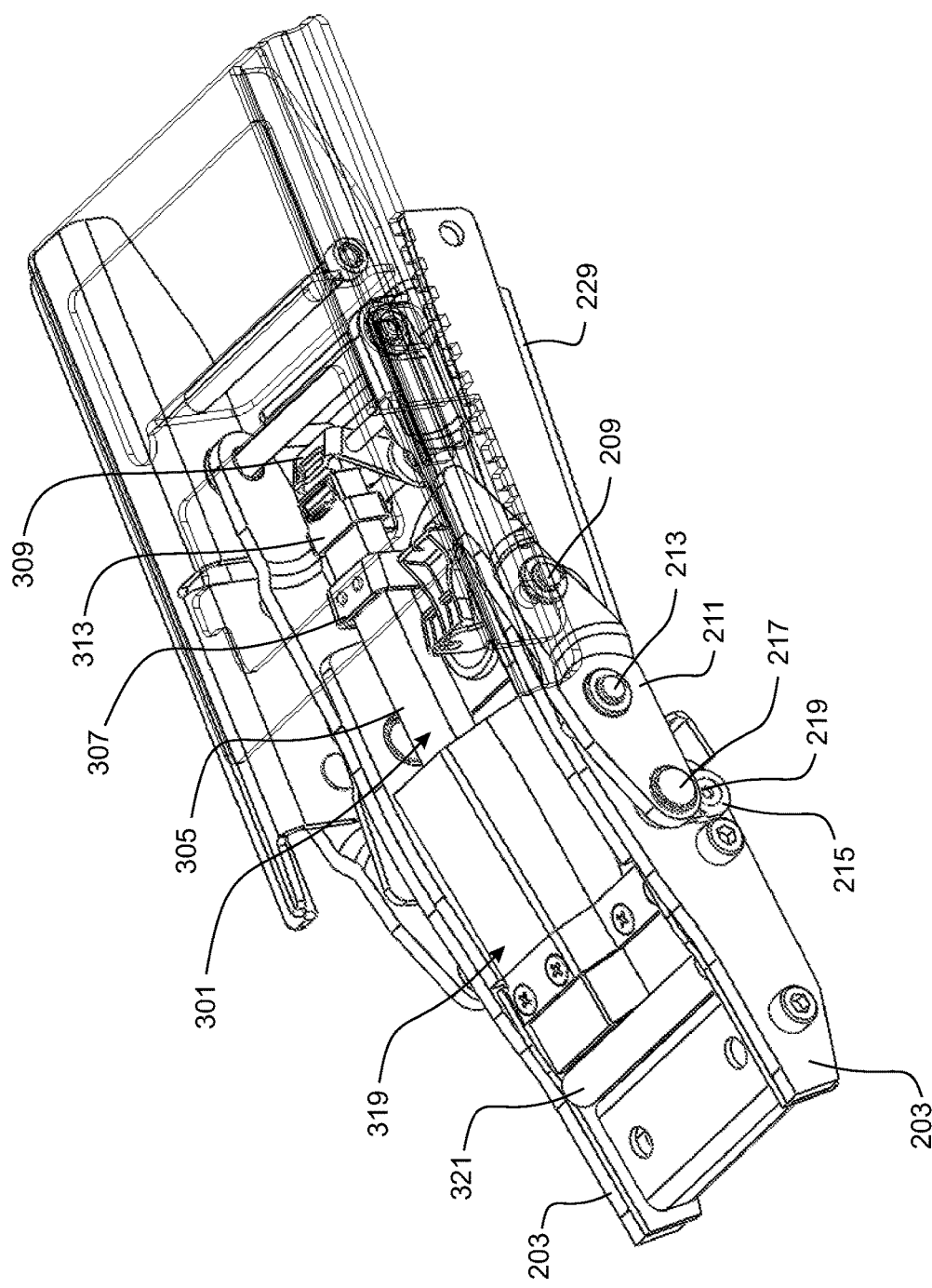
FIG. 30 is a view corresponding to FIG. 29, with the back portion reclined.
Figure 31:
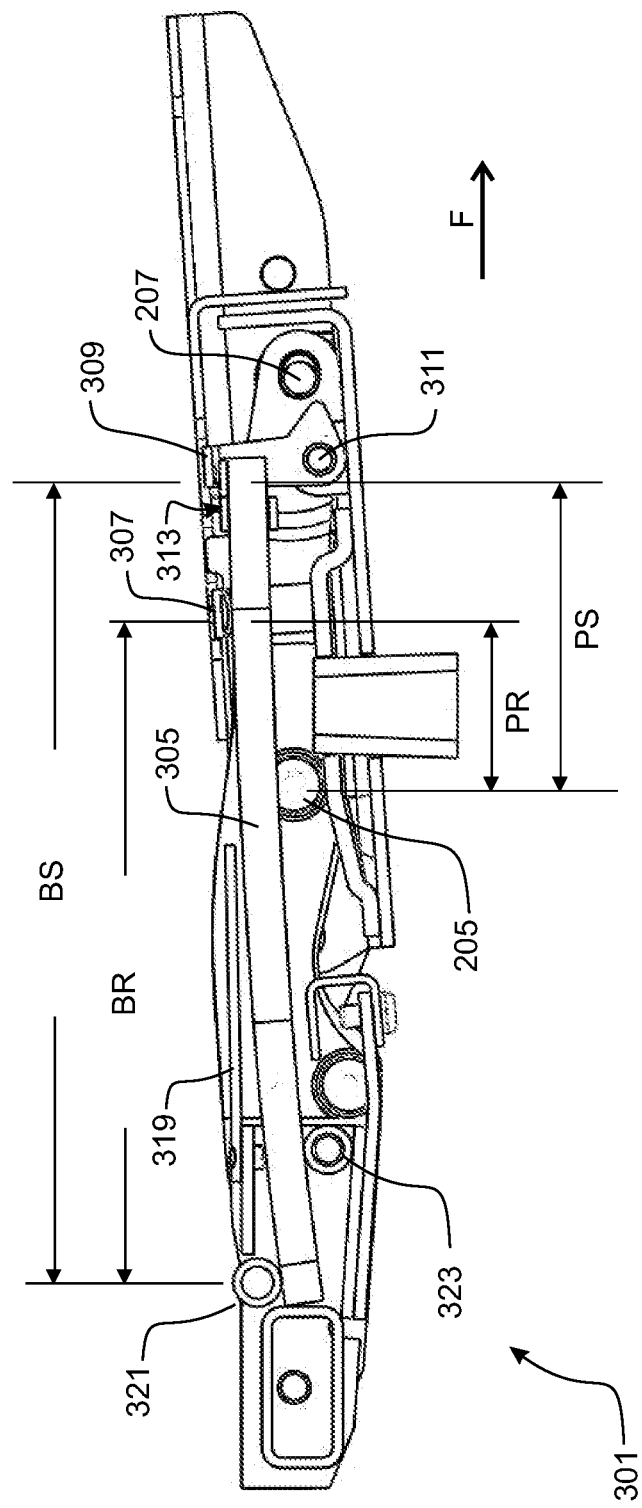
FIG. 31 is a section view of the arrangement of FIG. 25.
Figure 32A:
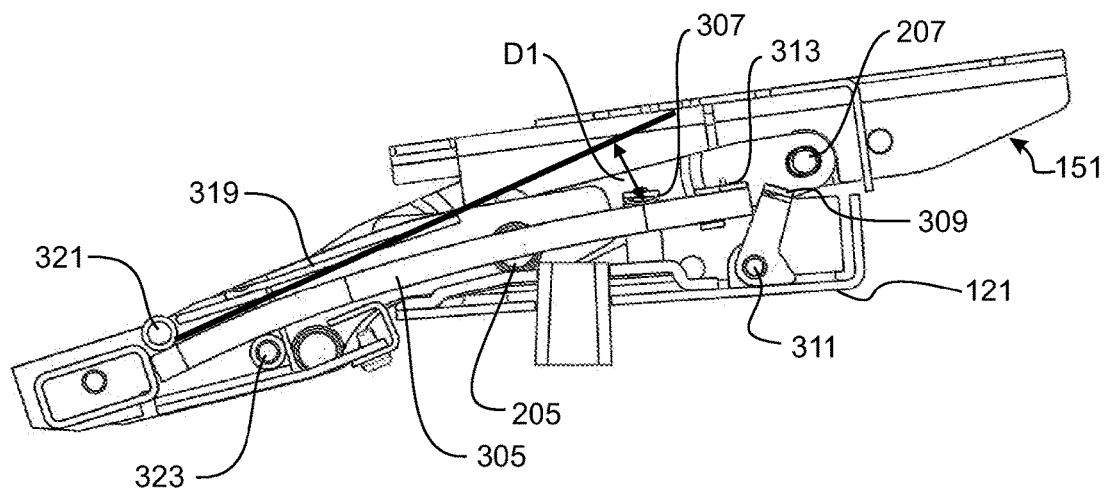
FIG. 32(*a*) is a section view of the arrangement of FIG. 30.

The second retainer 309 comprises a saddle that is pivotally mounted to the transom 121 and selectively pivotable between a disengaged position (FIGS. 29, 30, 32(a)) and an engaged position (FIGS. 25, 26, 28, 31, 32(b)). When the second retainer 309 is in the disengaged position, it is out of contact with the leaf spring throughout any movement of the leaf spring 305 during recline of the back portion 501, 501'. In that disengaged configuration, when the back portion 501 is reclined relative to the transom, the leaf spring deflects to resist the recline. The leaf spring reacts against the transom at the first retainer 307 to provide the deflection, as shown in FIG. 32(a). When the second retainer 309 is in the engaged position, it is positioned over a top surface of the leaf spring 305, forward of the first retainer 307. The second retainer 309 does not apply a downward force to, or preload, the leaf spring 305 when the back portion 501, 501' is in the upright position. Preferably, when the back portion 501, 501' is in the upright position, the second retainer 309 does not contact the top surface of the leaf spring 305.

Figure 32B:
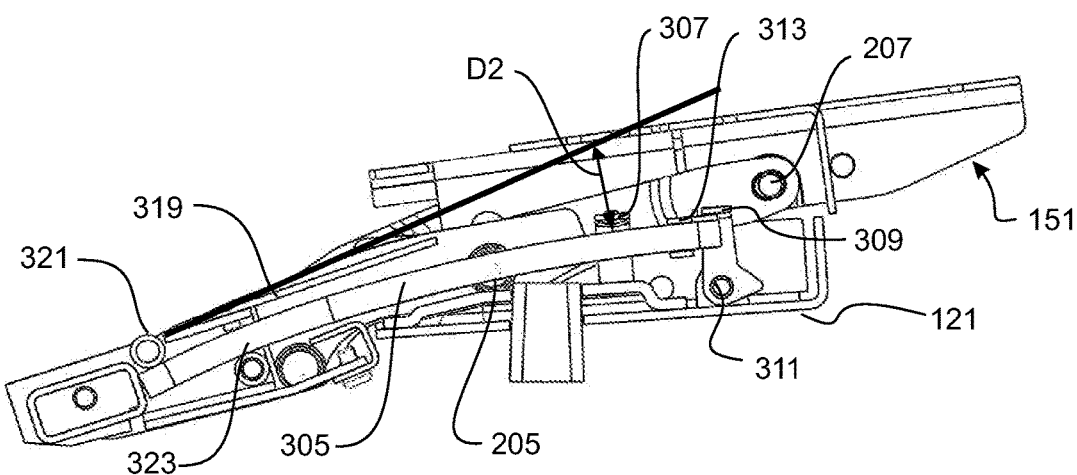
Figure 33:
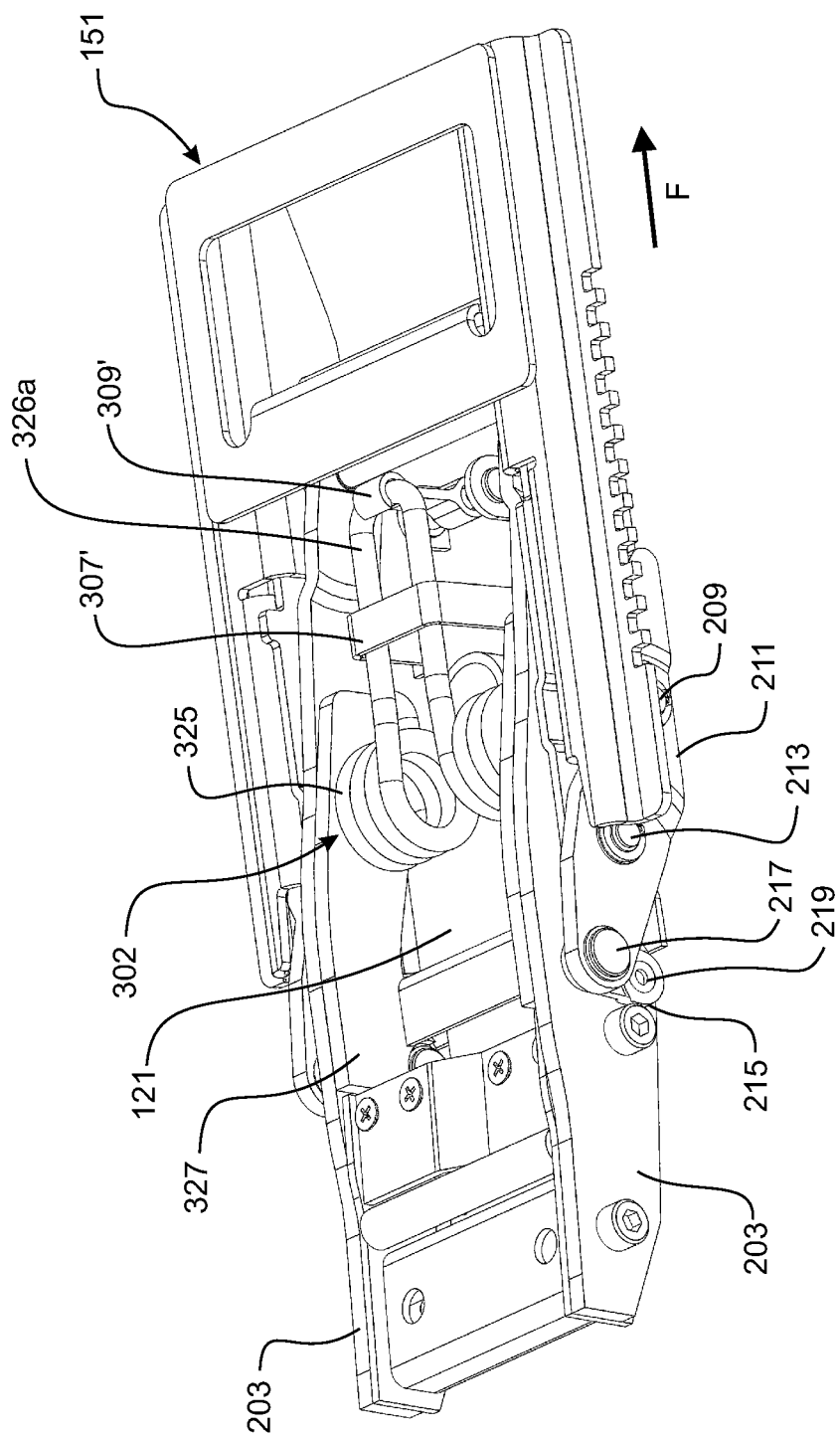
FIG. 33 is a perspective view showing a second preferred form RRM of the recline mechanism of FIGS. 12 to 17 (but which also has application, for example, in the recline mechanism of 18 to 22), with the back portion upright and the RRM in a high resistance configuration.
Figure 34:
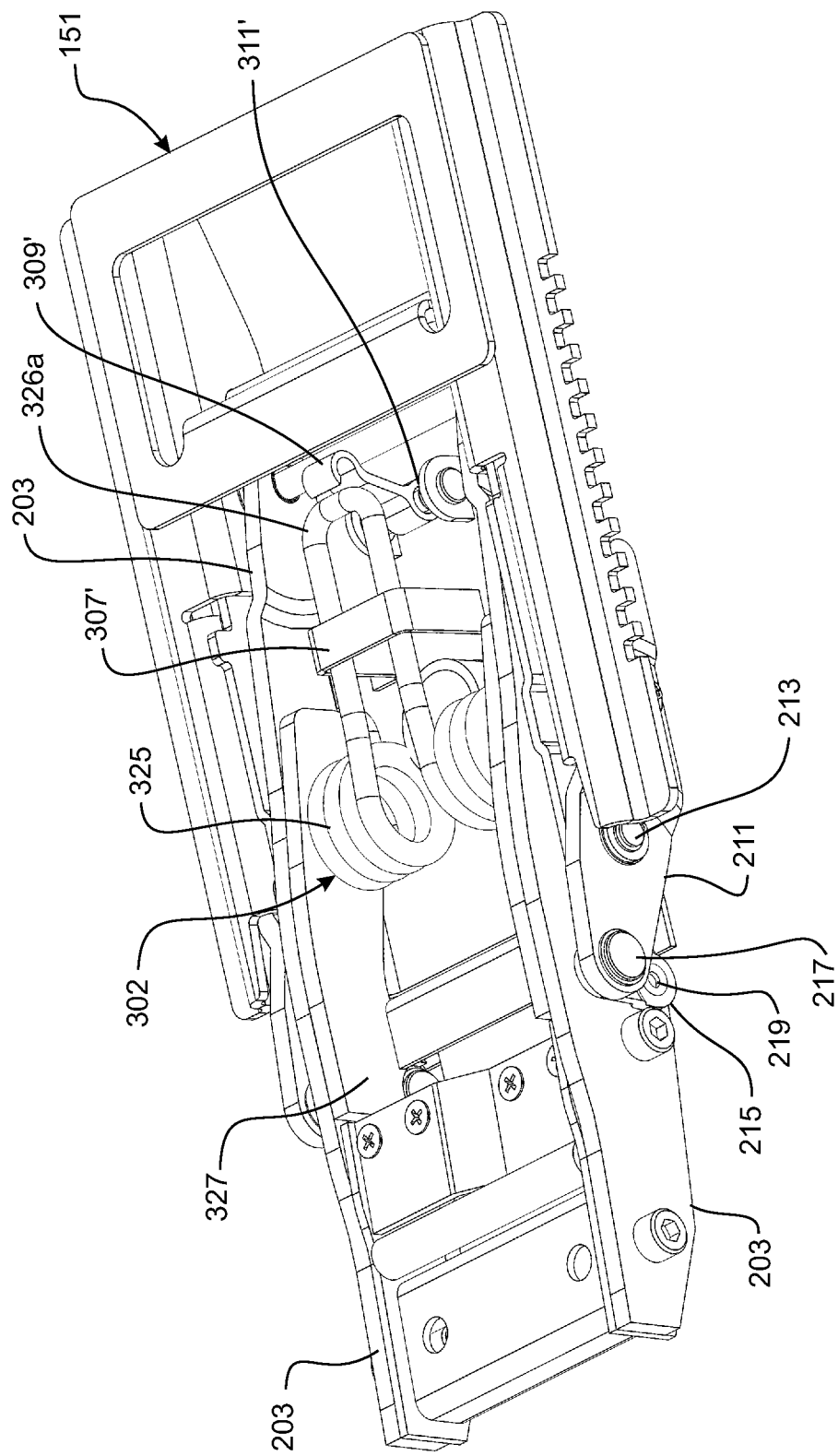
FIG. 34 is a view corresponding to FIG. 33, but with the RRM in a low resistance configuration.
Figure 35:
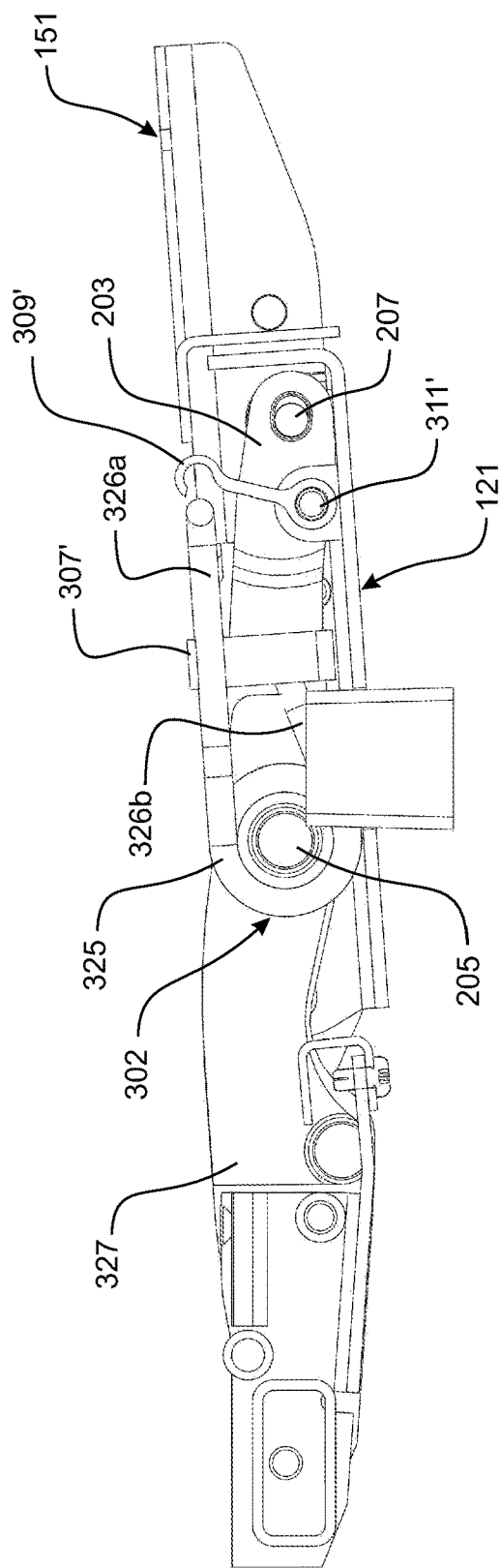
FIG. 35 is a section view of the arrangement of FIG. 34.
Figure 36:
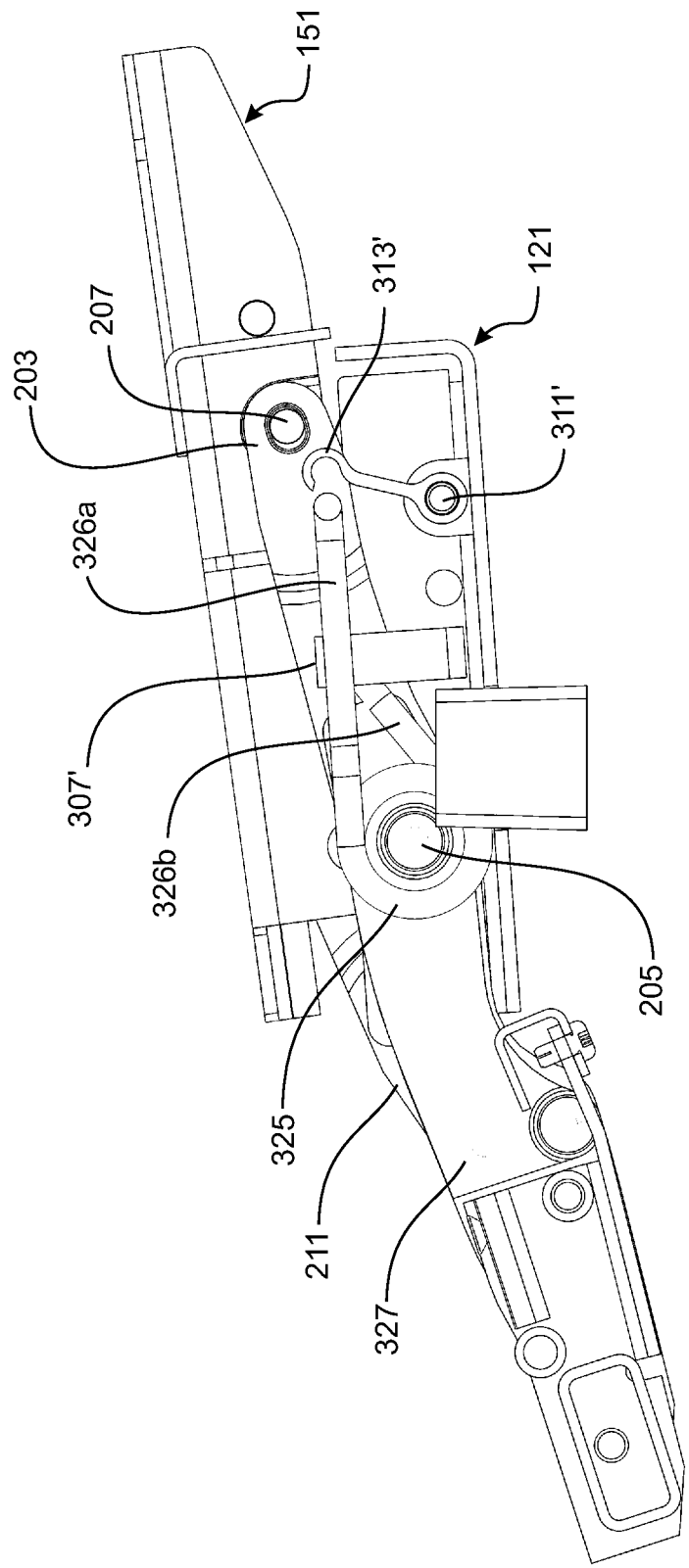
FIG. 36 is the view of FIG. 34, but with the back portion reclined.
Figure 39:
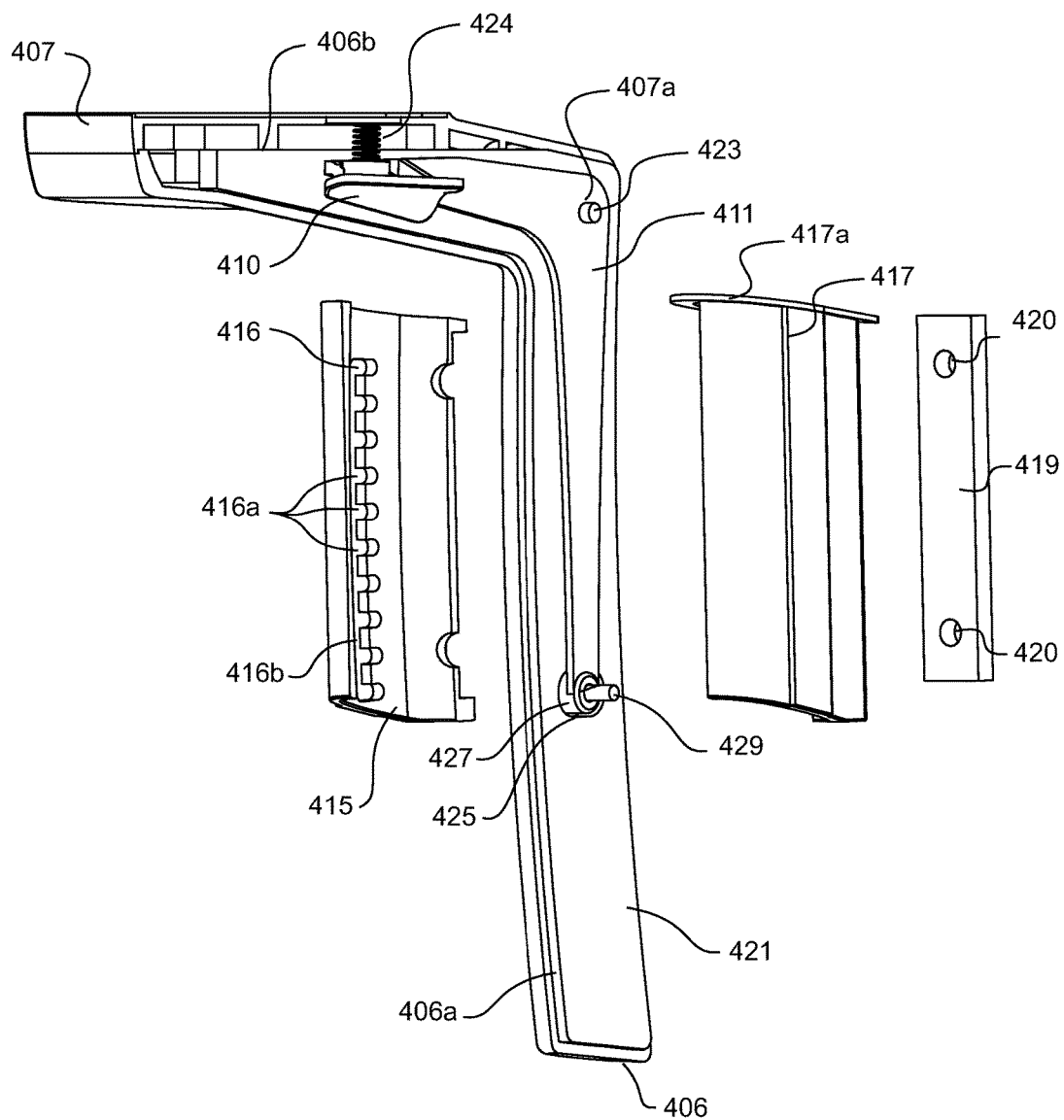
FIG. 39 is a partial exploded view showing the height adjustment mechanism of the arm support assembly of FIGS. 37 and 38 with the arm pad removed.
Figure 40:
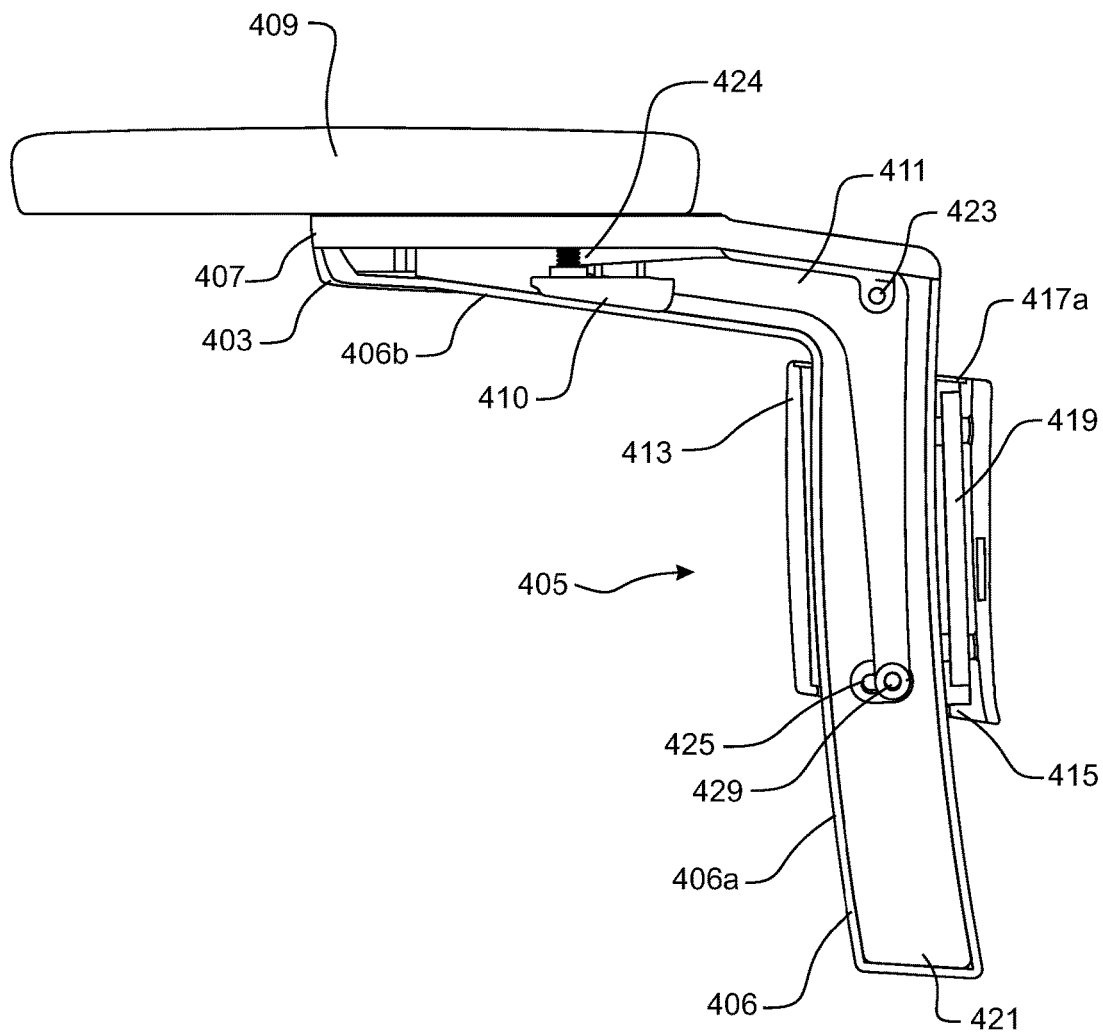
FIG. 40 is a section view of the arm support assembly of FIGS. 37 to 39 with the arm pad shown and showing the arm body in the sleeve.

Preferably, when engaged, the second retainer 309 comes into contact with the spring 305 after between about 3° and 5° of recline of the back portion. When the back portion 501, 501' is reclined relative to the transom with the second retainer 309 engaged, the leaf spring 305 deflects to resist the recline and, beyond about 3° to 5° of recline, reacts against the transom 121 at the second retainer 309. The leaf spring 305 moves out of contact and away from the first retainer 307 as the back portion 501, 501' reclines, as shown in FIG. 32(b).

As shown in FIG. 27, a housing bracket 319 operatively connects the back portion 501, 501' to the recline mechanism 201 and the recline resistance mechanism 301. A bottom portion of the back portion 501, 501' is fixed to this housing bracket 319, by fasteners such as bolts for example. The housing bracket 319 is also fixed to the back support arm 203 by fasteners such as bolts. The connecting link 215 of the recline mechanism is pivotally connected to the back support arm 203 at pivot 219. One end of the leaf spring 305 is positioned within the housing bracket 319 and located in a forward/rearward direction relative to the housing bracket with a pin 320. The housing bracket 319 comprises two spaced apart transverse rods positioned within the housing. A first rod 323 is positioned towards a lower, front portion of the housing bracket 319, and a second rod 321 is positioned above and rear of the first rod 323. The leaf spring extends into the housing bracket, over the first rod 323 and under the second rod 321 such that the first and second rods effectively hold the leaf spring in cantilevered relation to the housing bracket 319 and thereby to the back portion 501, 501'. The rods 321, 323 react against the recline force of the spring as the back portion 501, 501' is reclined. The rods 321, 323 increase the effective length of the spring 305 compared to a straight cantilevered connection of the spring 305 to the housing 319, and also reduce stress concentrations on the spring adjacent the housing.

In a preferred embodiment, the leaf spring 305 comprises a composite material, for example unidirectional glass fibre-reinforced epoxy composite. Alternatively, the leaf spring may comprise spring steel for example.

It can be seen in FIG. 31 that the leaf spring 305 has an effective length BR when only the first retainer 307 is engaged, and a longer effective length BS when the second retainer 309 is engaged (and the back portion 501, 501' is being reclined). The leaf spring 305 also has a first reaction length PR between the main pivot 205 of the back portion 501, 501' to the main transom 121 when only the first retainer 307 is engaged, and a second longer reaction length PS when the second retainer 309 is engaged (and the back portion 501, 501' is being reclined).

Referring now to FIGS. 32(a) and 32(b), when only the first retainer 307 is engaged, the spring deflects by a first amount D1 and the back portion is reclined, whereas with the second retainer engaged, the same point of the leaf spring 305 deflects a larger second amount D2. The result is that with the second retainer 309 engaged, the spring's effective length, reaction length, and amount of deflection are all greater during recline of the back portion, than when only the first retainer is engaged. Because the effective length of the leaf spring 305 is longer with the second retainer 309 engaged, that provides a lower spring rate than with only the first retainer 307 engaged. However, the longer reaction length PS and greater spring deflection D2 overcome the lower spring rate of the effectively longer spring.

Because the first retainer 307 preloads the spring, and the second retainer 309 does not contact the spring when it is brought into the engaged position and the back portion 501, 501' is upright, no force on the spring 305 needs to be overcome to adjust the position of the second retainer 309.

As shown schematically in FIG. 28 for example, the second retainer 309 is adjusted by a Bowden cable 315. The cable has a cable housing and an inner cable portion that is movable relative to the housing. The inner portion 317 is coupled to an actuator 191a on the underside of the seat portion for use by the seated occupant. When the occupant moves the actuator with their hand, that causes movement of the inner portion of the cable 317. That will cause movement of the other end of the inner portion of the cable, and associated pivoting of the second retainer 309 into or out of engagement with the leaf spring 305. The free end of the leaf spring 305 comprises a retainer catch 313 that latches the second retainer 309 when the second retainer is in the engaged position and the back portion 501, 501' is reclined. When the second retainer 309 is engaged with the leaf spring 305, the second retainer is able to pivot relative to the transom to rotate with the end of the leaf spring as the back portion 501, 501' is reclined. The retainer catch 313 prevents the second retainer from inadvertently pivoting out of engagement with the leaf spring 305 during recline of the back portion 501, 501'.

As can be seen from FIGS. 32(a) and 32(b), if the back portion 501, 501' of the chair is reclined when the second retainer 309 is in the disengaged position, and the user attempts to move the second retainer 309 into the engaged position of FIG. 32(b), the second retainer 309 would impact on the end of the raised leaf spring 305. Similarly, if the user attempts to move the second retainer 309 out of engagement with the leaf spring 305 when the back portion 501, 501' of the chair is reclined, the force applied by the leaf spring 305 against the second retainer 309 would be too high to allow disengagement of the second retainer 309 from the spring. Accordingly, as shown schematically in FIG. 28, the cable includes a first biasing device 318 such as a coil spring, which enables the occupant to pre-set the second retainer 309 into or out of engagement with the leaf spring 305 when the back portion 501, 501' is reclined, and which will cause the adjustment to occur only once the back portion has been returned to the upright position and the second retainer 309 can engage or disengage from the leaf spring 305. This is achieved by way of a second biasing device such as a coil spring 318a that is provided on a portion of the cable 315.

The second biasing device 318a is stiffer than the first biasing device 318 and in normal use, when the retainer is engaged or disengaged, the second biasing device 318a is uncompressed. When the second retainer 309 is disengaged and the back portion is reclined, if the occupant pre-sets the second retainer 309 into engagement with the leaf spring 305, the second retainer will try to engage the leaf spring but will not be able to pivot into position due to contact with the end of the leaf spring. Instead the second biasing device 318a will compress and when the chair is returned to upright the second biasing device 318a will pull the second retainer 309 into engagement with the leaf spring 305. Similarly, when the second retainer 309 is engaged with the leaf spring 305 and the back portion is reclined, if the occupant pre-sets the second retainer 309 to disengage the leaf spring 305, the second retainer will try to disengage but will not be able to pivot out of engagement. Instead the cable 315 will become slack. When the chair is returned to upright the first biasing device 318 will push the second retainer 309 out of engagement with the leaf spring 305.

The above description describes one preferred form of the recline resistance mechanism 301 only. In an alternative embodiment, rather than being pivotally connected to the transom 121, the second retainer 309 may be slidable relative to the leaf spring 305 to alter the reaction point of the spring 305 against the transom 121. In such an embodiment, when the back portion 501, 501' is in the generally upright position, the second retainer 309 would be freely slidable relative to the spring without altering the preload on the spring 305. Further, in addition to the first 307 and second 309 retainers, there may be one or more additional retainers engageable with the leaf spring 305 to provide further levels of recline resistance.

The preferred embodiment shown in the FIGS. 25 to 32(b) comprises a single leaf spring 305. Alternatively, the recline resistance mechanism 301 may comprise two or more leaf springs. The first 307 and second 309 and any additional retainers may engage only a single one of those springs, or may engage more than one spring at the same time. For example, in an embodiment having two leaf springs each positioned towards an opposite side of the transom 121, each leaf spring may comprise a respective first retainer 307 attached to the transom 121. A second retainer 309 pivotally attached to the transom may comprise two saddles arranged to engage both of the springs when the second retainer is adjusted to the high resistance position.

FIGS. 33 to 36 show a second preferred form recline resistance mechanism 302. The features and functioning of this embodiment are similar to the embodiment described above, and like numerals indicate like parts. In this embodiment, rather than using a leaf spring 305, the resistance device is a torsion spring 325. The torsion spring 325 comprises a first leg 326a operatively connected to the transom, and a second leg 326b operatively connected to the back portion. The second leg 326b comprises a bent end that extends transversely and is received in an aperture in the back support arm 203. In the form shown, the torsion spring 325 is a double coil torsion spring, with two legs 326b operatively connected to the back portion, and two legs 326a operatively connected to the transom 121. In a preferred embodiment, the pivot of the torsion spring is positioned behind the pivot 205 of the back portion. Alternatively, the pivot of the torsion spring could be coincident with the pivot 205 (as shown), or forward of the pivot 205. As in the above described leaf spring embodiment, a first retainer 307' fixed to the transom 121 engages a top surface of the torsion spring legs 326a to operatively connect the spring legs 326a to the transom 121 and apply a preload to the torsion spring 325 when the back portion 501, 501' is in the upright position and to provide a first recline resistance when the back portion 501, 501' is reclined. A second retainer 309' in the form of a hook is pivotally attached to the transom 121 at pivot 311', and is pivotable to engage a cross member between the legs 326a when the back portion 501, 501' is in the generally upright configuration to increase the recline resistance during recline of the back portion.

In embodiments where the pivot of the torsion spring is positioned rearward of the back portion pivot 205, the legs 326a of the torsion spring interact with the retainers in a similar manner to the leaf spring embodiment. That is, with the second retainer 309' engaged, the spring's reaction length and amount of deflection are greater during recline of the back portion than when only the first retainer 307' is engaged. Because the effective length of the spring legs 326a is longer with the second retainer 309' engaged, that provides a lower spring rate than with only the first retainer 307' engaged. However, the longer reaction length and greater spring deflection overcome the lower spring rate of the effectively longer spring.

In alternative embodiments, rather than being operatively connected between the back portion 501, 501' and the transom 121, the resistance mechanisms 301, 302 may be operatively connected between the seat portion 151 and the transom 121 or between the back portion 501, 501' and the seat portion 151. Additionally or alternatively, the recline resistance mechanisms could be used in chairs having the second preferred form recline mechanism 201' described above, or in chairs having other types of recline mechanisms.

Arm Assemblies

The chair 101, 101' has a pair of arm assemblies 401 positioned one on either side of the seat assembly 151. A preferred form arm assembly is shown in FIGS. 37 and 38. Each arm assembly 401 comprises a support assembly 402 and an arm rest 403. The arm rest 403 may be fixed in position relative to the support assembly 402 so that the arm rest is only height adjustable. Alternatively, the arm rest 403 may be generally horizontally movable relative to the support assembly 402 as well as height adjustable. By way of example, the arm rest 403 may be selectively movable relative to the support assembly in a forward and rearward direction, in a side-to-side direction, and/or pivotally about a substantially vertical axis.

In the form shown, the supports 402 are connected to the back portion 501, 501' so that the arm rests move with the back portion as it reclines. Alternatively, the supports 402 could connect to a different part of the chair, such as the seat portion 151 or the supporting frame (e.g. the transom 121).

The support assembly 402 supporting the movable arm rest 403 is preferably height adjustable and is mounted to a chair 101, 101'. Referring to FIGS. 39 to 44, the height adjustable support assembly 402 preferably comprises a support body 406, a sleeve 405 that receives the body, and a lever 411. The body 406 is selectively height adjustable in the sleeve 413 by actuation of the lever, to adjust the height of the arm rest 403 relative to the chair 101, 101'.

The sleeve 405 comprises two inner sleeve portions 415, 417, that sit within an outer sleeve member 413 and are held in place by a mounting plate 419. Preferably one of the inner sleeve portions 417 comprises a collar 417a that fits over the other inner sleeve portion 415 and the mounting plate 419, to ensure correct alignment of the three pieces, and for aesthetics. Alternatively the collar 417a may be a separate cover member. The inner surface of each inner sleeve portion 415, 417 comprises a detented groove 416, 418 with an elongate, vertical groove portion 416b, 418b and a plurality of detents 416a, 416b. In the embodiment shown, the detents 416a, 418a comprise horizontal notches extending rearwardly from the elongate vertical slots 416b, 418b.

The support body 406 comprises an elongate hollow curved substantially vertical tubular portion 406a and a forwardly extending substantially horizontal cantilevered portion 406b extending from the top of the hollow portion 406a. The hollow portion 406a of the support body 403 is received by the sleeve 405, 413, 415, 417. The cantilevered portion 406b operatively supports the arm rest 402. The arm cap member 407 attaches to and covers the top of both the cantilevered 406b and elongate hollow portions 406a of the support body 406 by fasteners (not shown).

The support body 406 is preferably a moulded plastic member. A steel reinforcement member 421 is positioned within the body 406.

The lever 411 is an inverted L-shaped member positioned within the support body 406 and pivotable relative to the body 406 about a pivot 407a that is formed by a pin 423 extending through apertures in the lever 411 and the arm cap 407. One leg of the lever is positioned within the elongate hollow portion 406a of the support body and the other leg of the lever is positioned in the cantilevered portion 406b of the support body. The lever 411 is attached to the reinforcement member 421 and the cap member 407, or otherwise operatively pivotally attached to the support body 406.

A lower end of the lever 411 comprises a guide protrusion 427 and a lock pin 429. The lock pin 429 passes through the centre of the protrusion and through slots (not shown) provided on either side of the body 406. The lock pin 429 extends into the detented grooves 416, 418 on the inner sleeve portions 415, 417. The protrusion moves forward and rearward in the slots in the body 406 as the lever 411 is pivoted about its pivot pin 423. The two ends of the slots in the body and the grooves 416, 418 act as stops against the protrusion 427 to limit pivoting of the lever 411. The reinforcement member 421 defines a further slot 425 that provides clearance for the protrusion 427 on the lever so that the guide protrusion 427 can move relative to the reinforcement member 421 as the lever 411 pivots.

The lever 411 comprises an actuator portion 410 at its upper and forward end. An opening in the underside of the cantilevered portion 406b of the support body 406 exposes the actuator portion 410. Preferably, the actuator portion protrudes through that opening to enable the actuator portion 410 to be readily located by a user. Pressing or pulling upwardly on or releasing the actuator portion 410 causes the lever 411 to pivot about pivot 423. As the lever 411 pivots, the protrusion 427 slides in the reinforcement member slot 425 and the lock pin 429 slides in slots 406c in the body to move within the detented grooves 416, 418 to engage and disengage the detents 416a, 418a.

Figure 41:
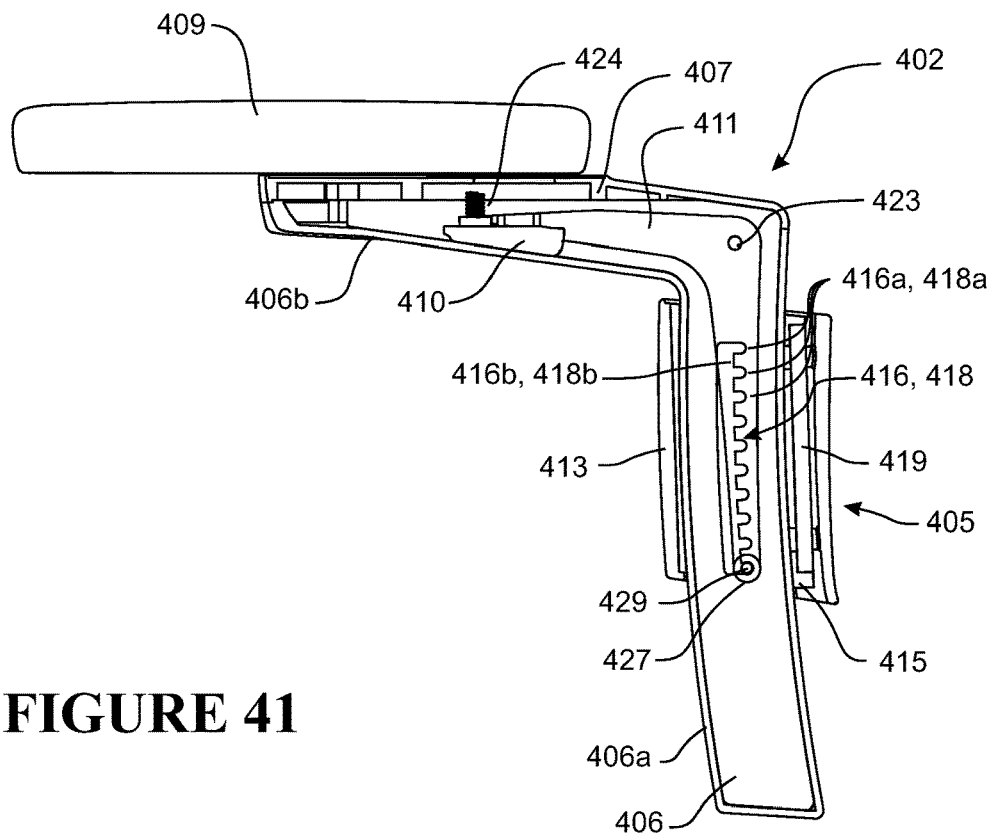
FIG. 41 is a section view the arm support assembly of FIGS. 37 to 40 with the arm pad shown and showing the height adjustment mechanism locked in the lowest position.

FIG. 41 shows the support assembly locked in the lowest position, where the lock pin 429 is engaged with the lowermost detents 416a, 418a. A biasing device 424, which in the form shown is a coil spring, is positioned between the actuator portion 410 and the arm body cap 407 to bias the actuator portion 410 downwards and thereby bias the lever 411 into the locked position where the lock pin engages in the detents 416a, 418a. Applying upwards pressure to the actuator portion 410 pivots the lever 411 to a released position in which the lock pin 429 is disengaged from the detents 416a, 418a and free to slide within elongate slots 416b, 418b. Alternatively, a biasing member may be positioned between a different portion of the lever 411 and the housing 406, 407 to bias the lever into a locked or a released position. Any suitable type of biasing device could be used.

Figure 42:
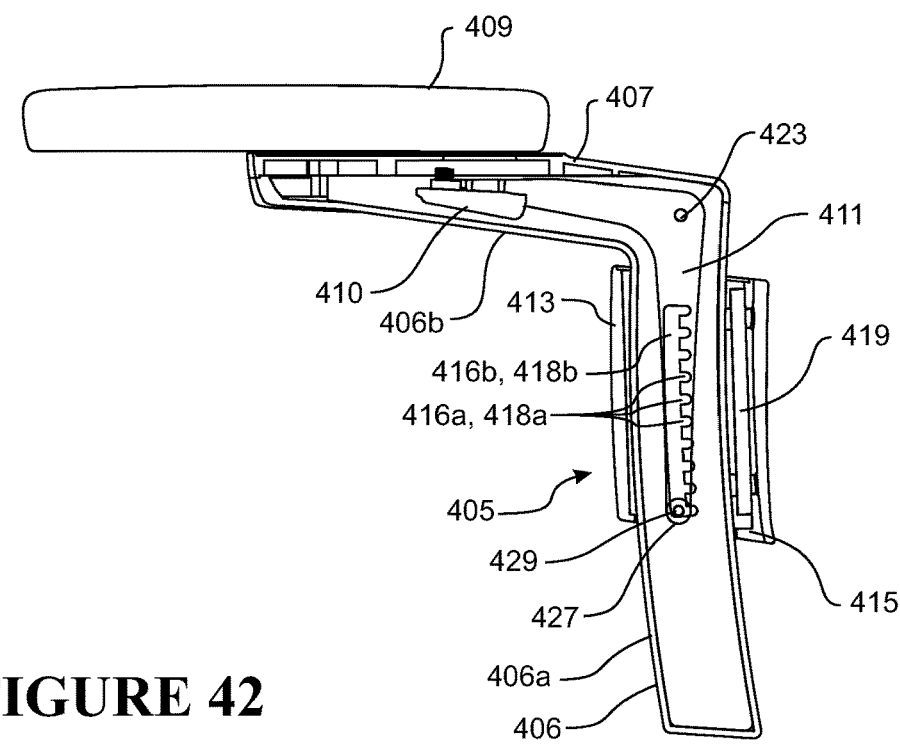
FIG. 42 is a partial section view similar to FIG. 41, with the height adjustment mechanism unlocked in the lowest position.
Figure 43:
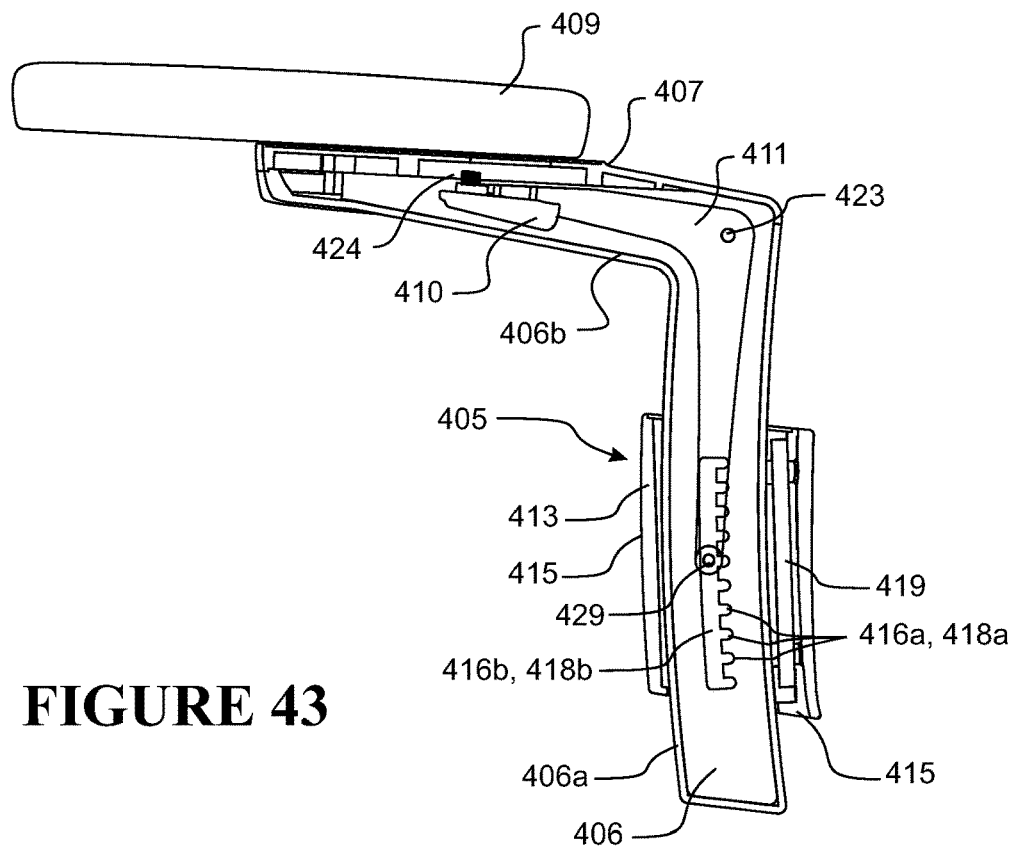
FIG. 43 is the view of FIGS. 41 and 42 with the height adjustment mechanism unlocked at a mid-height position.
Figure 44:
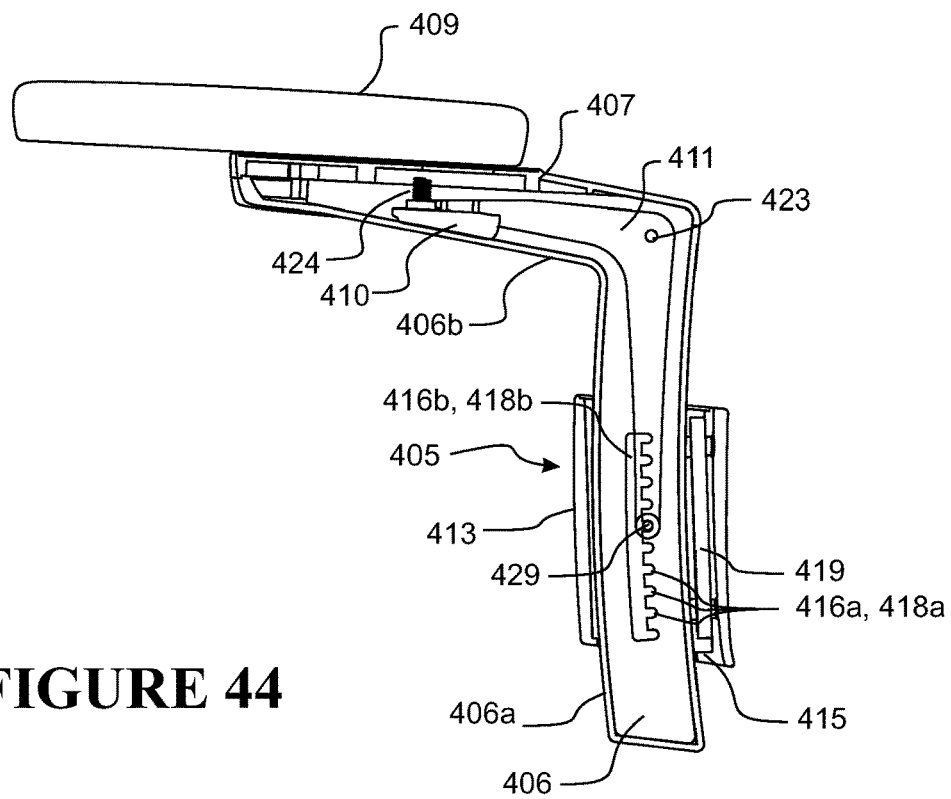
FIG. 44 is the view of FIG. 42 with the height adjustment mechanism locked at a mid-height position.
Figure 46:
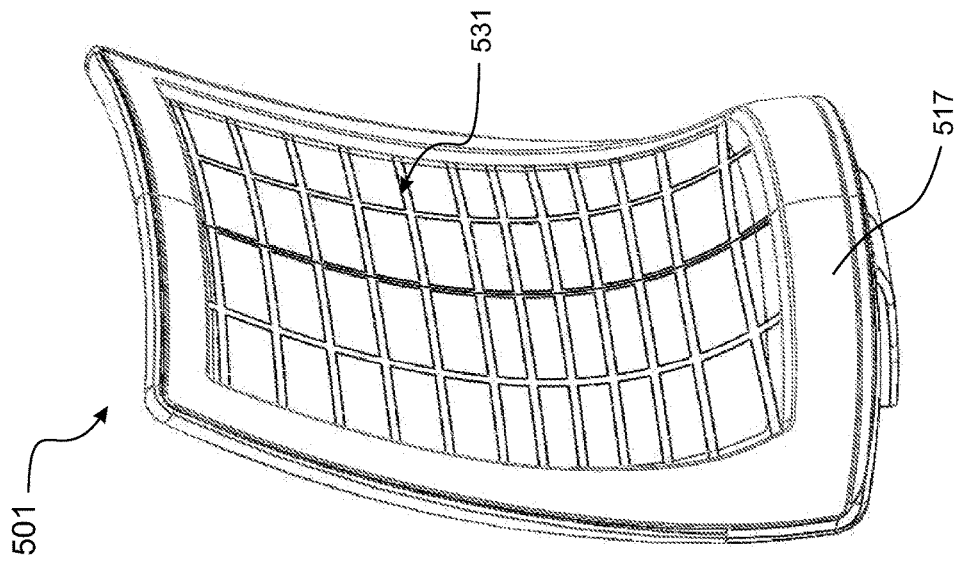
FIG. 46 is a rear perspective view of the back assembly of FIG. 45.
Figure 45:
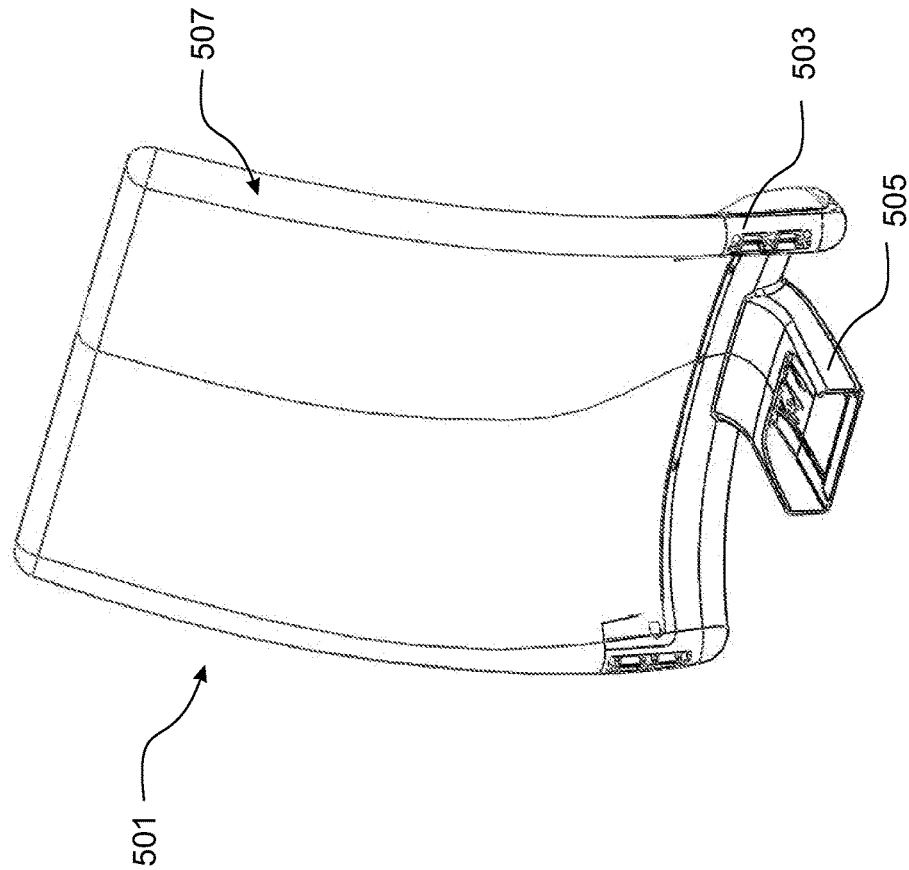
FIG. 45 is a front perspective view of a back assembly of a preferred form chair.
Figure 47:
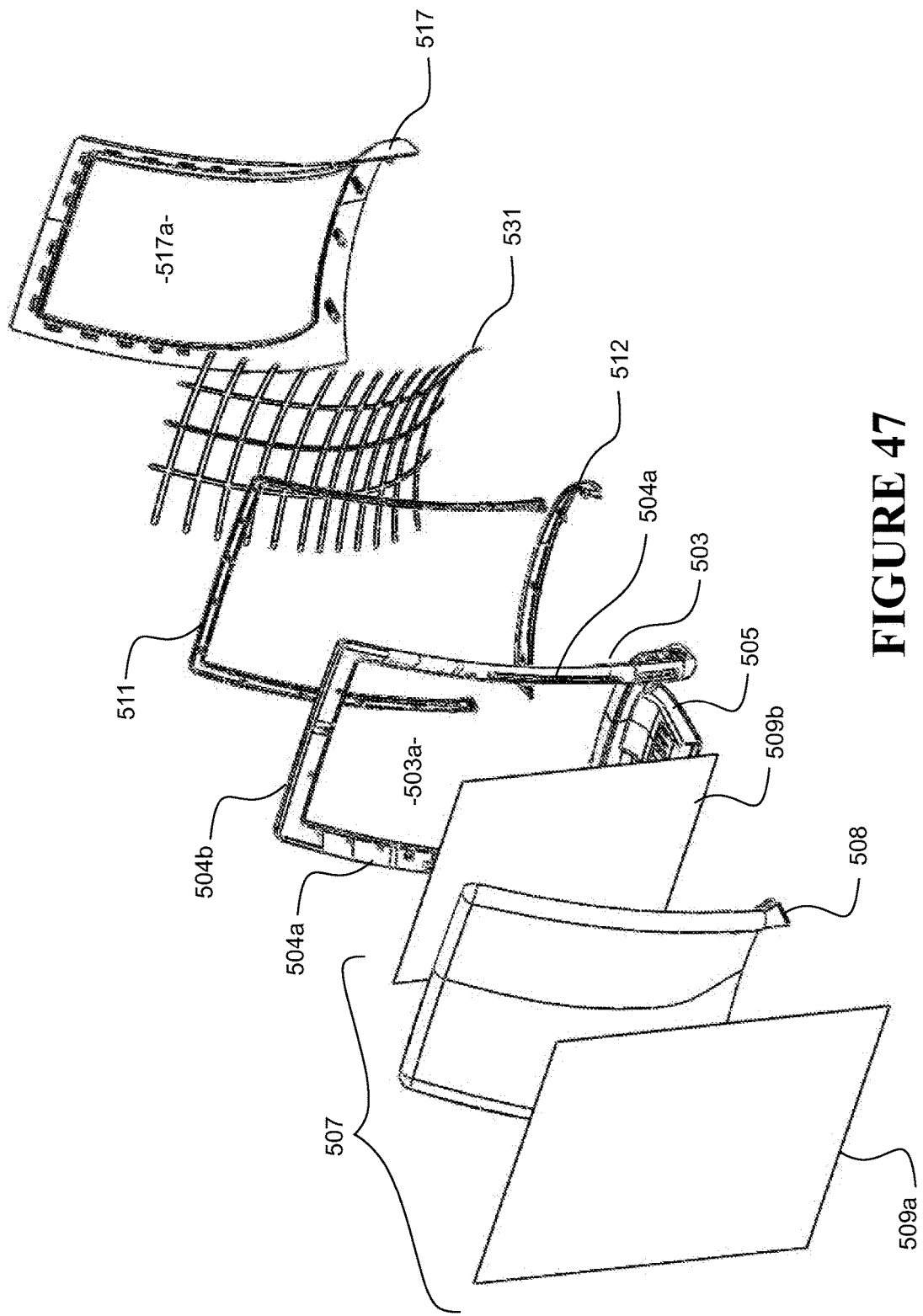
FIG. 47 is an exploded front perspective view of the back assembly of FIG. 45.
Figure 48:
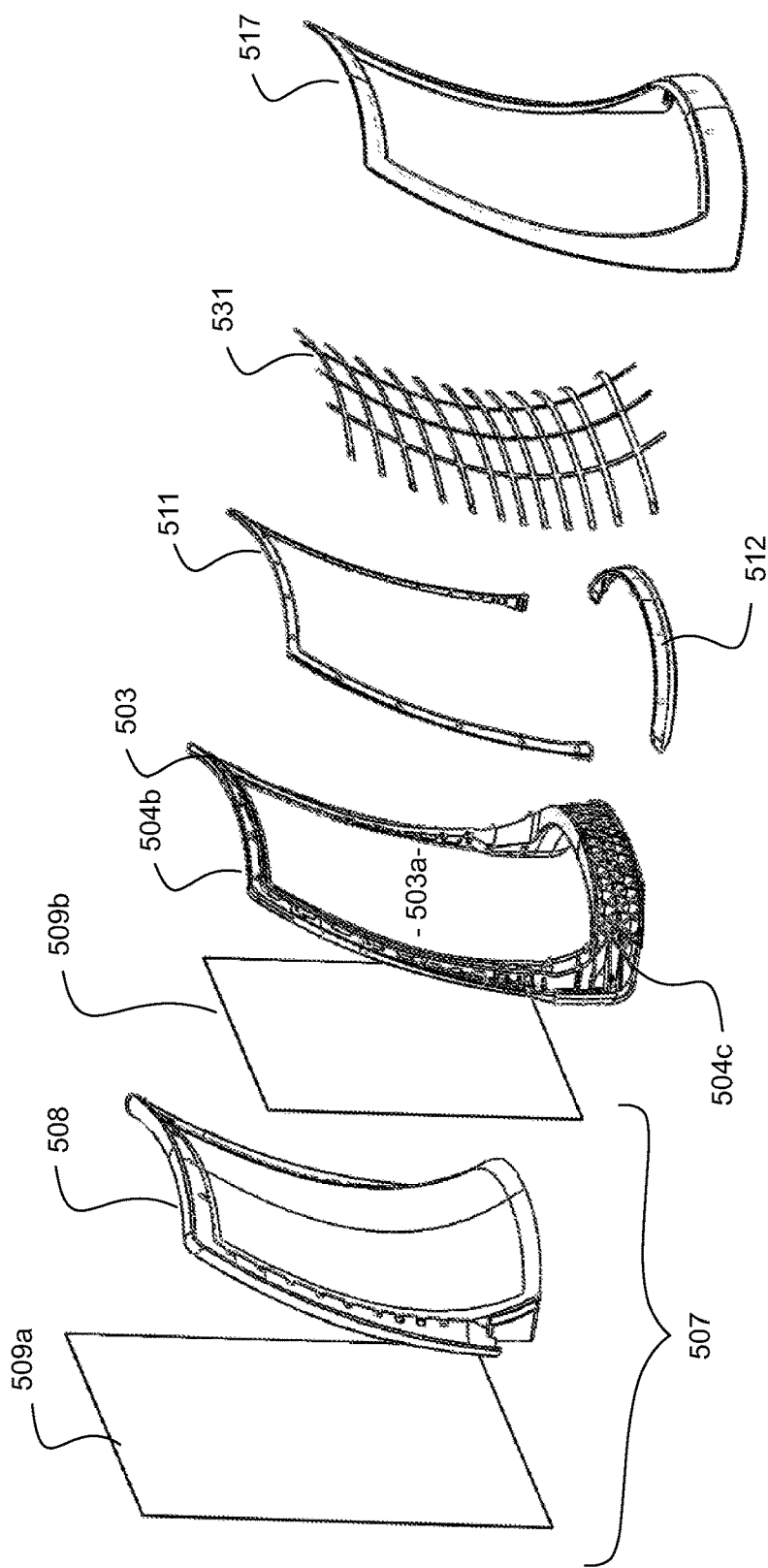
FIG. 48 is an exploded rear perspective view of the back assembly of FIG. 45.
Figure 49:
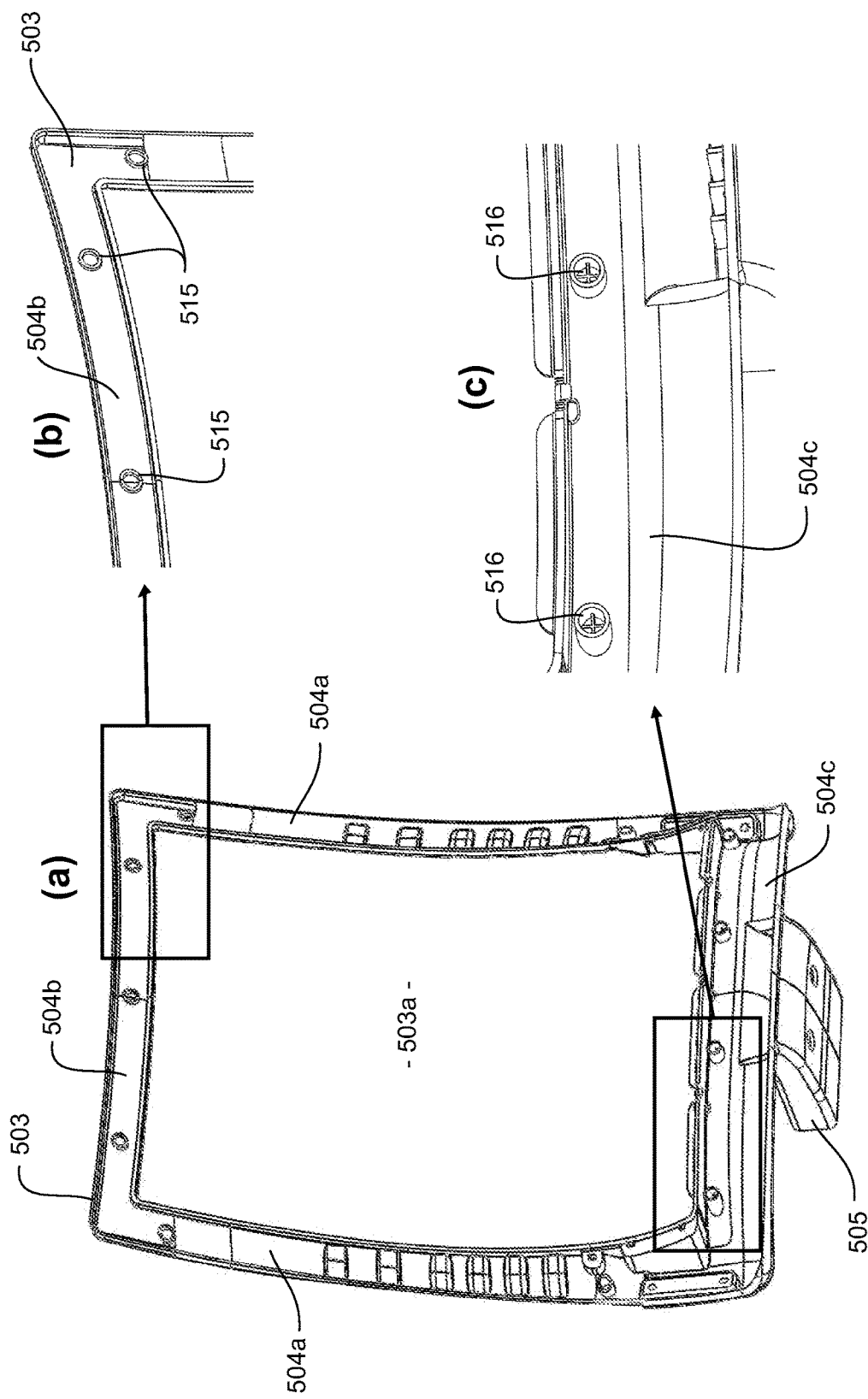
FIG. 49(a) is a rear perspective view of the back frame of the back assembly of FIG. 45, and FIGS. 49(b) and (c) are enlarged detail views of the back frame features for connecting the staple-receiving members.
Figure 50:
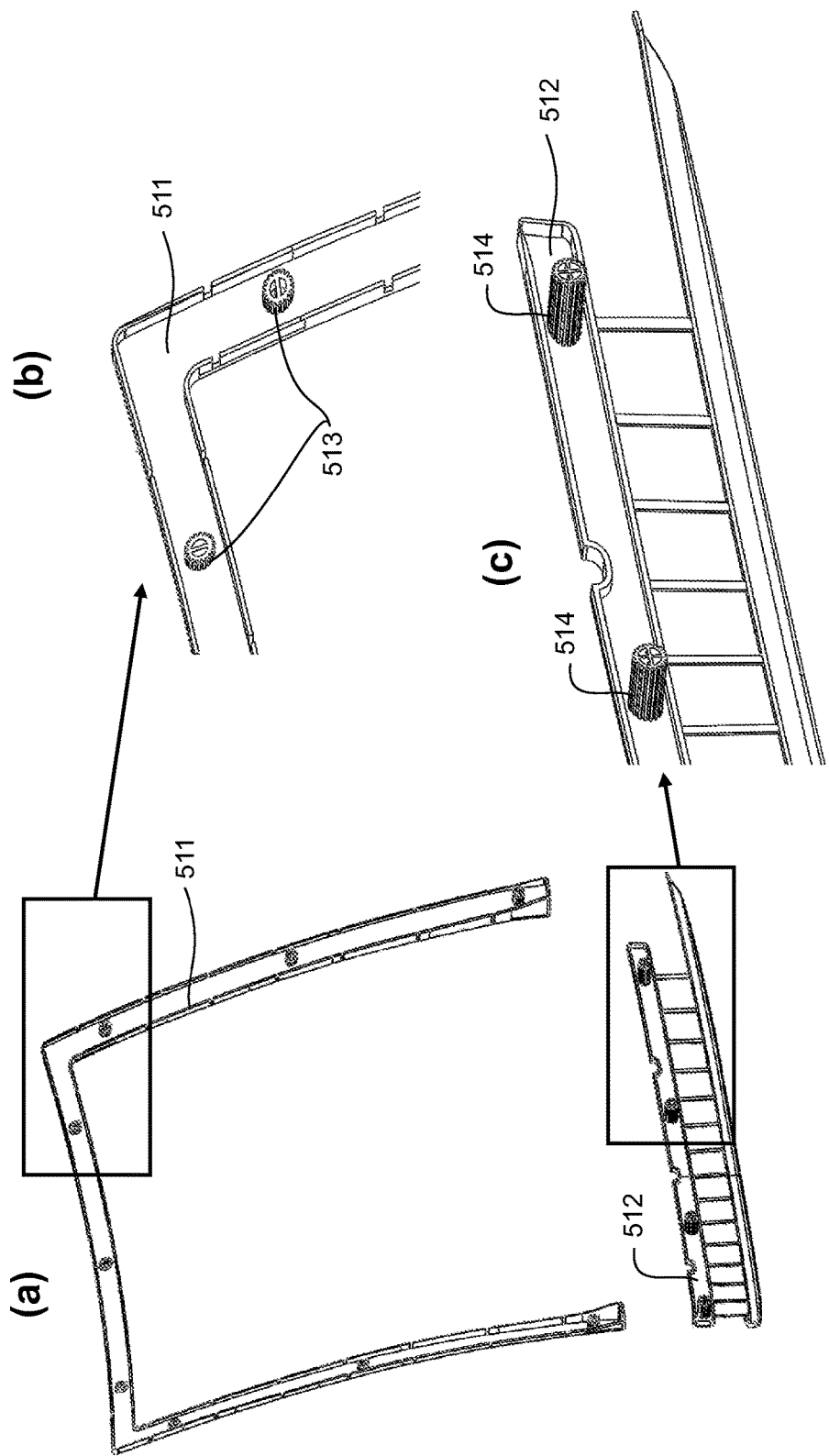
FIG. 50(a) is a front perspective view of the staple-receiving members for connecting to the back frame of FIGS. 49(a) to (c), and FIGS. 50(b) and (c) are enlarged detail views of the features for connecting the staple-receiving members to the back frame.

FIGS. 42 and 43 show the lever 411 and lock pin 429 in the released position. When the lever and pin are in the released position, the arm assembly body 406 is free to slide within the sleeve 405 between the upper and lower limits, to adjust the height of the arm rest. For example, the arm assembly is adjustable from the lowermost position shown in FIG. 42 to the position shown in FIG. 43 by pulling or pushing the arm rest 403 or arm body 406 upward. When the actuator portion 410 is released from the position shown in FIG. 43, the spring 424 biases the lever 411 back towards the locked position, moving the lock pin 429 into a detent 416a, 418a to lock the height of the arm rest as shown in FIG. 44.

The arm rest is adjustable relative to the sleeve 405 to a plurality of heights corresponding to the number of detents 416a, 418b. For example, in the embodiment shown the detented grooves 416, 418 each comprise ten vertically spaced notches and the arm rest is movable between ten different heights. It will be appreciated that the sleeve may comprise more or fewer than ten detents to enable adjustment of the arm rest 403 between more or fewer positions.

To assemble the support assembly 402, the lever 411 and reinforcement plate 421 are arranged with the lever protrusion 427 in the reinforcement plate slot 425 and pinned to the cap member 407 at pivot 407a by pin 423. The lever and plate 421 are then placed in the support body 406. The rotation mechanism described above is connected to the cover 407 before or after attaching the lever 411 and reinforcement plate 421. The cap member 407 is then screwed to the support body 406b. The lock pin is then inserted through the slots in the elongate hollow portion of the arm body 406 and through a complementary aperture in the lever protrusion 427. The inner sleeve portions 415, 417 and mounting plate 419 are then assembled around the elongate portion of the arm body 406 so that the two ends of the lock pin 429 are positioned in the respective detented slots 416, 418. The inner sleeve portions 415, 417 and mounting plate 419 are then slid into the outer sleeve 415.

The mounting plate 419 has aligned, threaded apertures 420 for mounting the sleeve assembly 405 and thereby the arm support assembly to the chair 101, 101'. Apertures (not shown) are also provided at the back of the outer sleeve 413 that are aligned with the apertures 420 in the mounting plate 419 to receive fasteners 420a such as cap screws for example. The sleeve assembly 405 is mounted to the back portion 501, 501' of the chair by feeding the cap screws through apertures in the back portion 501, 501' from the back of the chair, and into the threaded apertures 420 on the mounting plate 419, effectively clamping the sleeve 405 between the mounting plate 419 and the chair back.

The back side of the outer sleeve 413 is preferably shaped to sit substantially flush against the respective frame member 504a of the chair back 501. For example, in the embodiment shown, the back of the sleeve 419 is concave to sit flush with a convex back frame member 504a.

It can be seen from FIGS. 37 to 44 that the height adjustment mechanism (other than the actuator portion 410) is substantially hidden from view from the exterior of the arm support assembly, thereby providing a pleasing aesthetic for the arm support assembly. That is despite the sleeve assembly 405 only having a small height relative to the support body 406.

In an alternative embodiment, the support 402 may be a non-height adjustable support and may comprise a single member mountable to the chair 101. Alternatively, the support may be height adjustable but not comprise an arm rest that is angularly adjustable and/or adjustable forward-rearward or laterally.

Back Portion
Back Construction

FIGS. 45 to 70 illustrate a preferred form back assembly 501. The back assembly 501 comprises a back frame 503 having side frame members 504a and upper 504b and lower 504c frame members defining an opening 503a. A support 531, which is described in further detail below, is attached to the frame 503 and suspended across the frame opening 503a. A cushion assembly 507 is positioned in front of the frame 503 and against a front surface of the support 531. One or more staple-receiving members 511, 512 are fixed to a rear side of the frame 503 for connecting the cushioning portion 507 to the frame 503. An aesthetic cover 517 is positioned on a rear side of the back assembly to cover the connections between the frame 503, the cushioning assembly 507, and the staple-receiving member(s) 511, 512.

A forwardly protruding connecting portion 505 is connected to the lower frame member 504c to connect the back assembly 501 to the recline mechanism 201. The connecting portion 505 connects to the back support arm 203 of the recline mechanism described above, enabling the back portion to be reclined relative to the transom. Alternatively, the back support arm 203 and the connecting portion 505 of the back frame may be integral. In an alternative embodiment, the back assembly 501 may be fixedly connected to the transom or seat portion, or may be connected to the transom by way of an alternative mechanism so that recline or movement of the back assembly 501 is the same as or differs from that described above in relation to the recline mechanisms 201, 201'.

The back frame 503 defines a substantially rectangular opening 503a. The support 531 comprises a plurality of spaced apart elongate longitudinally extending straps 533 and a plurality of spaced apart transversely extending straps 535. The longitudinal straps 533 and the transverse straps 535 each comprise two opposite end connectors 545 each having an aperture 547. The longitudinal and transverse straps connect to the back frame 503 by hooks 561 such that the support 531 is suspended across the aperture 503a, providing a support surface for the cushioning assembly 507.

The back frame 503 and back assembly 501 are preferably forwardly concave about a vertical axis, and at least a lower portion of the back frame and back assembly are preferably forwardly convex about a horizontal transverse axis, to follow the natural curvature of a user's back.

The cushioning assembly 507 comprises a front upholstery sheet 509a, a cushion 508, and a rear upholstery sheet 509b. The cushion 508 is preferably a foam member and may comprise moulded or cut out portions to accommodate part of the back frame 503 and the attachment hooks 561 for the support 531. The upholstery sheets could be any suitable type, such as fabric, leather, or synthetic leather for example. The front upholstery sheet 509a is glued to a front surface of the cushion, and the rear upholstery sheet 509b is glued to the rear surface of the cushion. The cushion 508 is at least as large as the opening 503a defined by the back frame 503, and is preferably sized to substantially cover a front surface of the back frame 503 and the opening 503a. The cushion 508 may be slightly larger than the front surface of the back frame 503 so that the peripheral portion of the cushion 508 wraps around the edge of the back frame 503. The front upholstery sheet is preferably larger than the front surface of the cushion such that the edges of the front upholstery sheet can be wrapped around the sides of the cushion 508 and partly behind the cushion 508.

Figure 51A:
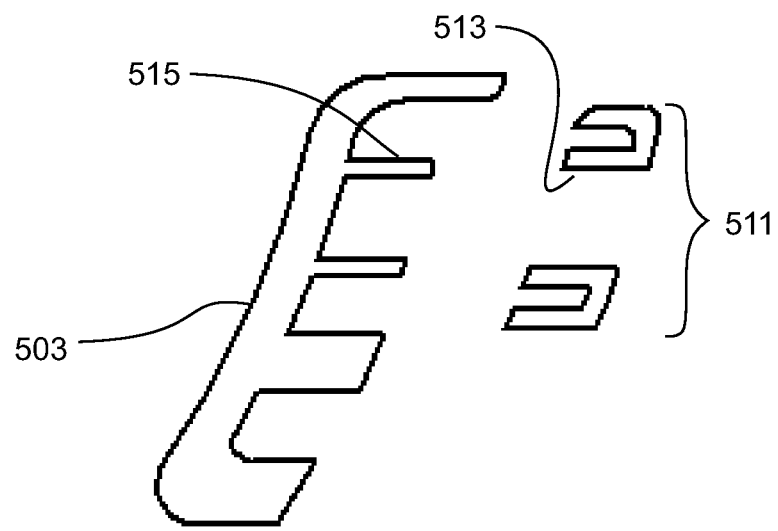
FIGS. 51(a) and (b) are partial section views showing details of the assembly of the back frame of FIGS. 49(a) to (c) and staple-receiving members of FIGS. 50(a) to (c), with FIG. 51(a) showing a connection at a top portion of the frame and FIG. 51(b) showing a connection at a lower portion of the frame.
Figure 51B:
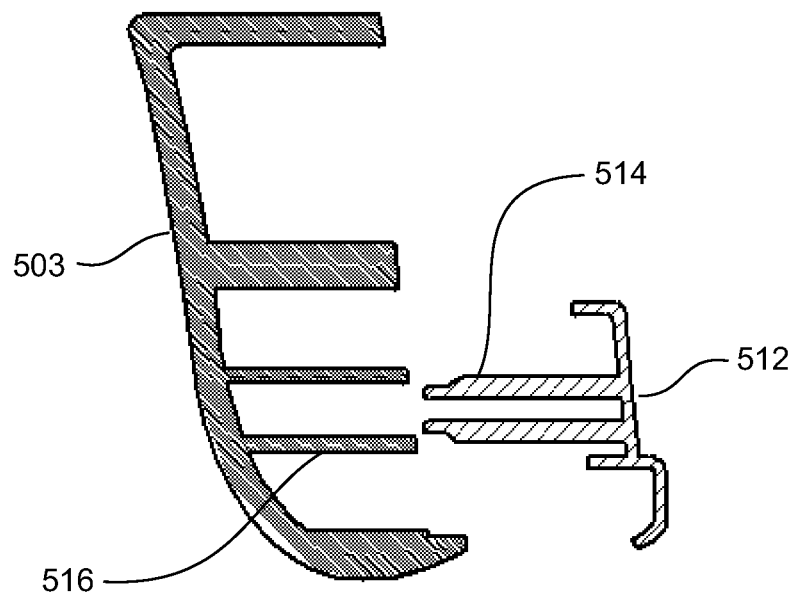

As best seen in FIGS. 49(a) to (c), a rear surface of the back frame 503 comprises a plurality of hollow cylindrical protrusions 515, 516. The upper protrusions 515 are shallower than the lower protrusions 516, to enable the upper frame member 504b to be lower profile than the lower frame member 504c. The staple-receiving members 511, 512 each comprise a front surface with a plurality of forwardly protruding complementary crush dowels 513, 514 as shown in FIGS. 50(a) to (c). The crush dowels 513, 514 have an outer diameter that is slightly larger than the inner diameter of the hollow projections 515, 516 on the rear of the back frame. To connect the staple-receiving members to the back frame 503, the dowels 513, 514 are pushed into the corresponding hollow projections 515, 516 on the frame, deforming at least a portion of each dowel. FIGS. 51(a) and 51(b) illustrate the step of assembling the staple-receiving members 511, 512 to the frame 503. In the embodiment shown, the dowels 513, 514 comprise ribs about their periphery. At least some of these ribs are flattened when the dowels 513, 514 are forced into the cylindrical protrusions 515, 516 on the back frame 503, forming a tight friction fit between the staple-receiving members 511, 512 and the frame 503.

The staple-receiving members 511, 512 and dowels 513, 514 preferably comprise a thermoplastic polymeric material with a lower hardness than the back frame 503. By way of example, the staple-receiving members may be formed of polypropylene, and the frame may be formed of 30% glass fibre reinforced PET. The deformation of the dowels 513, 514 is typically a plastic deformation, such that the staple-receiving members 511, 512 cannot be firmly reattached if they are removed. In alternative embodiments, the staple-receiving members 511, 512 could be attached to the frame 503 by other means, for example using fasteners, adhesive, or other snap-type connections. Alternatively, the frame could receive the staples directly. As another alternative, the front upholstery sheet could be fastened to the frame using any suitable means, such as those described above for example.

Figure 54:
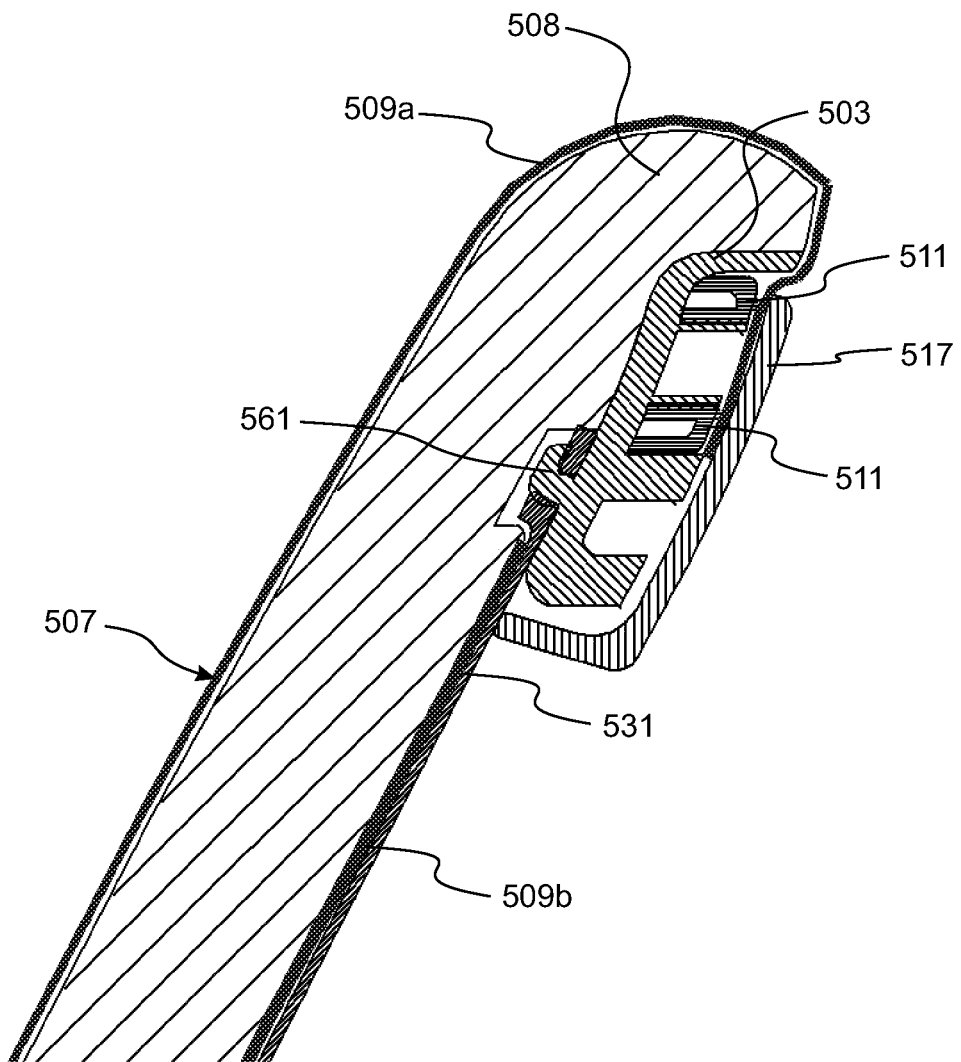
FIG. 54 is a section view of an upper portion of the back assembly of FIG. 45, taken in a vertical plane through the centerline of the back assembly.
Figure 55:
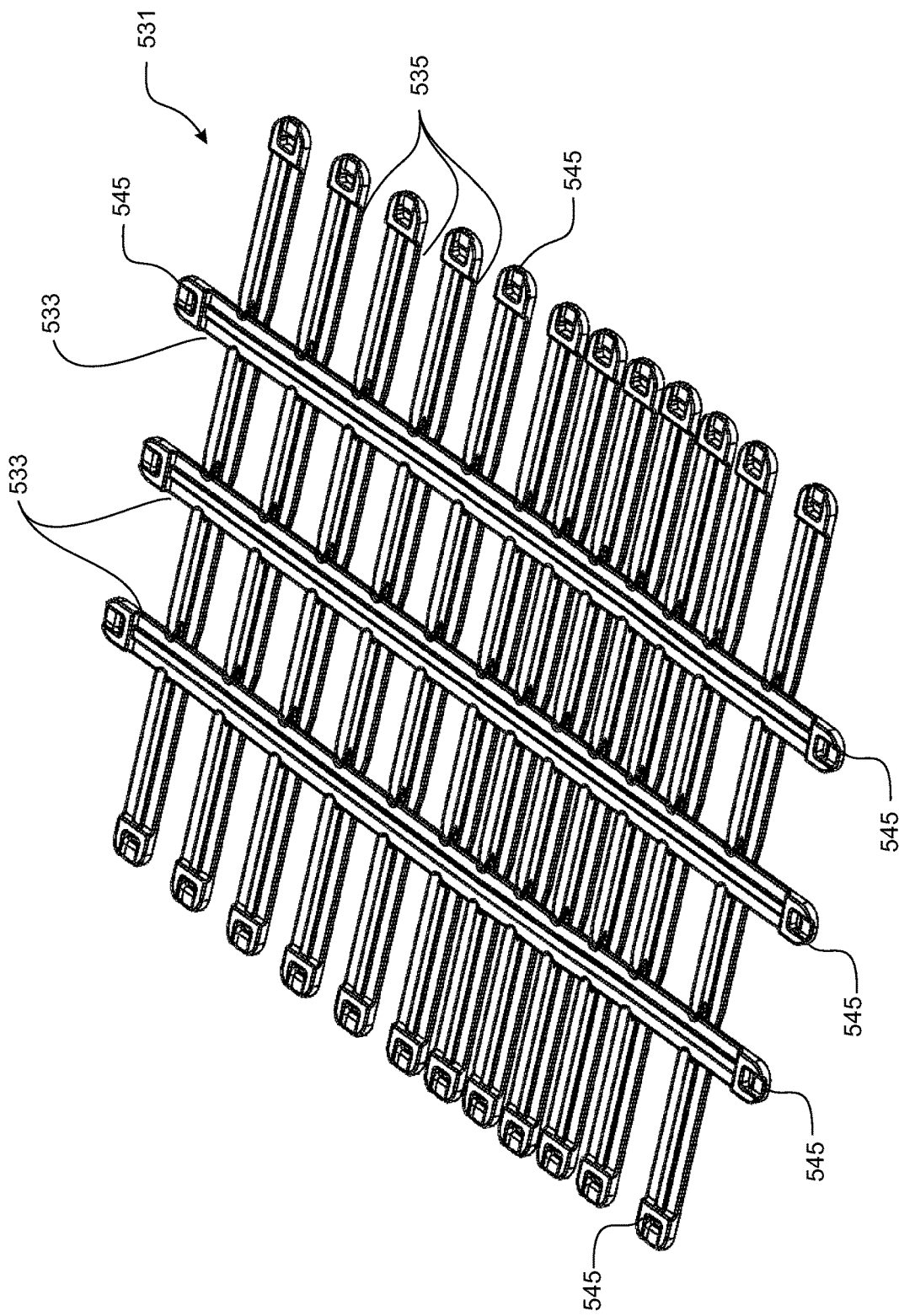
FIG. 55 is a front perspective view of the support that forms part of the back portion of FIG. 45, in an as-moulded form.
Figure 56:
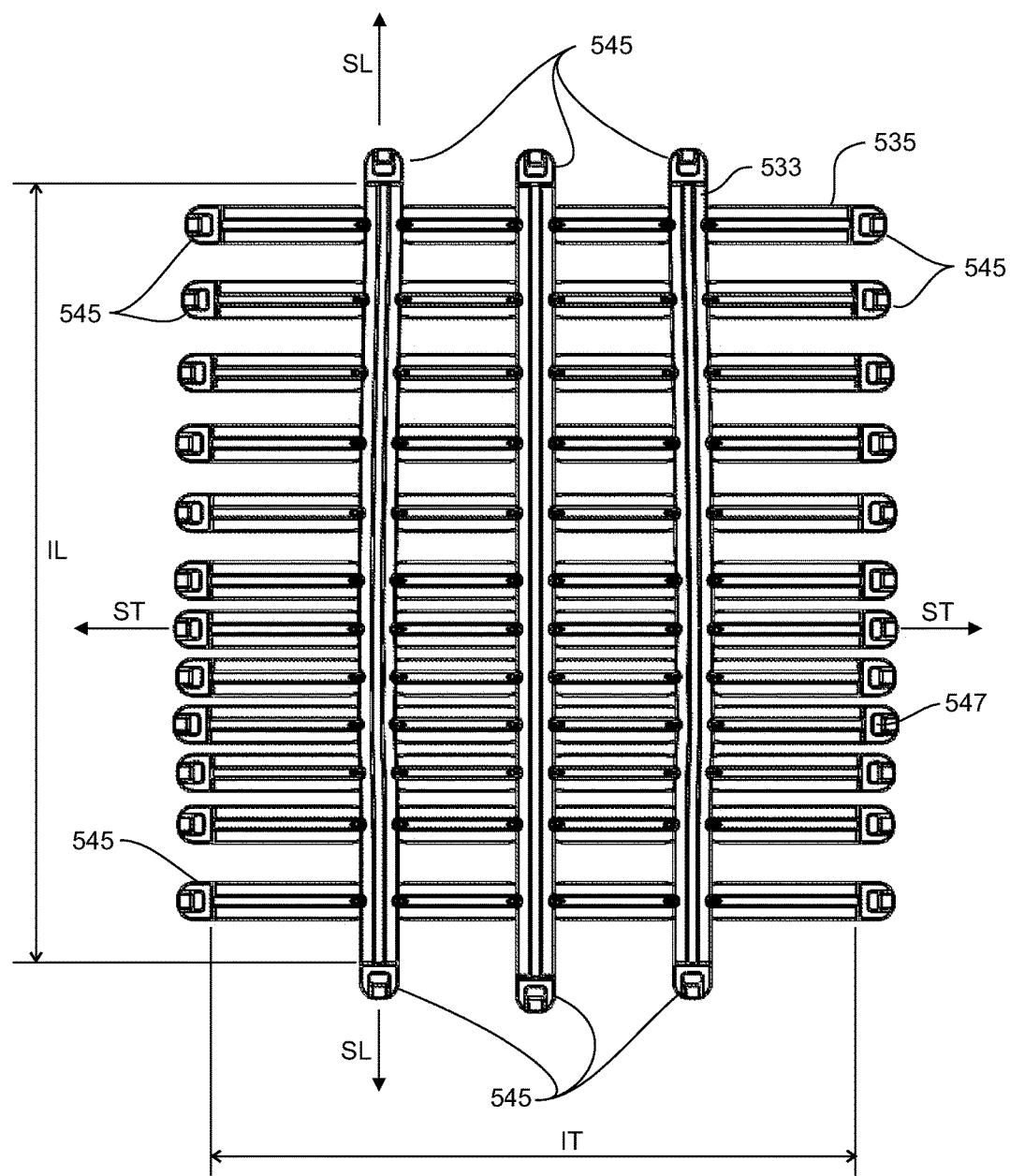
FIG. 56 is a plan view from the front of the support of FIG. 55.
Figure 57:
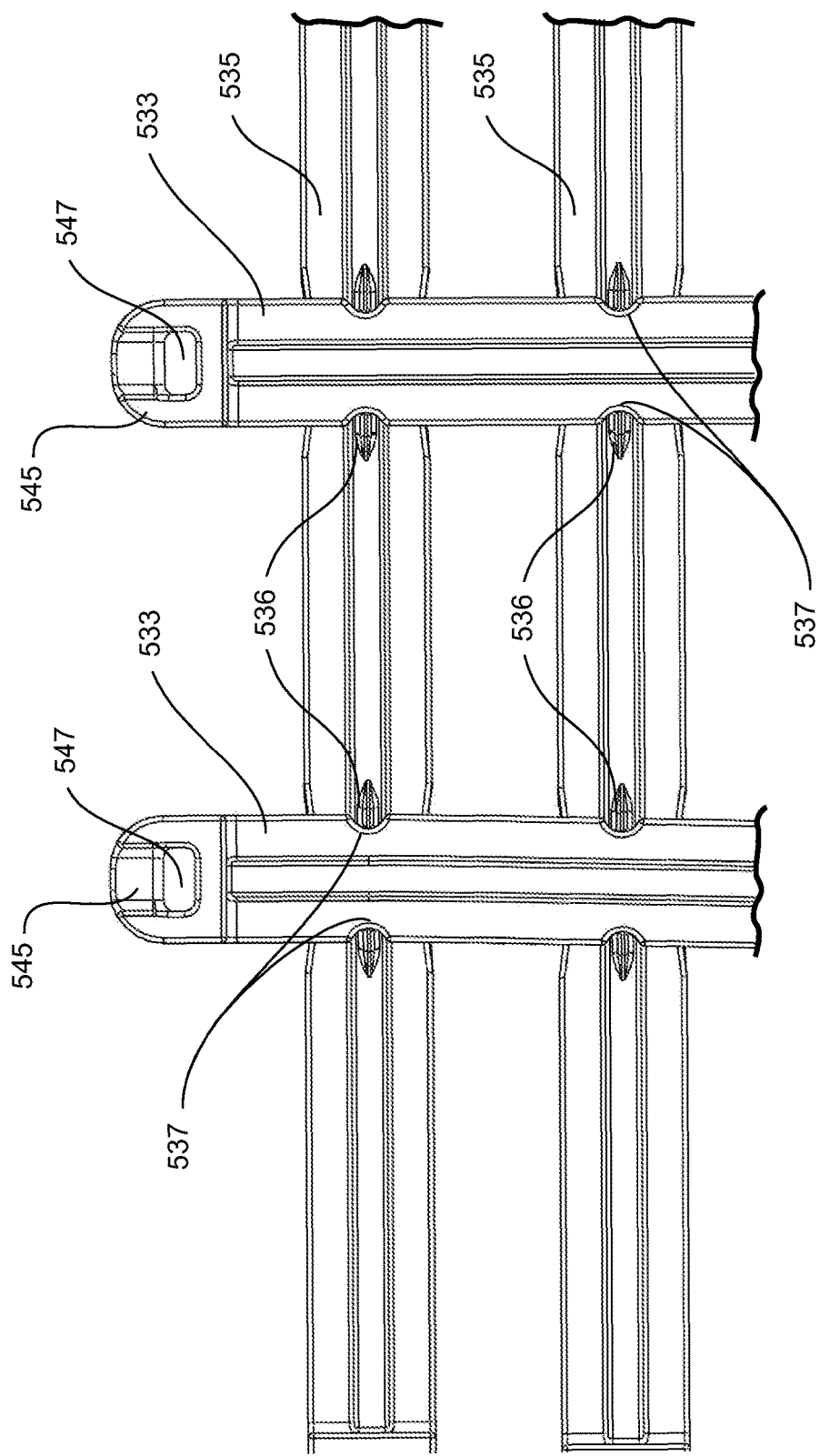
FIG. 57 is a detail view from the front of the overlapping intersections between two longitudinally extending straps and two transversely extending straps of the support of FIG. 55.
Figure 58:
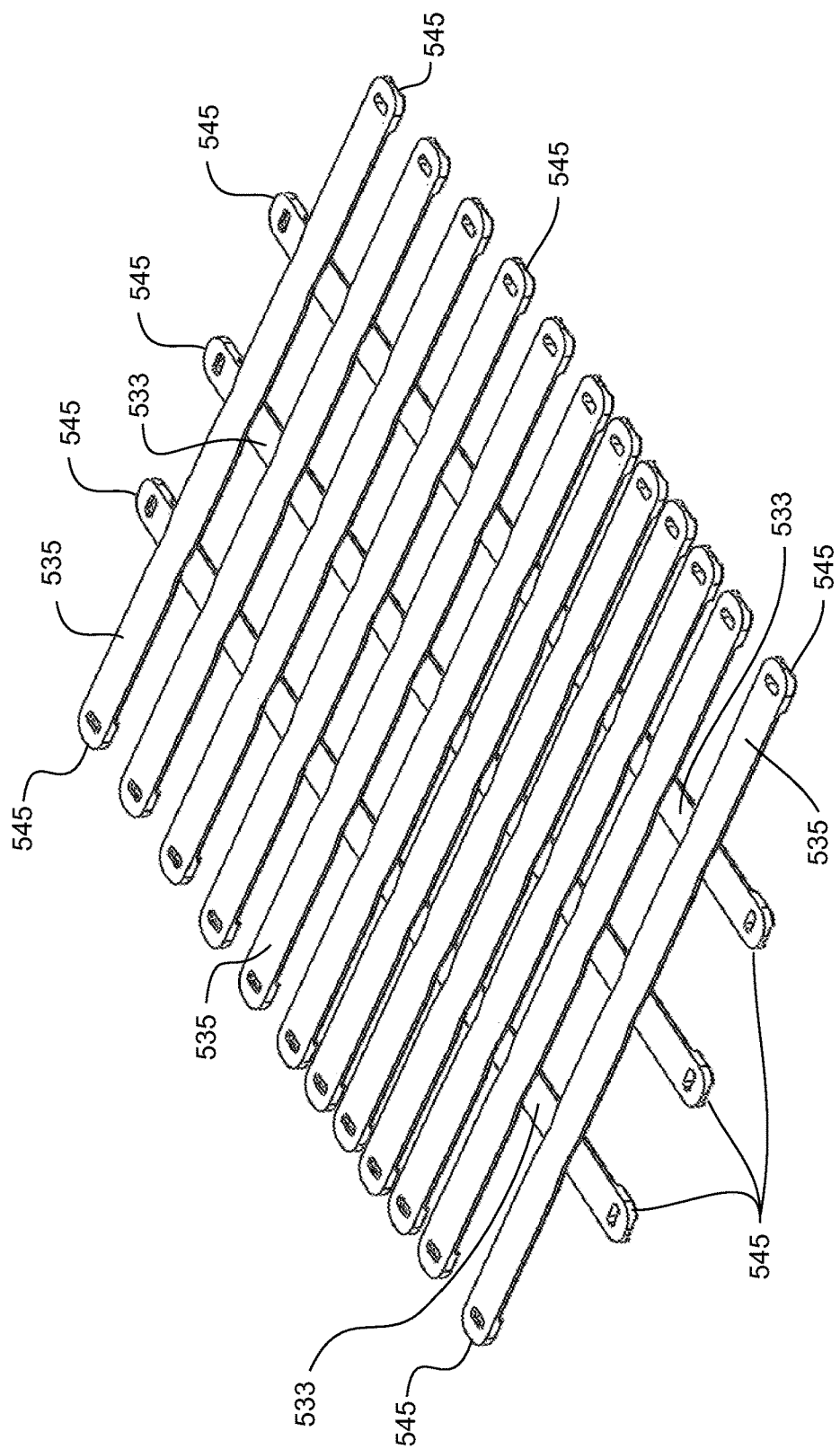
FIG. 58 is a rear perspective view of the support of FIG. 55.
Figure 59:
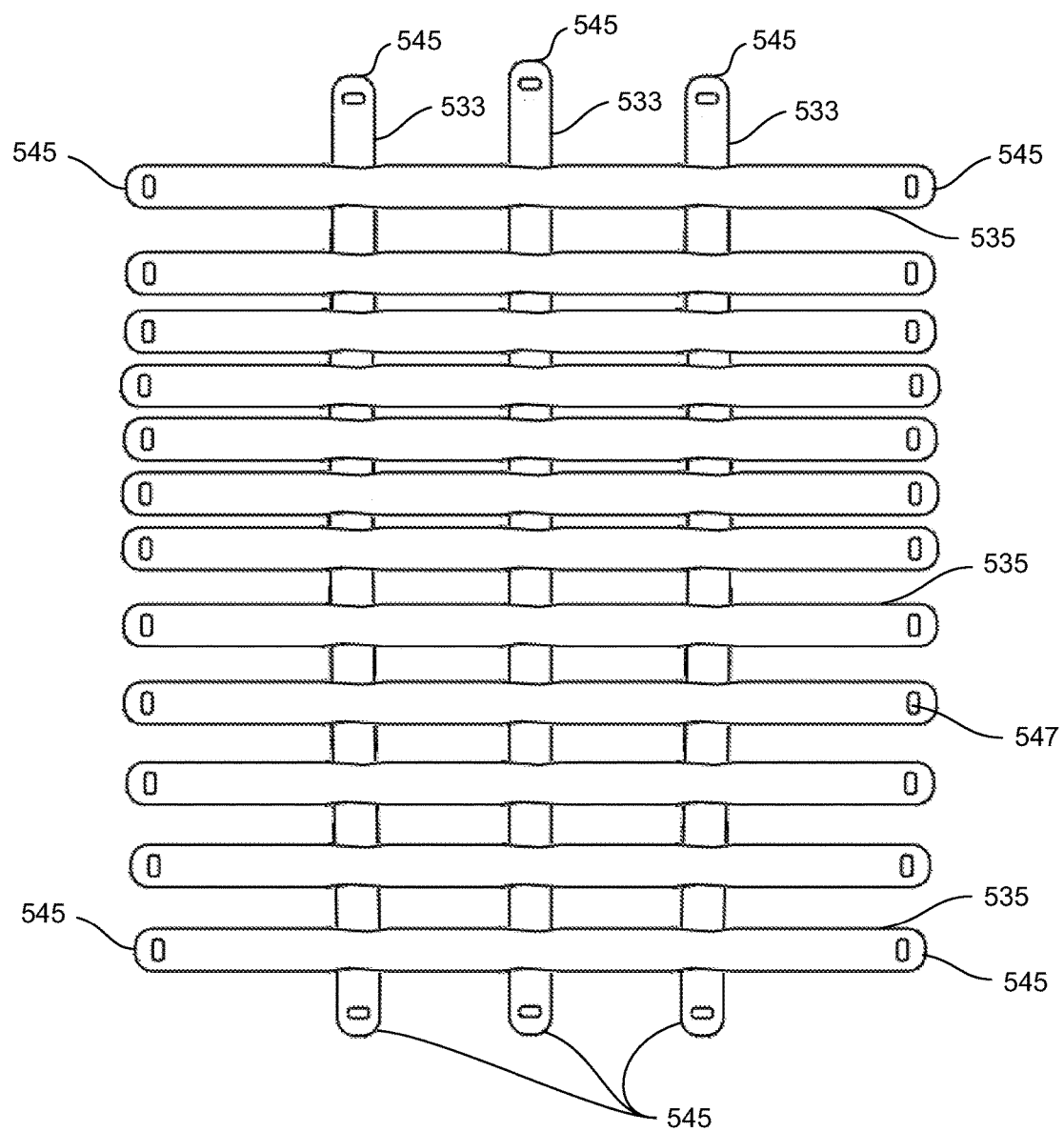
FIG. 59 is a plan view from the back of the support of FIG. 55.
Figure 60:
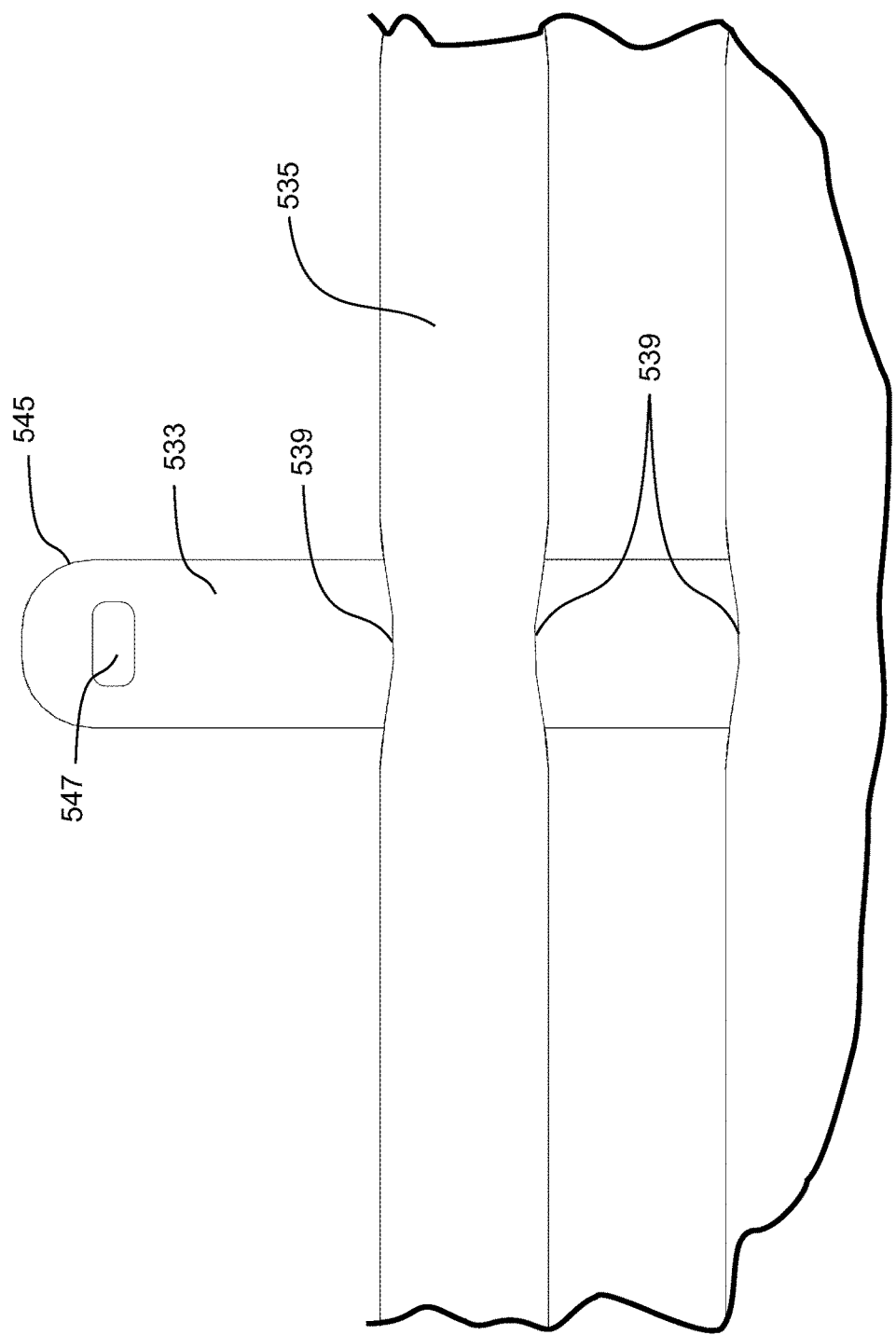
FIG. 60 is a detail view from behind of the overlapping intersections between one longitudinally extending strap and two transversely extending straps of the support of FIG. 55.

The staple-receiving members 511, 512 provide a surface for stapling the cushioning assembly 507 to the back frame 503. FIG. 54 shows the attachment of the cushioning assembly 507 to an upper portion of the back frame 503. In the embodiment shown, the front upholstery sheet 509a wraps around the edges of the cushion 508, and behind the back frame 503 and staple-receiving members 511, 512. The front upholstery sheet 509a is then stapled to the rear side of the staple-receiving members 511, 512. The staple-receiving members provide a surface that is softer than the back frame 503 for receiving staples. In an alternative embodiment, the rear upholstery member 509b may also wrap around the edge of the back frame 503 and be stapled to the staple-receiving members 511, 512 together with the front upholstery sheet 509a. Alternatively or additionally the cushion 508 and/or the rear upholstery sheet 509b may be glued to the front surface of the back frame 503.

Figure 52:
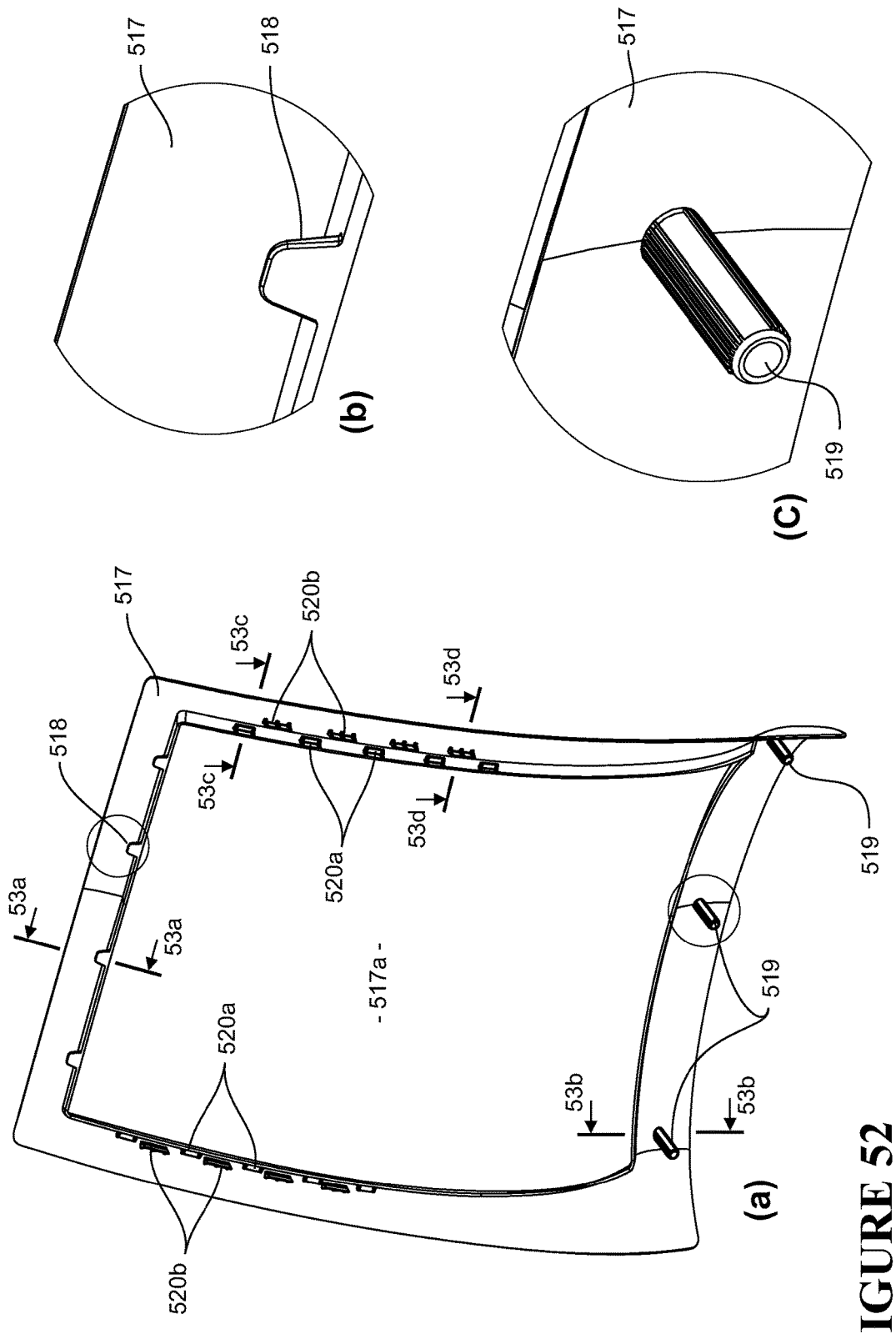
FIG. 52(a) to (c) show the aesthetic cover of the back assembly of FIG. 45, with 52(a) being a front perspective view of the aesthetic cover, FIG. 52(b) being an enlarged detail view of a tab on an upper portion of the aesthetic cover for connecting the aesthetic cover to the back frame, and FIG. 52(c) being an enlarged detail view of a crush dowel on a lower portion of the aesthetic cover for connecting the aesthetic cover to the back frame.

An aesthetic cover 517 shown in FIG. 52 is attached to the rear side of the back frame 503 to cover the stapled portion of the front upholstery sheet 509a, the staple-receiving members 511, 512, and the rear side of the back frame. The aesthetic cover 517 comprises an opening 517a that is approximately the same size, or slightly smaller than, the back frame opening 503a so that the support 531 and back upholstery sheet 509b are visible from behind the back portion. The opening in the aesthetic cover 517 also allows portions of the cushioning assembly 507 and support 531 to deflect rearwardly beyond the frame 503 and aesthetic cover 517 during support of a user.

Figure 53A:
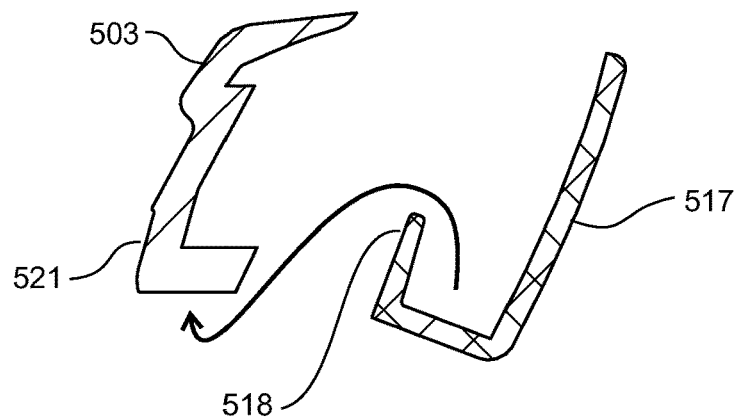
FIGS. 53(a) to (d) are partial section views showing the assembly of the back frame and aesthetic cover, with FIG. 53(a) showing a connection at a top portion of the frame, FIG. 53(b) showing a connection at a lower portion of the frame, and FIGS. 53(c) and 53(d) showing a connection at a side portion of the frame.
Figure 53B:
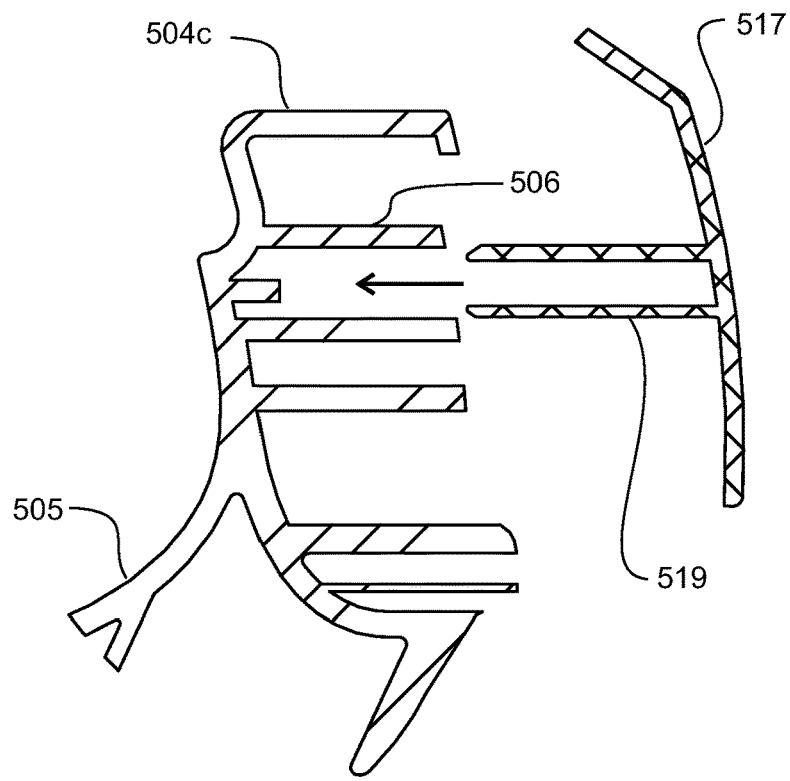
Figure 53C:
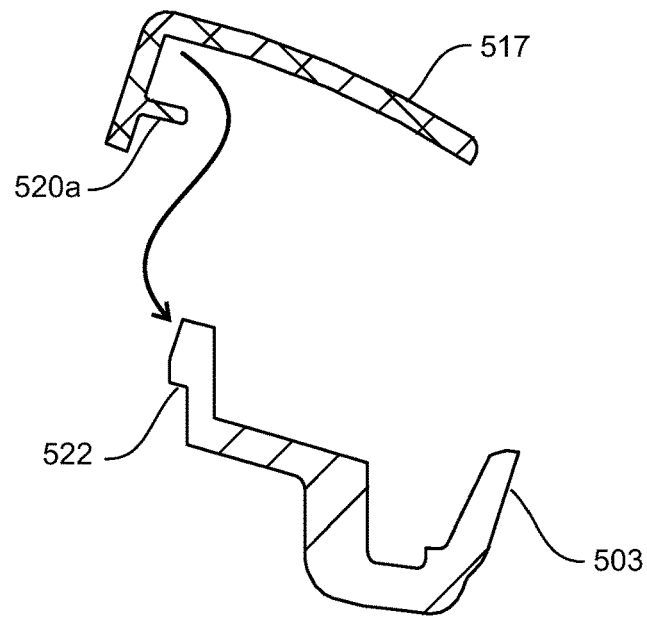
Figure 53D:
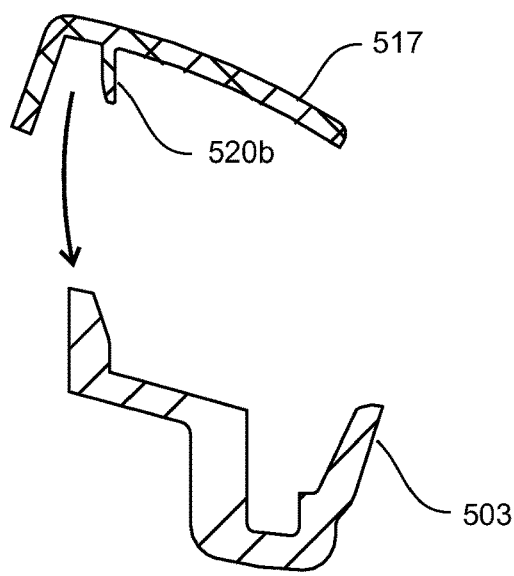

As shown in FIGS. 52(a) and 53(a), an upper portion of the aesthetic cover 517 comprises a plurality of upwardly projecting tabs 518. The tabs 518 are for engaging with corresponding recess(es) 521 on a front surface of the back frame 503, as shown in FIG. 53(a). A lower portion of the aesthetic cover 517 comprises a plurality of forwardly projecting crush dowels 519 as shown in FIGS. 52(c) and 53(b). Side portions of the aesthetic cover 517 comprise a plurality of outwardly directed tabs 520*a* and outer projections 520*b*. Corresponding catch features 522 on the side members of the back frame are receivable in the space between the outwardly directed tabs 520*a* and outer projections 520*b*. A lower portion of the back frame 503 comprises a plurality of hollow cylindrical protrusions 506. The crush dowels 519 are similar to those described above with respect to the staple-receiving members 511, 512.

The aesthetic cover 517 is attached to the back frame 503 by first positioning the upper portion of the aesthetic cover 517 relative to the upper back frame member so that the recess(es) 521 is/are behind the tabs 518 (FIG. 53(*a*)), snapping the side catch features 522 between the side tabs 520*a* and projections 520*b* (FIGS. 53(*c*) and 53(*d*)), then pressing the crush dowels 519 into the respective hollow protrusions 506 on the back frame (FIG. 53(*b*)), deforming the crush dowels 519.

The 'high back' back portion 501' will be formed in the same way as the back portion 501. However, the upper portion of the back frame 503 will have a 'blade' above the opening, which will support the upper end of the cushioning assembly. The cushioning assembly may have a pocket or similar to receive the blade to assist with mounting the cushioning assembly to the blade of the frame.

Moulded Support

Figure 70:
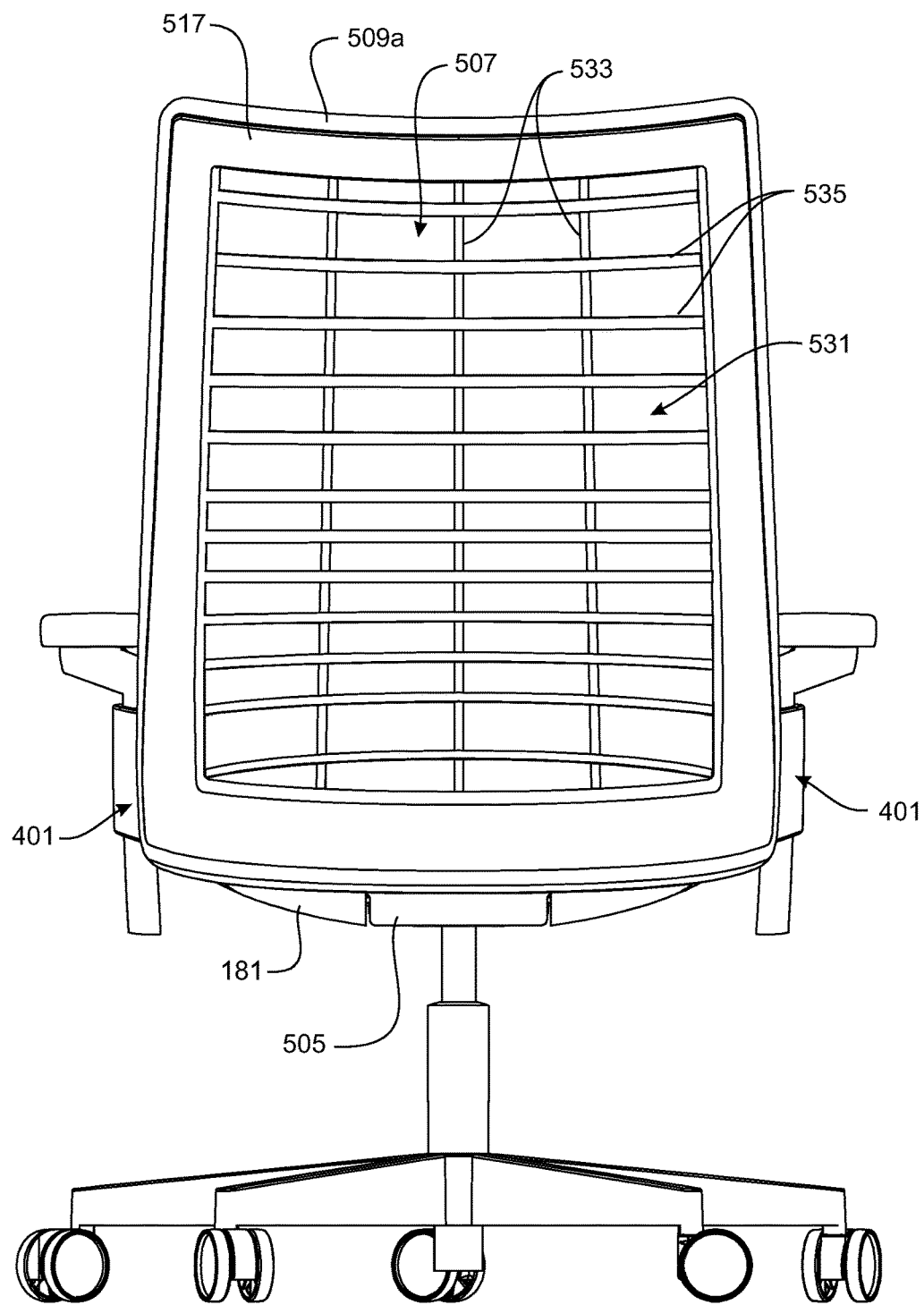
FIG. 70 is a rear elevation view showing the support of FIGS. 55 to 67 attached to the chair back frame and supporting a cushioning member.
Figure 71:
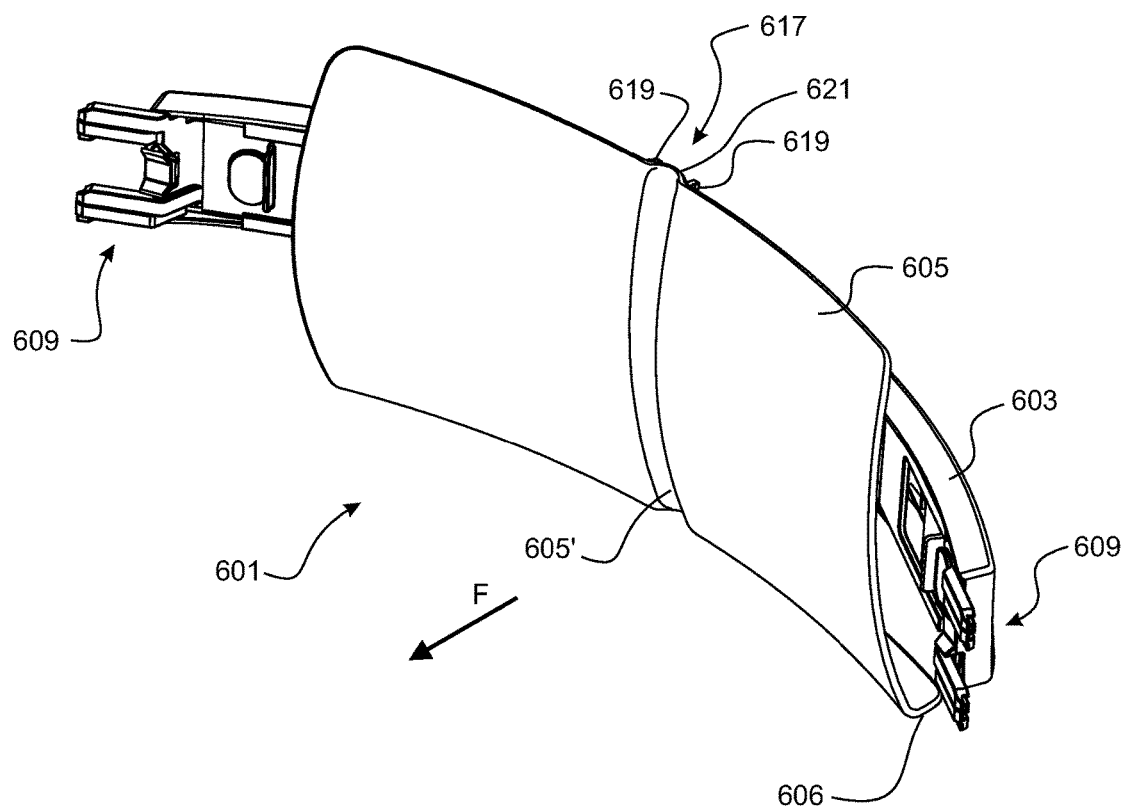
FIG. 71 is a perspective view of a preferred form lumbar support assembly for use in the chair of FIGS. 1 to 7 or 8 to 11, with the lumbar support panel adjusted to an intermediate height and biased to a forward position.

FIG. 70 is a rear view of a preferred form chair showing the support 531 supporting the cushioning assembly member 507 in the back portion 501. The support has the appearance of a plurality of individual longitudinal straps 533 overlaid over a plurality of individual transverse straps 535. While a support comprising a plurality of individual straps has aesthetic advantages, such an arrangement presents a number of assembly and performance disadvantages compared to a one-piece moulded support. Individually attaching many separate straps to a frame is more labour intensive and, where the straps are different lengths presents difficulties in ensuring the straps are in the correct order and orientation. In use, parallel straps are susceptible to twisting or to moving relative to each other, losing the aesthetically appealing grid arrangement.

FIGS. 55 to 70 show a preferred form moulded support 531 for attaching to the frame 503 to form the support shown in FIG. 70 having the appearance of individual straps.

FIGS. 55 to 60, 64(*a*) to (*f*), and 65(*a*) and (*b*) show the support 531 as moulded. The moulded support 531 is substantially flat and comprises a plurality of elongate longitudinal straps 533 and a plurality of elongate transverse straps 535. The transverse straps 535 form a first layer, and the longitudinal straps 533 overlap with the transverse straps 535 to form a second layer that overlies the first layer. Integrally moulded joiner members 536 connect the transverse and longitudinal straps 535, 533 and are positioned at the overlapping portions of the straps 533, 535. Preferably each longitudinal strap is attached to each transverse strap by the joiner members 536.

Figure 65A:
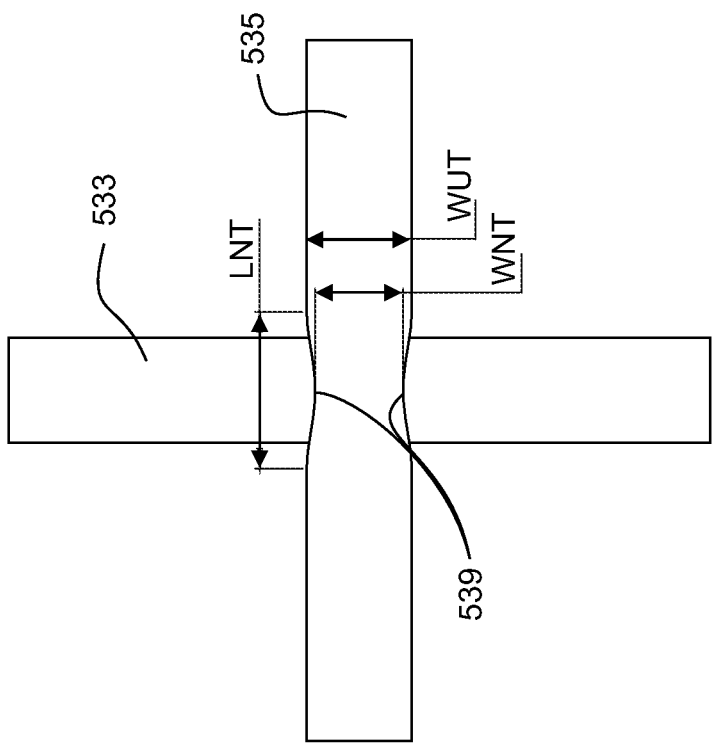
FIGS. 65(a) and (b) show exemplary as-moulded dimensions of the necked regions of the transverse straps and longitudinal straps respectively.
Figure 65B:
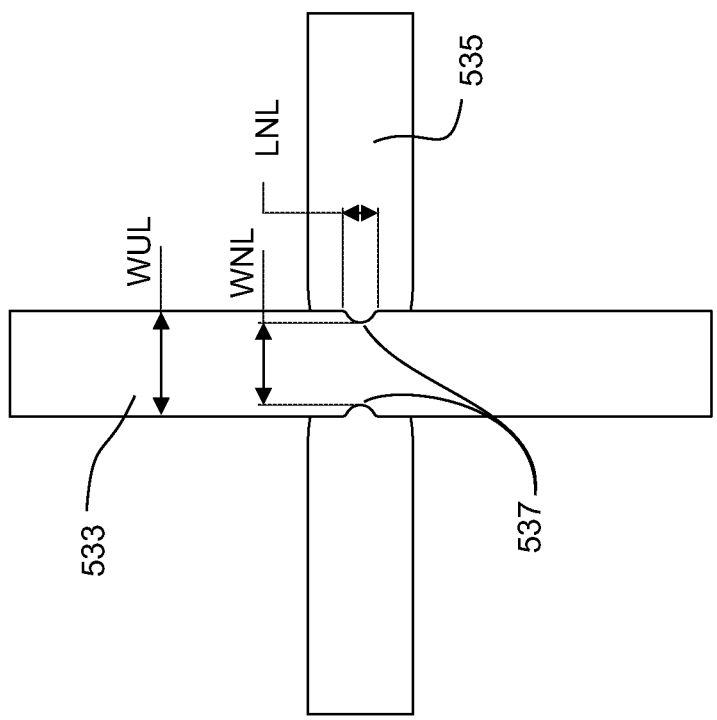

In the as moulded form, the longitudinal and transverse straps 533, 535 preferably have substantially the same cross-sectional width and thickness, at least in the unnecked regions. By way of example, as shown in FIGS. 65(*a*) and (*b*), the straps may have a width WUT, WUL in the unnecked regions of 12 mm, and may have a depth of about 1 mm along their necked and unnecked regions. Alternatively, the longitudinal straps may have different cross-sectional dimensions to the transverse straps if different properties are desired in the longitudinal direction to the transverse direction, or if a combination or differently sized straps are desired for aesthetic reasons.

The lengths of the longitudinal straps 533 may vary to fit a frame 503 with non-parallel upper and lower frame members, or to accommodate differing degrees of curvature in the longitudinal straps 533 in the assembled form. Similarly, the lengths of the transverse straps 535 may vary for the same reasons with respect to the side members of the frame.

The transverse straps 535 and the longitudinal straps 533 may be evenly spaced, or the spacing between adjacent straps may vary. In the form shown, the transverse straps are spaced more sparsely towards the upper portion of the support 531 and are spaced closer together in the portion of the support that corresponds to the lumbar portion of the chair back portion. The support will be less compliant where the straps are closer together, to provide a greater level of support.

The joiner members 536, best seen in FIGS. 64(*a*) to 64(*f*) and 66(*a*) to 66(*f*), are preferably elongate in the transverse direction. In one embodiment, as moulded, the joiner members measure 18.5 mm in the transverse strap direction, 1.0 mm in the longitudinal strap direction, and 2.0 mm deep (to form a gap between the straps of 2.0 mm). The joiner members 536 project from a front face of the transverse straps 535 and connect to a rear face of the longitudinal straps 533.

Both the transverse and longitudinal straps are necked on either side of each joiner members 536 by way or notches or recesses in the sides of the straps. In the form shown, the transverse straps 535 comprise necked regions 539 that comprise recesses extending substantially the length of the joiner members 536. By way of example, the necked regions may have a length LNT of 17.9 mm, and the width WNT of the transverse strap between the recesses may be 10.0 mm, as shown in FIG. 65(*a*).

The longitudinal straps 533 comprise necked regions 537 that, in the form shown, comprise notches. The necked regions as moulded, are longer than the thickness of the joiners 536 but, as moulded, are smaller than the width of the respective transverse strap 535. The necking 539 on the transverse straps 535 is shallower than the necking 537 on the longitudinal straps 533. By way of example, the width WNL of the necked regions between the notches may be 9.4 mm, and the notches may each have a length LNL of about 4.1 mm.

The dimensions of the necked areas are selected to allow the strap to have substantially parallel sides after it has been relaxed post-strain orientation, as described in further detail below. The configuration shown in FIGS. 65(*a*) and 65(*b*) is one example configuration for straps that will be stretched to 450% of their as-moulded lengths to achieve strain orientation. The ratio of the two width dimensions will increase or decrease depending on the intended stretching percentage.

FIG. 67 is a view similar to FIG. 65 but showing alternative exemplary dimensions of one of the neck areas. In this embodiment, the dimensions LNT', WUT', WNT', WUL', and WNL' are the same as the respective dimensions LNT, WUT, WNT, WUL, and WNL described with reference to FIG. 65. In this embodiment, LNL' is a shorter dimension of 3.5 mm compared to the 4.1 mm of LNL of FIG. 65. This version has radiuses LR of about 1.25 mm in the region where the necked area 537 meets the straight sides of the longitudinal strap 533. The larger radiuses further assist with obtaining substantially parallel sides in the strap 533 after the strap has been relaxed post-strain orientation. In this embodiment, each strap has a main body depth of about 1.5 mm along the necked and unnecked regions, and the elongate ribs extending along the straps may each have an additional depth of about 0.5 mm. Post-strain orientation, the main body depth of each strap, excluding the elongate rib, will be about 1.0 mm.

The selected ratio for the transverse straps in these embodiments, is 0.833 (10/12=0.833). If the stretching percentage was to increase then the ratio of the necked width WNT to the strap width WUT would decrease. For example, if the stretching percentage increased to 600%, the necked width WNT might be reduced to 8.7 giving a ratio of 0.725 (8.7/12). Alternatively, if the stretching percentage was to decrease the ratio of necked width WNT to strap width WUT would increase. For example if the stretching percentage decreased to 400%, the necked width WNT might be increased to 10.2 giving a ratio of 0.85 (10.2/12).

The same principle applies to the necked area on the longitudinal straps with the dimensions shown being intended for the strap to have substantially parallel sides after relaxing following from stretching to 450%. The selected ratio for the longitudinal strap for an elongation to 450% is 0.783 (9.4/12).

The other dimensions (necked region lengths LNT which in this embodiment=17.9 mm and LNL which in this embodiment=4.1 mm) are related to the dimensions of the joiner itself.

Figure 63:
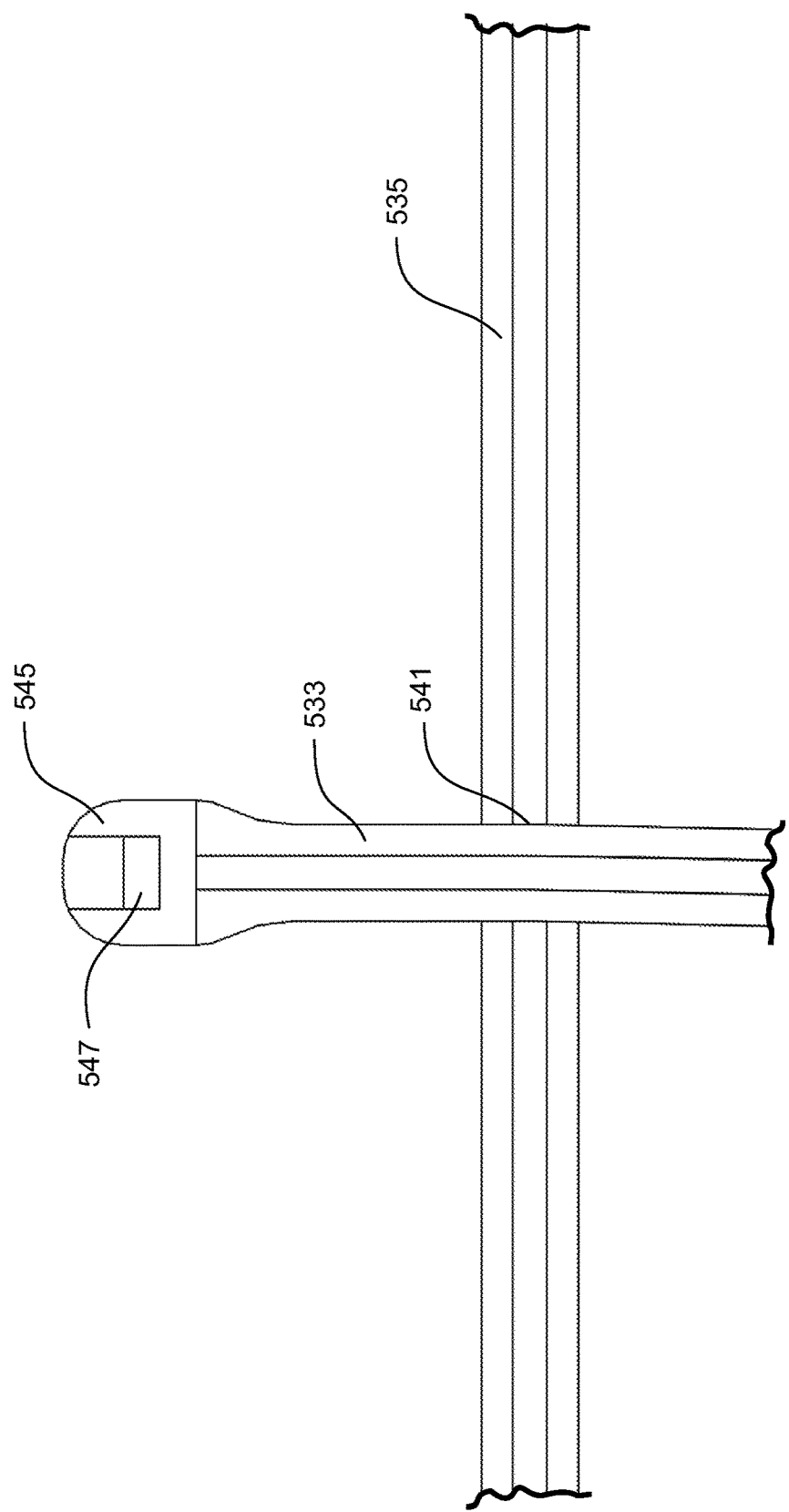
FIG. 63 is a detail view from the front of the overlapping intersection of one longitudinally extending strap and one transversely extending strap in the configuration of FIG. 61, showing one of the strap attachment features.

The elongate ribs shown on the front surfaces of the straps in FIG. 63 aid stretching and strain orientation, and aid moulding material flow where the joiner meets the straps.

It will be appreciated that the configurations and dimensions of the joiner members, straps, and necked regions may vary without departing from the scope of this aspect of the invention.

The support 531 can be moulded using any suitable method known to a person skilled in the art. By way of example, the support could be injection moulded using the method described in our PCT publication number WO 2009/126051, and the contents of that specification are incorporated herein in their entirety by way of reference. As the preferred form support doesn't have the fine members described in that publication, the support could alternatively be moulded using more conventional moulding parameters.

The support 531 is moulded from one or more materials that are suitable for strain orientation. Examples of suitable materials include some of the HYTREL materials available from Du Pont. In an as-formed HYTREL article, the polymer chains in the material are relatively random. By stretching the article, the polymer chains become relatively aligned. That phenomenon is strain orientation. Strain orientation changes the material properties. Typically, the material becomes stronger and more elastic; that is the elastic limit is increased in comparison to the as-formed material. Additionally, the article generally lengthens in the direction of stretching and reduces in cross-section.

In the preferred form, the material is a thermoplastic polyester elastomer. Preferably, the thermoplastic polyester elastomer is a block copolymer comprising a hard (crystalline) segment of polybutylene terephthalate and a soft (amorphous) segment based on long chain polyether glycols. Preferably, the thermoplastic polyester elastomer resin is selected such that the article formed by the moulding method, once fully cured and prior to strain orientation, has a hardness in the range of about 30D to about 55D when tested in accordance with ASTM D2240. More preferably, the thermoplastic polyester elastomer resin is selected such that the article has a hardness in the range of about 30D to about 46D, more preferably in the range of about 35D to about 45D, preferably in the range of about 36D to about 44D, more preferably in the range of about 37D to about 43D, more preferably in the range of about 38D to about 42D, more preferably in the range of about 39D to about 41D, most preferably about 40D.

The thermoplastic polyester resin is preferably one of HYTREL 4069, HYTREL 4556, HYTREL 5526, HYTREL 5556, HYTREL 3078. Most preferably, the resin is HYTREL 4069. The resin may additionally include stabilisers and/or additives to achieve desired properties, for example to improve its resistance to UV light, fire, heat aging, moisture, and/or to make the resin a suitable colour.

The moulded article of the present invention could be formed from any other resins having suitable properties.

The moulded support of FIGS. 55 to 60 is then stretched in both directions as represented by arrows SL, ST to form the elongated support 531 shown in FIGS. 61 to 63 and 70. In this elongation step, the straps 533, 535 are each stretched SL, ST in their longitudinal direction to lengthen the straps. This elongation causes strain orientation of the material in the straps, as well as in the joiner members 536. There is less strain orientation in the necked regions 537, 539 of the straps adjacent the joiner members 536, due to the increased material thickness and the resulting reduction in elongation. When the straps are fully stretched, the regions 537, 539 are the widest parts of the straps. As the support is relaxed, the sides of the straps relax to be substantially parallel along their lengths, including in regions 537, 539. The dimensions of the stretched support during this step are greater than the dimensions of the frame that the support is to be attached to. That is, the longitudinal straps 533 are stretched SL to a length greater than the distance between the upper and lower portions 504b, 504c of the frame, and the transverse straps 535 are stretched ST to a length greater than the dimensions between the frame side members 504a.

Preferably, the stretched length of the straps is between about 4 and about 5 times the as-moulded dimension of the straps, and preferably about 4.5 times the as-moulded dimension. Each strap is preferably stretched by proportionally the same amount. That is, the straps might each be stretched to 450% of their initial moulded length, for example. That ensures that any straps that are moulded to have the same cross sectional dimensions but different lengths, will also have substantially the same cross sectional dimensions in their stretched form, and the proportional difference in length between the straps will be maintained. The elongated straps will therefore also have the same strain orientation and properties despite their differing lengths. Alternatively, if different properties are desired for different straps, for example if more compliance is required at different points in the support, the straps may be elongated to different extents.

The straps may be elongated one at a time. Alternatively all of the longitudinal straps 533 may be elongated together, followed by all of the transverse straps, or conversely all of the transverse straps 535 may be elongated together, followed by all of the longitudinal straps 533. As another alternative, all of the longitudinal and transverse straps may be elongated simultaneously.

After the straps are elongated, the tension applied to the straps is released and the straps relax back down to an un-tensioned state. FIGS. 61 to 63 and 66 show the support 531 in the relaxed state. Due to the alignment of the material in the straps, the length of the relaxed straps is longer than the initial length of the straps in their moulded form. In the relaxed state, the dimensions of the stretched support during this step are smaller than the dimensions of the frame that the support is to be attached to. That is, the longitudinal straps 533 are shorter than the length between the upper and lower frame members, and the transverse straps 535 are shorter than the dimensions between the frame side members.

Figure 61:
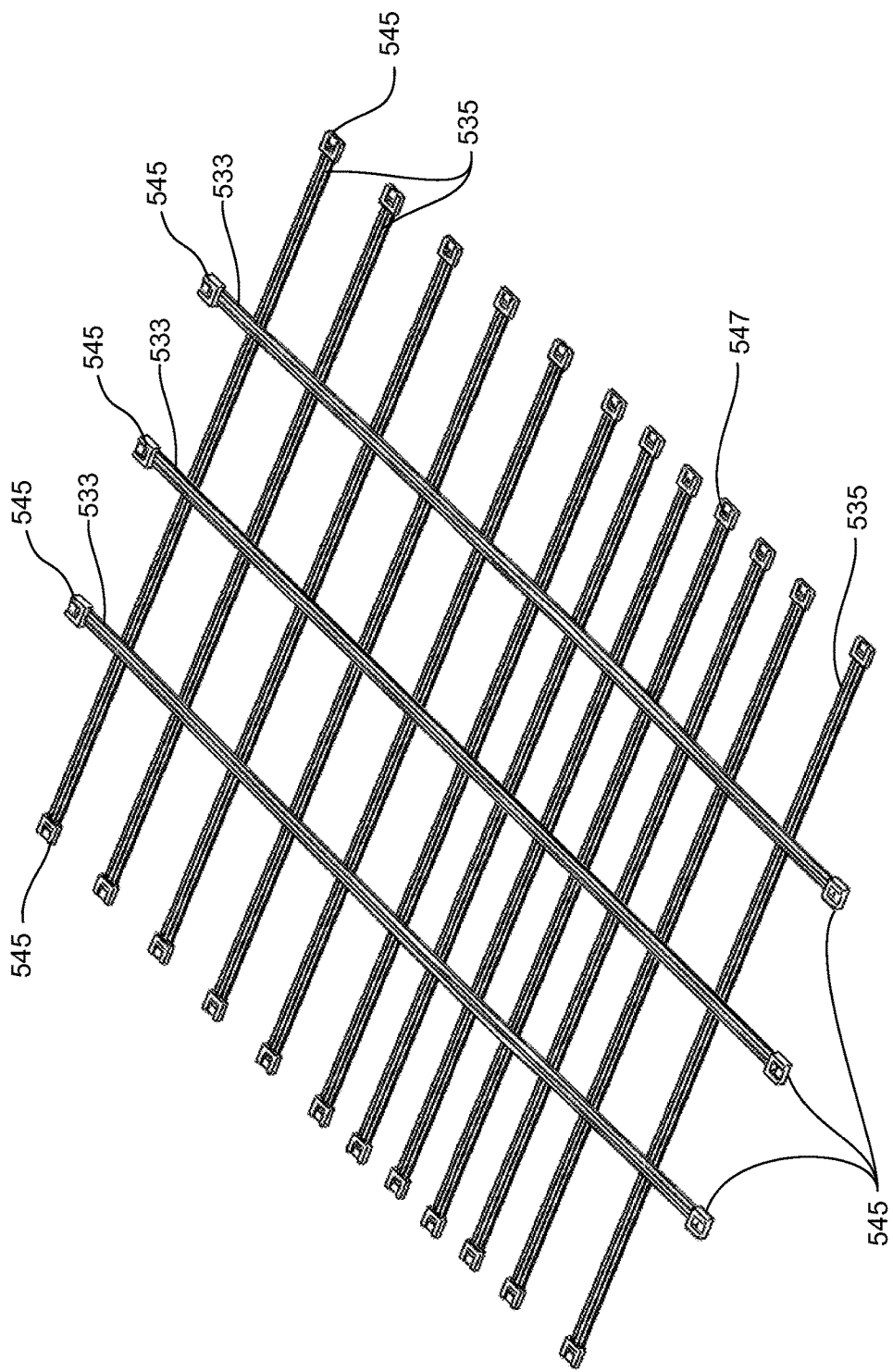
FIG. 61 is a front perspective view of the support of FIG. 55, in a post-strain orientation relaxed configuration.
Figure 62:
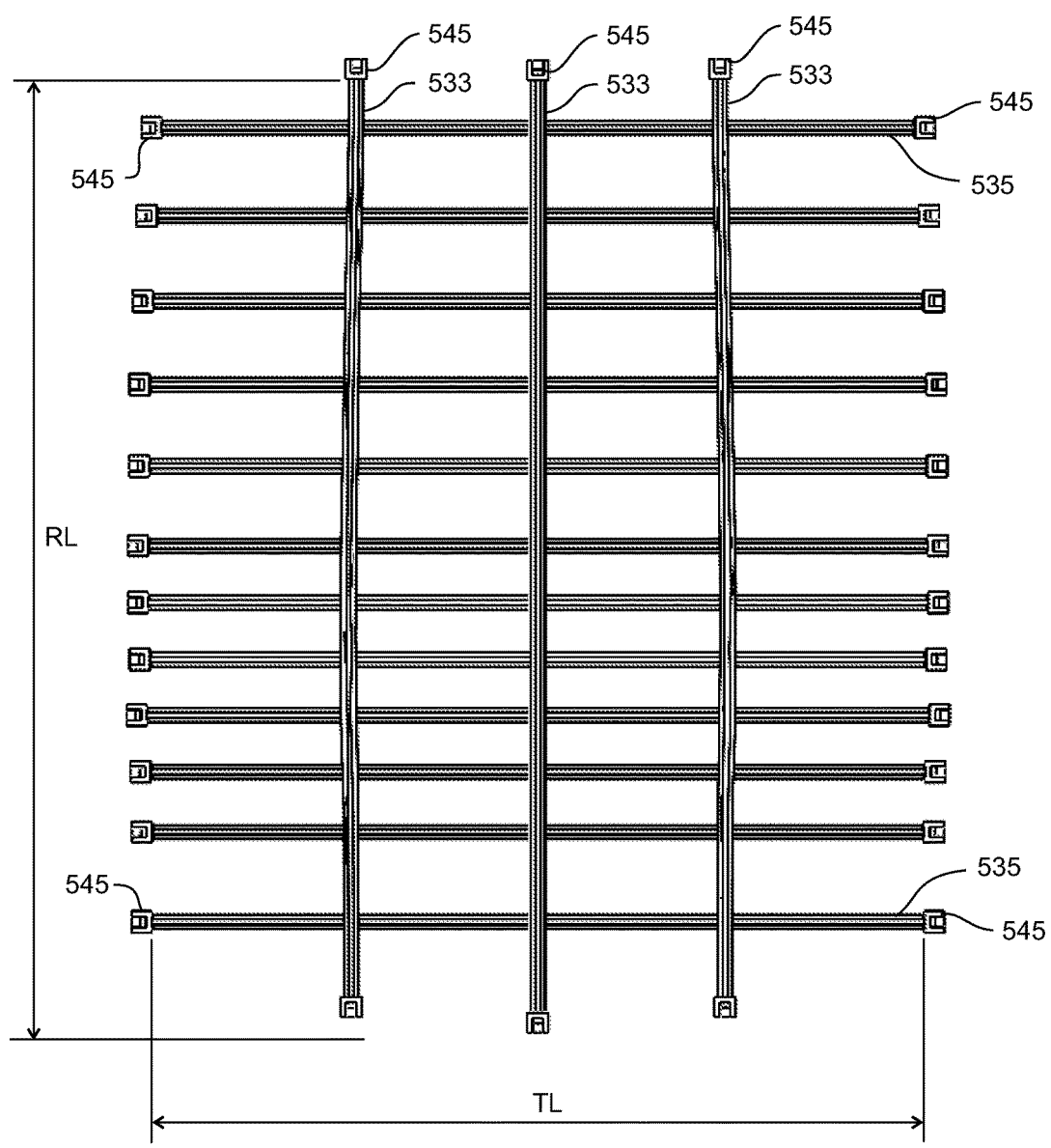
FIG. 62 is a plan view from the front of the support in the configuration of FIG. 61.
Figure 66:
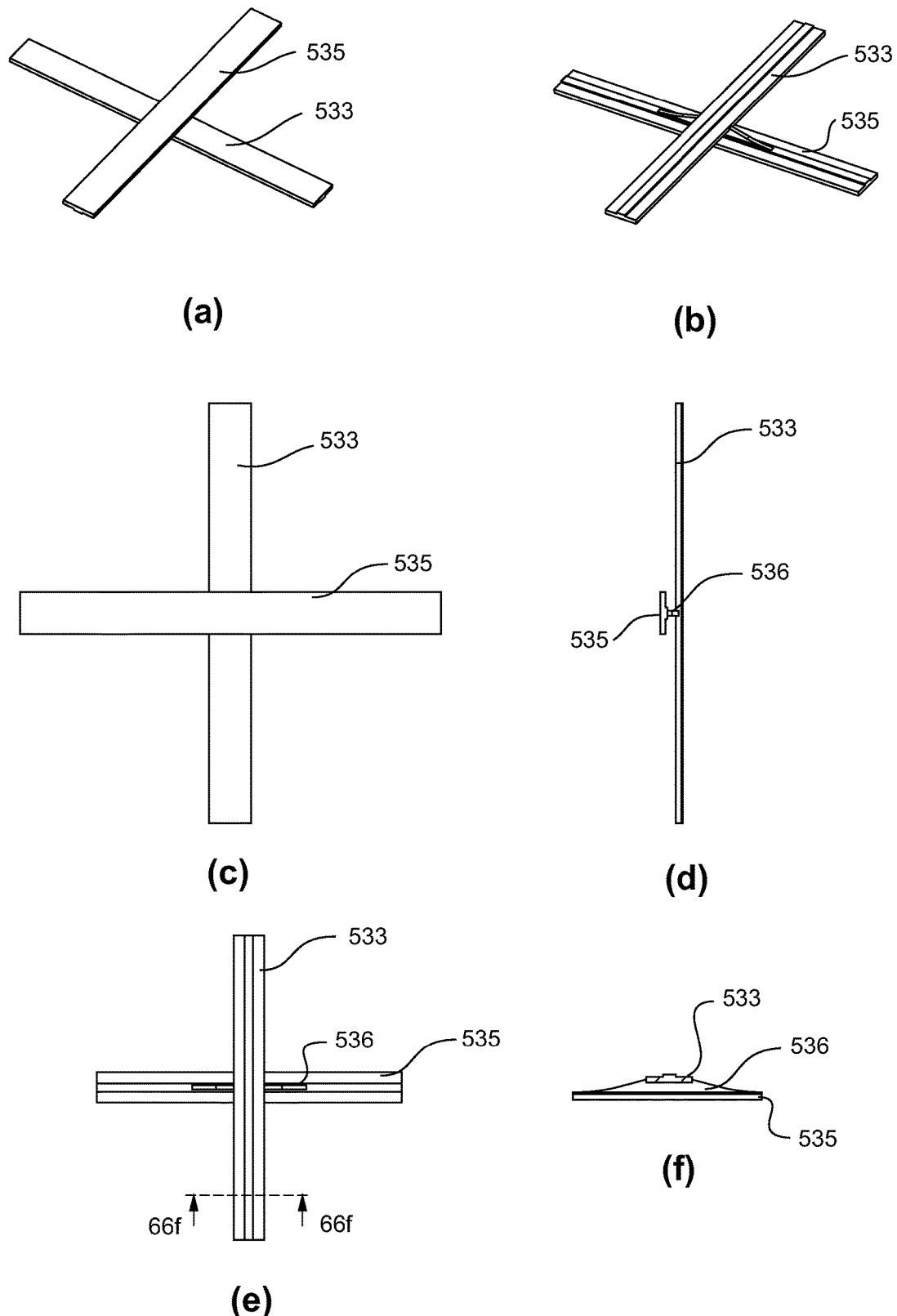
FIGS. 66(a) to (f) are views showing one of the joiner members that connect the longitudinally extending straps to the transversely extending straps, in the configuration of FIG. 61, where 66(a) is a rear perspective view, 66(b) is a front perspective view, 66(c) is a rear plan view, 66(d) is a side elevation in the transverse direction, 66(e) is a front plan view, and 66(f) is a section view taken through line 66f-66f of FIG. 66(e)

As can be seen in FIGS. 61, 62, and 66, in the post-elongation relaxed state, the sides of the transverse straps 535 are parallel, and the sides of at least the portions of the longitudinal straps 533 that are visible from the transverse strap side of the support, are parallel. This gives the appearance of individual straps from behind the back portion of the chair. Preferably, the sides of the longitudinal straps are parallel along their entire lengths. During elongation of the straps, the width of both the necked portions of the straps and the unnecked portions of the straps decrease. However, the reduction in width is greater in the unnecked portions due to greater strain orientation. This compensates for the smaller reduction in width of the necked portions such that the width of the necked portions is substantially the same as the width of the unnecked portions post-strain orientation.

The necking 539 on the transverse straps 535 is has a more gentle curvature than the necking 537 on the longitudinal straps 533. It is desirable that the joiner members 536 are oriented so that the necking in the longitudinal direction of the joiner members 536 is on the transverse straps 535 that form the rearmost layer of the support 531. This is because after strain orientation, the edges of the straps may not be perfectly parallel in the necked regions 537, 539 adjacent the joiner members 536. Any difference in the width of the strain oriented straps in the necked regions tends to be less pronounced with the more gently-curved necked regions. Therefore, it is desirable that the straps with the more tightly curved necked regions are the straps that form the front layer of the support, such that any irregularities in the widths of those straps at the necked regions are obscured by the rearmost straps 535 from behind, and by the cushioning assembly from the front.

In an alternative configuration where the support 531 is uncovered to provide an exposed occupant supporting surface in use and is visible from the front portion of the chair, the support could effectively be reversed so that the transverse straps 535 with the more gentle curvature necking are positioned in front of the longitudinal straps 533. Alternatively, the longitudinal straps may be positioned in front of the transverse straps, but the joiner members 536 may be reoriented so they are elongate in the longitudinal direction, and the longitudinal straps may be provided with the more gentle curvature necking.

Preferably, the post-stretching relaxation lengths of the straps RL, RT is between about 1.5 and about 2.7 times the as-moulded dimension, preferably about 2.1 times the respective as-moulded strap lengths IL, IT. Following strain orientation, both the transverse and longitudinal straps will be longer than prior to strain orientation, and will have a smaller cross-section, both in a width and depth direction. For example, the depth of the straps may reduce from 1.5 mm to 1.0 mm. This is evident from the figures by the increased distance between the transverse and longitudinal straps. That is, the lengths of the SL, ST straps will be greater than the initial lengths IL, IT, and the strap cross-sections will be smaller than the initial strap cross-sections. The post-stretching relaxation lengths RL, RT will be smaller than the lengths of the stretched SL, ST straps, but greater than the initial lengths IL, IT. The post-stretching relaxation strap cross-sections will be between the initial strap cross-sections and the stretched strap cross-sections.

In the preferred form shown, the as-moulded length of the longest longitudinal strap 533 is about 255 mm. That is stretched out to 1147.5 mm, but could be stretched any suitable amount relative to its starting length, such as between about 4× and 9× its starting length. Similarly, in the form shown, the as-moulded length of the longest transverse strap 535 is about 210 mm. That is stretched out to 945 mm, but could be stretched any suitable amount relative to its starting length, such as between about 4× and 9× its starting length. The longest longitudinal strap is then relaxed to 519 mm, and the longest transverse strap is relaxed to 426 mm. The relaxed lengths (and therefore the initial moulded lengths and the extent of stretching) will vary for different frame configurations or different desired final product tensions.

The sizes of the joiner members 536 also change due to the strain orientation that occurs when stretching the longitudinal straps 533 and the elongate straps 535. For example, the joiner members 536 may initially measure 18.5 mm long, 1.0 mm wide, and 2.0 mm deep (the dimension between straps), and may measure 28.5 mm long, 0.8 mm wide, and 1.8 mm deep after elongation. These width and depth measurements are taken through the centre of the joiner members. These are values at the centre of the joiner members, as the joiner members will have radii where they intersect with the transverse and longitudinal straps for moulding and strength purposes. The joiner members 536 are strain oriented in both the longitudinal and transverse directions of the support, as a result of stretching both the longitudinal straps 533 and the transverse straps 535. The reduction in width of the joiner members from 1.0 mm to 0.8 mm is less than it would be if the joiner members were not strain oriented in a direction across the width of the joiner members a result of stretching the longitudinal straps 533.

While the joiner members are shown as being longer than the width of the longitudinal straps, that is primarily for moulding purposes. The joiner members could be any other suitable shape or size.

Each of the transverse and longitudinal straps comprises an attachment portion 545 at each of its ends. The attachment portions 545 are integrally formed as part of the moulding process, and are used to attach the cover to the frame 503. In the form shown, the attachment portion 545 comprises a portion of increased thickness having an aperture 547. During stretching of the support 531, the attachment portions are generally not elongated to any great extent, so strain orientation does not occur or does not occur to a great extent in the regions of the side attachment features and the material in those portions remains substantially unaligned.

Figure 68:
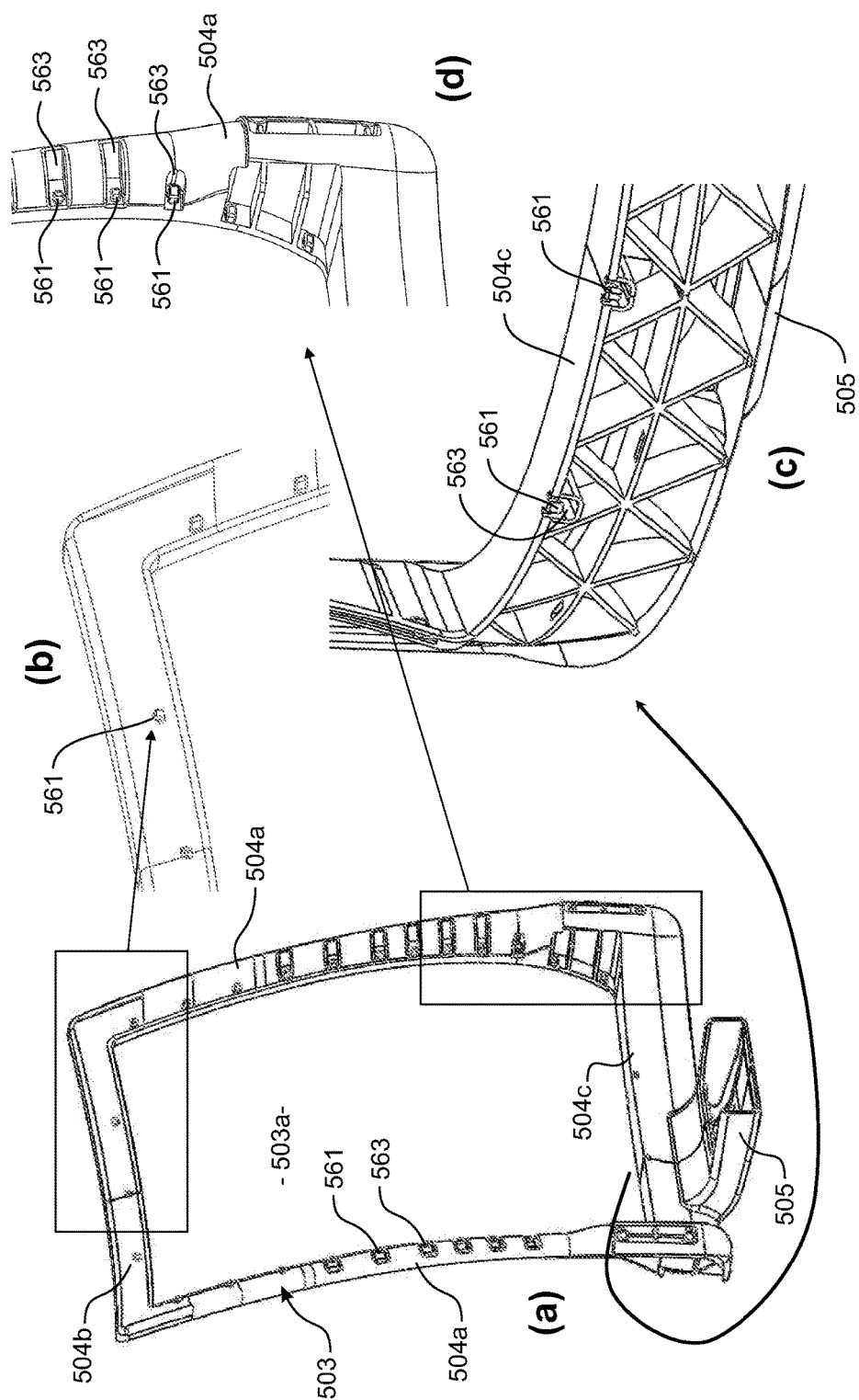
FIGS. 68(a) to (d) show features on the back frame for connecting the moulded support to the back frame, where 68(a) is a front perspective view of the back frame, 68(b) is a view of one of the attachment features on the top frame member, 68(c) shows two attachment features on the bottom frame member, and 68(d) shows some of the attachment features on a side frame member.
Figure 69:
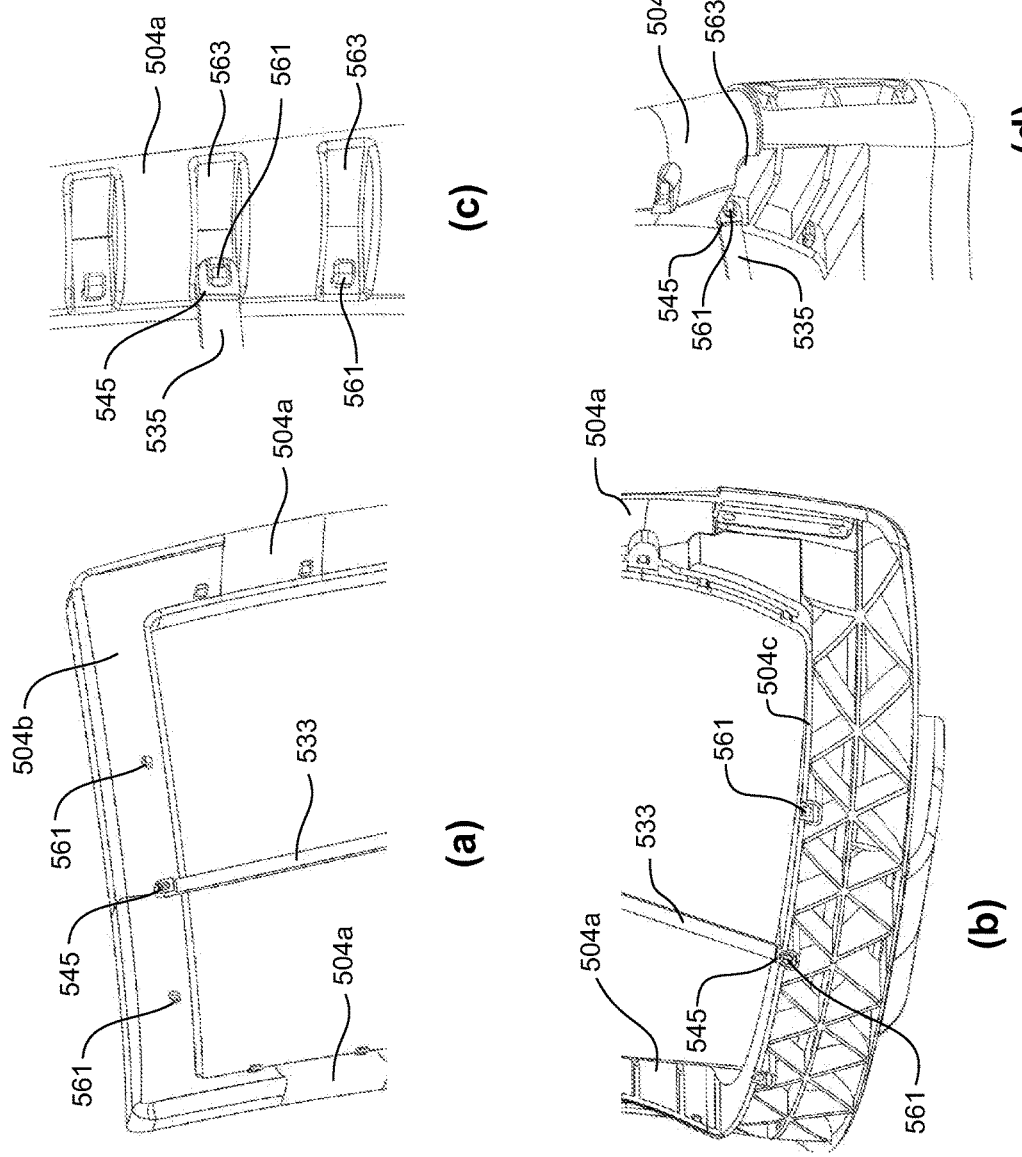
FIGS. 69(a) to (d) are similar to FIGS. 68(a) to (d), but showing some of the elongate strap members attached to the frame, where 69(a) shows the attachment of one of the longitudinal straps to the top frame member, 69(b) shows the attachment of one of the longitudinal straps to the bottom frame member, 69(c) shows the attachment of one of the transverse straps to a side frame member at an upper portion, and 69(d) shows the attachment of one of the transverse straps to a side frame member at a lower portion.

FIGS. 68(*a*) to 69(*d*) shows a preferred attachment of the support 531 to the back frame 503. The back frame is provided with a plurality of hooks 561 that are integrally moulded as part of the frame. In the preferred form, the hooks are spaced apart around the perimeter of the frame and each define a recess between the hook and the frame.

The hooks are provided on a front face of the top frame member 504*b*, on a front face of the side frame members 504*a*, and in a rear face of the bottom frame member 504*c*. The hooks face outwardly from a centre of the back portion, so tension in the support 531 keeps the support engaged with the hooks in use. At least some of the hooks are provided in recesses 563 in the frame, with the recesses sized to receive the integral connectors 545 on the straps. The top and side hooks shown in FIG. 69*a* may be provided in recesses, or may be surface-mounted as shown.

The support can be mounted to the back frame by inserting the hooks 561 through the apertures 547 that are provided on the attachment portions 545.

The spacing of the hooks 561 on the side portions 504a of the frame corresponds to the spacing of the transverse straps 535. The spacing of the hooks on the upper and lower frame members 504b, 504c corresponds to the spacing of the longitudinal straps 533. The spacing of the hooks may be even for evenly spaced straps, or may vary if the spacing of straps varies, to provide greater support in one portion of the support. For example, in the form shown, the hooks on the side portions of the frame are more closely spaced near the lumbar region of the back portion, to provide greater support to the lumbar region of a user.

To mount the support to the frame, one end 545 of each of the transverse straps 535 is hooked to the frame. The straps are then stretched and the opposite ends of each strap at hooked to the frame. This process is then repeated for the longitudinal straps 533 which are positioned in front of the transverse straps. Alternatively, the support may be stretched again to or beyond its final dimensions and then connected to the frame. Alternatively, the support could be relaxed onto the frame after expanding the support to strain orientate the straps.

The attachment features could all be provided on a front face of the frame, on a rear face of the frame, or on a combination thereof. Rather than being hooks, the attachment features could instead be projections. However, hooks are preferred to provide a more positive engagement.

In an alternative embodiment, the attachment features on the frame may primarily serve a locating function. The support could additionally be secured to the frame by any suitable means, such as adhesive, fasteners, or welding the support to the frame for example.

In the completed article, the longitudinally extending straps 533 extend between upper and lower transverse back frame members (or between front and rear seat frame members in the case of a seat), and the transverse members 535 substantially extend between side frame members. The end result in at least preferred embodiments is a compliant suspended support surface that is pliable, and has good creep resistance and tensile strength.

In the form shown, the straps 533, 535 are substantially flat members. Alternatively, the straps or the moulded support 531 may have a curved profile formed as part of the moulding process. By way of example only, at least part of the article may have a curved side profile and/or a curved top profile that is formed as part of the moulding process. By moulding the article, it can readily be formed with a three dimensional profile. The contour of the support may be changed by attachment of the support to a contoured frame. For example, in the form shown, the flat moulded support 531 has a forwardly convex form when it has been attached to the forwardly convex back frame.

The moulded support 535 has been described above in reference to a support for the back portion of a chair. Alternatively, the moulded support may have other applications. The moulded article may be a support surface for a chair, for example. Preferably, the seat or back frame comprises an opening that is at least partly bounded by frame members, and the method comprises supporting the moulded article from the frame with part of the moulded article extending across the opening, to form a compliant suspended support surface.

If the article is to be used as seat surface rather than a back surface, the thickness of the straps 533, 535 may be greater than mentioned above; for example about twice the thickness mentioned above. Alternatively or additionally, the widths of the elongate straps 533, 535 could be greater than mentioned above; for example about twice the widths mentioned above.

However, the moulded article may be any other suitable type of article. By way of example only, the articles could have application as or in: resistance members in exercise equipment; contact sport helmets; helmet and hat liners; harnesses for backpacks, climbing, safety, paraponting, bungee jumping; support surfaces for baby products including car seats, bouncy beds, baby buggies, cots; trampolines such as springs, mats, minitramps, fire trampolines; other furniture such as dental chairs, aeroplane seating, stadium seating, outdoor furniture; bedding, such as mattress replacements, mattress support surfaces, or pillows; automotive seating, soft tailgates, canopies; hammocks; wake board, snow board, and/or ski bindings; bicycle seats; luggage stowage in transport; hitting surfaces of racquets for sports such as tennis, squash, badminton; wetsuits such as flexible inserts; yachting, such as a catamaran trampoline surface. For such alternative applications, the elongate straps 533, 535 could have significantly different cross-sectional dimensions and lengths from those mentioned above. The extent to which the straps are elongated may also vary. For example, for higher load capacities, the members could have larger cross-sections.

The above describes preferred forms of the moulded support, and modifications can be made thereto without departing from the scope of this aspect of the present invention. For example, the moulded article is described as being a support for the back of a reclining office chair. However, it will be appreciated that such an article can readily be incorporated into different types of chairs, such as dental chairs, meeting seats, vehicle seats, stadium seats, theatre seats, aircraft or other vehicle seats for example. The supporting frame could be modified accordingly, so as to be fixed to the ground or a wall panel for example for a theatre seat.

It will also be appreciated that the principles of this aspect of the invention could be used to provide straps that, in the post-strain orientation form, have a desired shape where the straps are not parallel along their sides. For example, it may be desired to form straps that have specific undulations along their lengths. In such a configuration, the dimensions of the necked regions relative to the unnecked regions will be varied relative to the intended amount of stretching of the straps to cause strain orientation.

For example, rather than being formed as a moulded support 531, the straps 533, 535 of the back portion could be separate extruded straps that are strain oriented and connected to the back frame to provide support for the cushioning assembly 507. However, the moulded integral support 531 is preferred, as the joiner members 535 link the straps 533, 535 to each other, and prevent the straps from moving significantly relative to each other. If separate straps are used, they would need to be separately tethered to each other to prevent excessive independent movement of the straps, such as via adhesive, welding, or the like. Therefore, the preferred form moulded support described above provides significant manufacturing efficiencies over this alternative form.

As another example, the moulded support 531 is described as being used to support a cushioning assembly on a frame. Instead, the moulded support 531 could form the body-contacting surface that supports the seated occupant.

Other example modifications to the moulded article and its use are listed in the 'Summary of the Invention' section.

Lumbar Support

Figure 73:
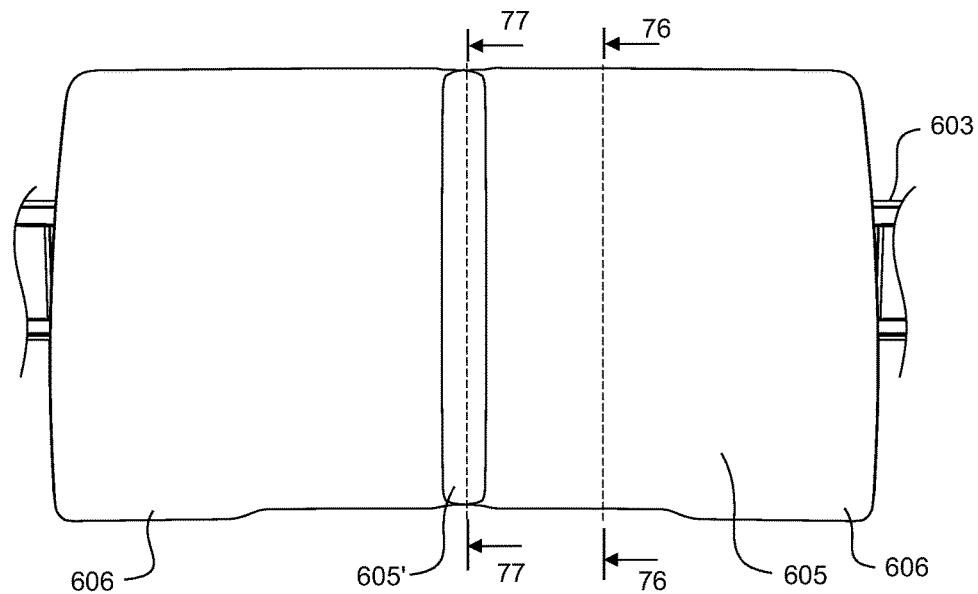
FIG. 73 is a front view of the lumbar support assembly of FIG. 71.
Figure 74:
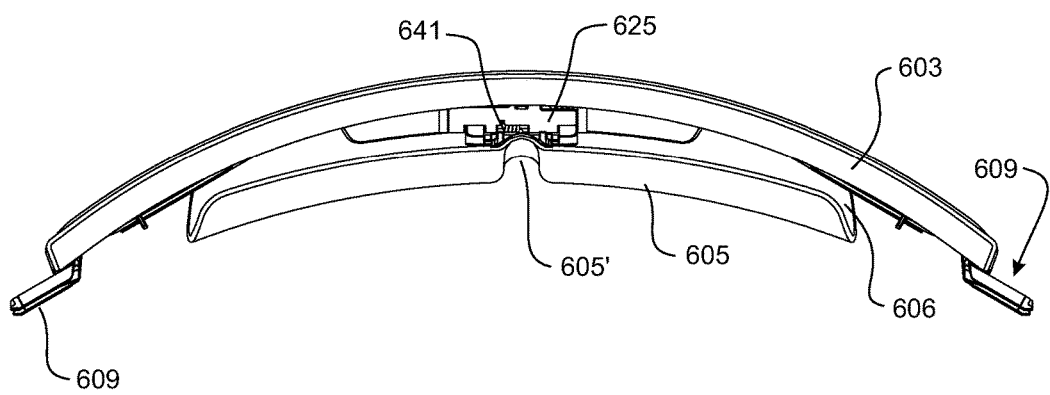
FIG. 74 is a plan view of the lumbar support assembly of FIG. 71.
Figure 75:
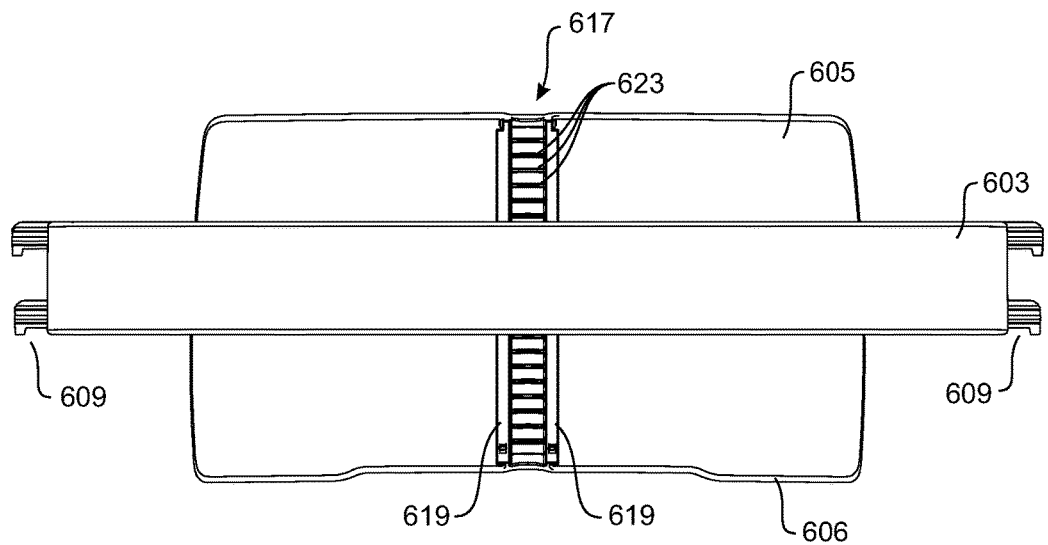
FIG. 75 is a rear view of the lumbar support assembly of FIG. 71.

The chair 101, 101' has a lumbar support assembly 601 arranged with the back assembly 501 to provide support to the lumbar region of a user's back. A preferred form lumbar support assembly is shown in FIGS. 71 to 84(c). The lumbar support assembly 601 comprises a lumbar support member or pad 605 operatively connected to a mounting member 603 via a carrier 611 and biasing mechanism 607. The mounting member 603 in turn attaches to the back assembly 501, 501' to mount the lumbar support member 605 rear of a user support surface 551 of the back assembly using attachment mechanisms 609, as will be described below. The biasing mechanism 607 forwardly biases the carrier 611 and lumbar support member 605. FIGS. 73 to 75 show the support assembly in front, top and rear elevation.

In a preferred embodiment, the lumbar support member or pad 605 comprises polycarbonate, and the mounting member 603 comprises polypropylene. The other components of the support assembly may comprise other suitable materials such as moulded nylon or steel for example.

The lumbar support member 605 is slidably mounted on the carrier 611 for selectively vertically adjusting the position of the lumbar support relative to the mounting member 603. The lumbar support member 605 comprises an elongate guide portion 617 on a rear side of the lumbar support member. The guide portion may be fixedly or otherwise attached to the lumbar support member 605, or may be integral with the lumbar support member 605. Preferably the guide portion 617 is centrally positioned on the support member 605. The guide portion 617 comprises two laterally extending guide flanges 619 and the carrier 611 comprises two complementary channels 613 with open top and bottom ends that slidably receive the guide flanges 619, such that the lumbar support member 605 can slide relative to the carrier 611.

The guide portion 617 comprises a central section having a series of vertically spaced engagement features which, in the form shown, are rearward-facing notches 623. FIG. 75 is a rear elevation of the support assembly 601 and shows the series of notches 623. The carrier 611 comprises an engagement member which, in the embodiment shown, is a forwardly projecting detent 615 that is engageable with the notches 623 to fix the height of the lumbar support member 605 relative to the carrier 611. The detent 615 is preferably resilient and resiliently moves relative to the remainder of the carrier 611 to engage and disengage respective notches as the height of the lumbar support member 605 is adjusted, such that the lumbar support member 605 is selectively adjustable relative to the carrier 611 between a plurality of heights. When sufficient upward or downward force is applied to the lumbar support member 605, that will override the forward bias force of the detent 615 and enable the vertical adjustment to occur. The lumbar support member 605 comprises two rearwardly-directed grasping handles 606 at its lower edge to enable a user to easily adjust the height of the lumbar support member 605.

Preferably, the detent 615 and the notches 623 are arcuate for smooth adjustment and to reduce noise between the detent 615 and notches 623 during height adjustment of the lumbar support member 605. Alternatively, the notches 623 and detents 615 may be other shapes, for example they may comprise angled surfaces.

In an alternative embodiment the carrier 611 may comprise an engagement feature comprising a notch on a moveable member, and the engagement features on the support member 605 may comprise a plurality of protrusions for engaging the notch. It will be appreciated that the carrier 611 may have more than one engagement feature to engage in the plurality of engagement features on the support member 605. Similarly, it will be appreciated that instead of flanges and a channel, the lumbar support member 605 and carrier 611 may comprise alternative complementary guide features. For example, the carrier 611 may comprise lateral guide projections and the lumbar support member 605 may comprise complementary channels or slots for receiving those projections.

Figure 76:
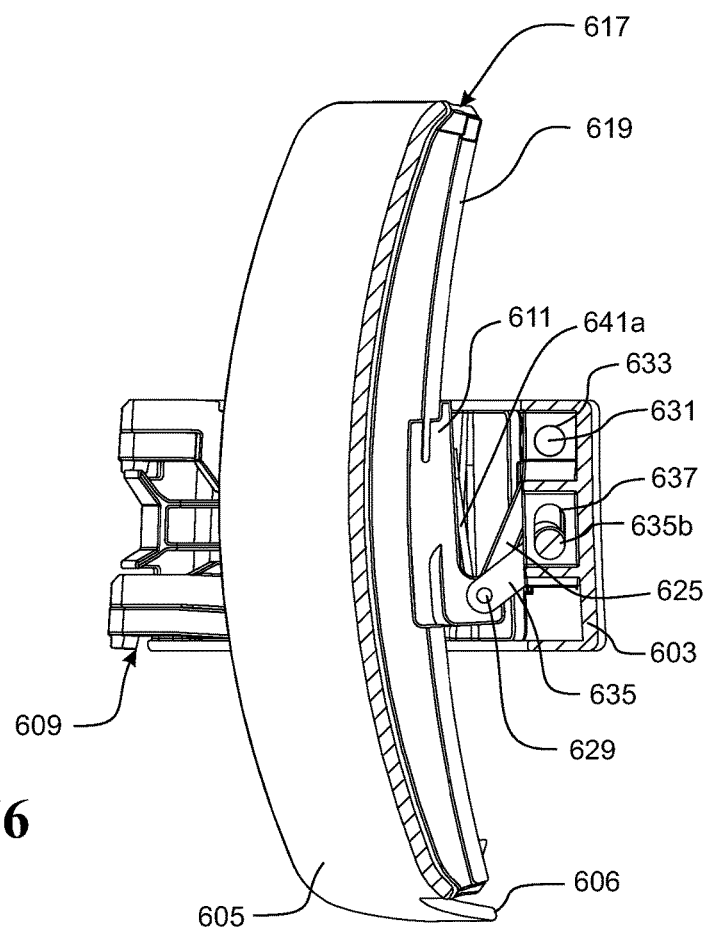
FIG. 76 is a section view of the lumbar support assembly of FIGS. 71 to 75, taken through section 76-76 of FIG. 73.
Figure 77A:
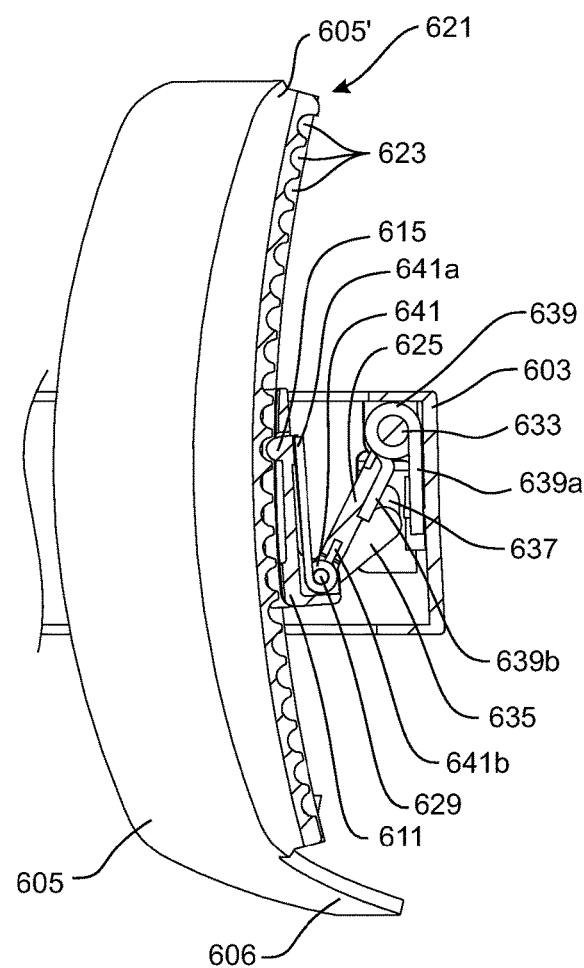
FIG. 77(a) is a section view of the lumbar support assembly of FIGS. 71 to 76, taken through section 77-77 of FIG. 73.
Figure 77B:
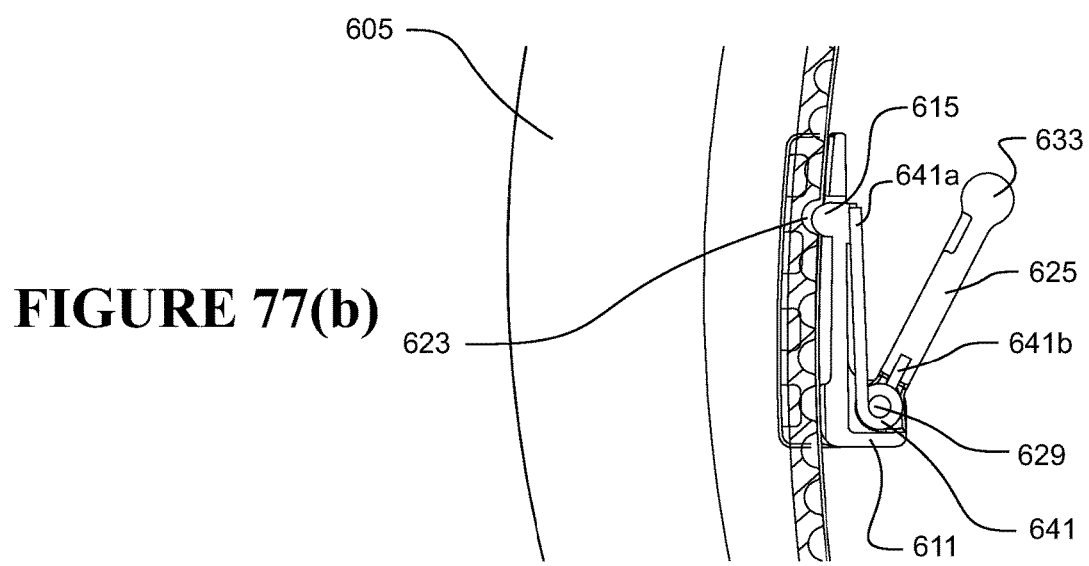
FIG. 77(b) is a detail view of part of FIG. 77(a)

The section views of FIGS. 76, 77(a), and 77(b) show the assembled biasing mechanism 607 according to a preferred form embodiment. In that embodiment, the biasing mechanism 607 comprises an intermediate member 625 operatively connected to the mounting member 603 and the carrier 611. The intermediate member 625 is preferably pivotally connected to the mounting member 603 at a first pivot 631, 633 and pivotally connected to the carrier 611 at a second substantially parallel pivot 626, 627 via a pin 629. In the embodiment shown, the pivot 633 on the mounting member 603 is provided in three protruding tabs. Alternatively two or more than three tabs may be provided.

A first biasing member 639 is arranged between the mounting member 603 and the intermediate member 625 for biasing the intermediate member angularly away from the mounting member 603. A second biasing member 641 is arranged between the detent 615 and the intermediate member 625 for angularly biasing the detent 615 away from the intermediate member 625 and into engagement with the notches 623. The section view of FIGS. 77(a) and 77(b) are taken through the centre of the detent 615 and shows the second biasing member 641 biasing the detent into engagement with one of the notches 623.

Preferably, the first and second biasing members 639, 641 are oppositely oriented torsion springs, each having two angled legs. The first torsion spring 639 is preferably mounted about the first pivot 631 of the intermediate member, with a first leg 639a contacting the mounting member 603 and a second leg 639b contacting the intermediate member 625. The second torsion spring 641 is preferably mounted about the pivot pin 629, with a first leg 641a of the second torsion spring 641 contacting detent 615 on the carrier 611 and a second leg 641b contacting the intermediate member 625.

The biasing mechanism 607 further comprises two link arms 635 each having a first end 635a pivotable about the pivot 626, 627 between the carrier 611 and the intermediate member 625 at pivot pin 629. The first ends 635a of the link arms comprise apertures for receiving the pin 629. The two link arms 635 each have a second end 635b pivotally and slidably mounted in a slot 637 on the mounting member 603. The slot 637 is preferably perpendicular to the pivot 631 between the intermediate member 625 and the mounting member 603, such that the second ends 635b of the link arms 635 can move towards or away from the pivot axis 631 as the intermediate member 625 pivots relative to the mounting member 603. The link arms 635 limit movement of the intermediate member away from the mounting member due to the preload. In an alternative embodiment, the link arm second ends 635b may be pivotally attached to the mounting member 603 and slidable relative to the intermediate member 625.

The biasing mechanism 607 resists rearward movement of the lumbar support member 605 as a user leans into the back portion 501, 501' of the chair. Upon application of rearward force to the lumbar support member 605, the biasing mechanism 607 resists rearward movement of the detent 615 toward the mounting member 603 more than it resists rearward movement of the carrier 611 toward the mounting member 603. The second biasing member 641 acting on the detent 615 biases the detent into engagement with the notches 623 and causes the engagement between the detent and an engaged notch to increase upon rearward movement of the lumbar support 605.

Figure 78A:
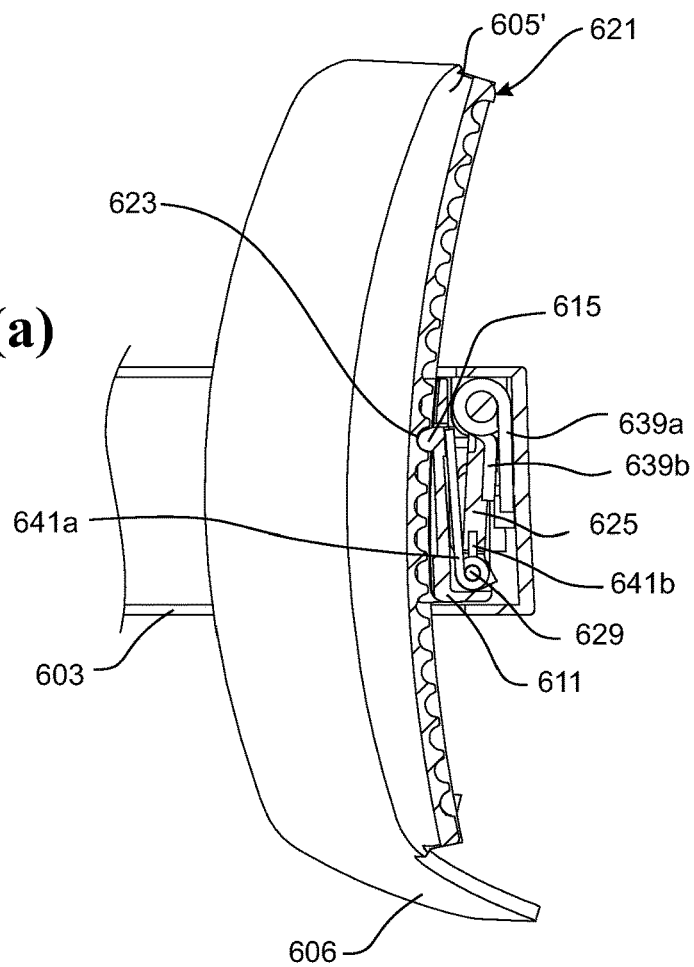
FIG. 78(a) is a section view corresponding to FIG. 77(a) but with the lumbar support panel moved rearward upon application of a rearward force by a chair occupant, compressing the biasing mechanism.
Figure 78B:
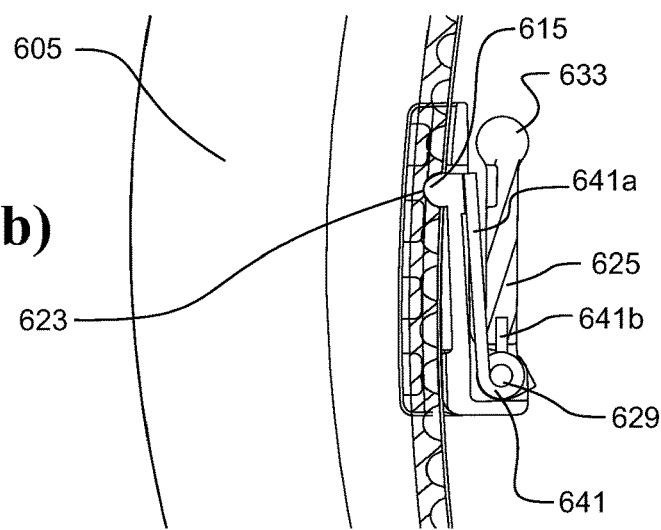
FIG. 78(b) is a detail view of part of FIG. 78(a)

The section views of FIGS. 78(*a*) and 78(*b*) show the support member in a rearward position, with the detent 615 biased further into engagement with a notch 623. The increased engagement means more force is required to slide the lumbar support member 605 relative to the carrier 611 when rearward force is applied to the support member 605. This ensures the lumbar support member 605 is less likely to inadvertently move relative to the carrier 611 while a rearward force is being applied to the lumbar support member 605 such as during support of the lumbar region of a user in the chair. This is particularly useful with a highly compliant back portion 501, 501', where an occupant can readily 'sink in' to the back portion and could inadvertently apply a downward force to the lumbar support member 605 as well as a rearward force.

In addition to resisting rearward movement, the biasing mechanism 607 described above and shown in the accompanying drawings enables the lumbar support member 605 to tilt relative to the mounting member 603. In an alternative embodiment of the lumbar support assembly, the biasing mechanism may bias the detent away from the mounting member 603 without enabling the lumbar support member 605 to be tilted. For example, the carrier 611 may be movable or slidable horizontally towards the mounting member 603, but not angularly tiltable. In such an embodiment, the biasing mechanism may comprise a biasing device such as a spring arranged directly between the mounting member 603 and the detent 615 or other engagement feature on the carrier 611. A feature 636 (FIG. 72) on the mounting member 603 limits rearward motion of the biasing mechanism 607 by stopping the intermediate member 625.

In the embodiment shown, the first and second pivots 631, 629 of the intermediate support member 625 are substantially horizontal to allow the support to tilt up and down to conform to the angle of a user's back as they move in the chair. In an alternative embodiment, the pivot axes may instead be substantially vertical, for example, to enable the lumbar support member 605 to tilt sideways to conform to the back of a user twisting in the chair.

Figure 80:
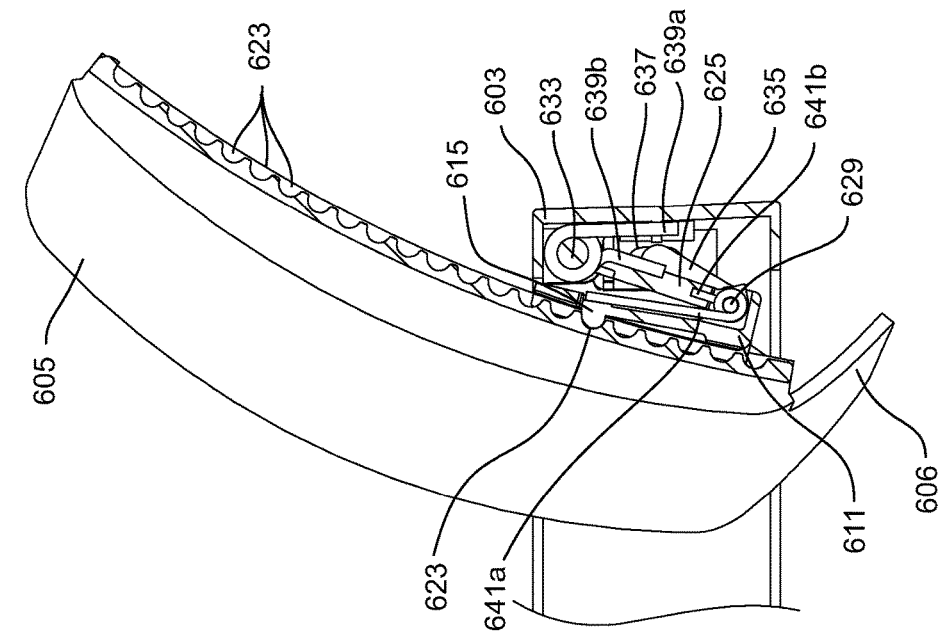
FIG. 80 is a section view corresponding to FIG. 79 but with the lumbar support panel tilted upwards.
Figure 79:
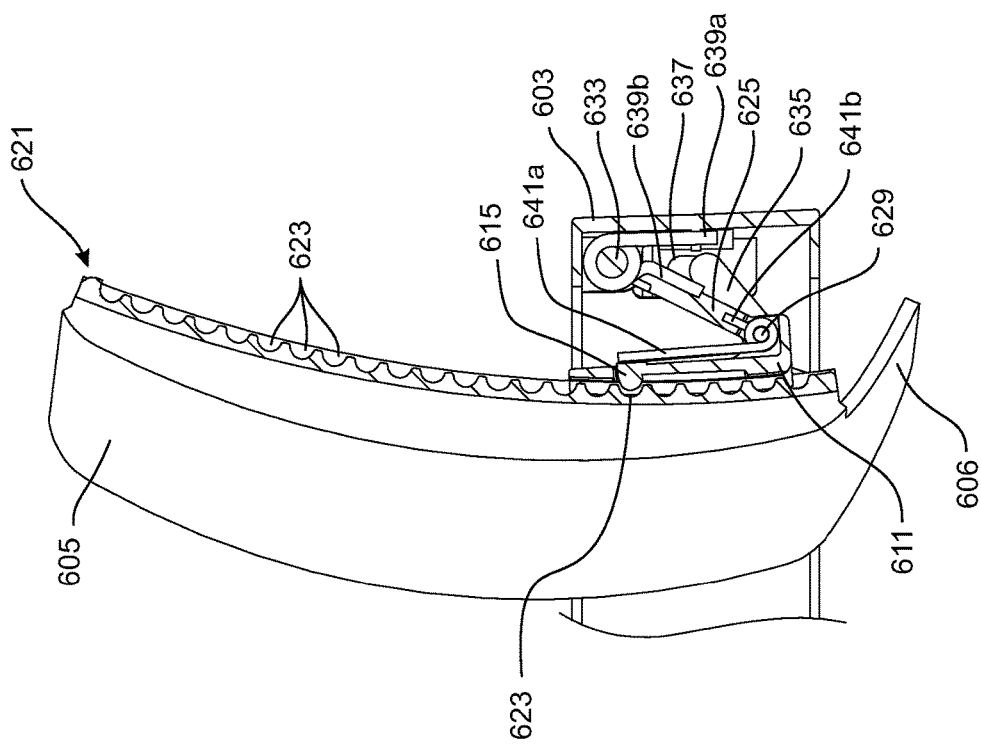
FIG. 79 is a section view corresponding to FIG. 77(a) but with the lumbar support panel adjusted to a higher position.
Figure 82:
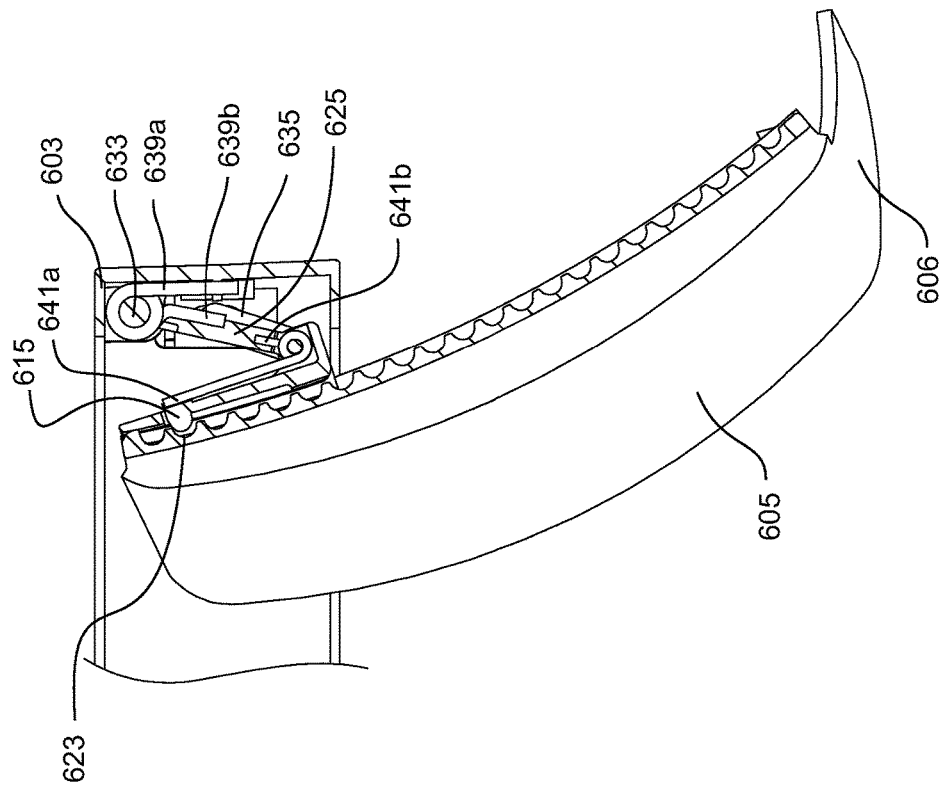
FIG. 82 is a section view corresponding to FIG. 81 but with the lumbar support panel tilted downwards.
Figure 81:
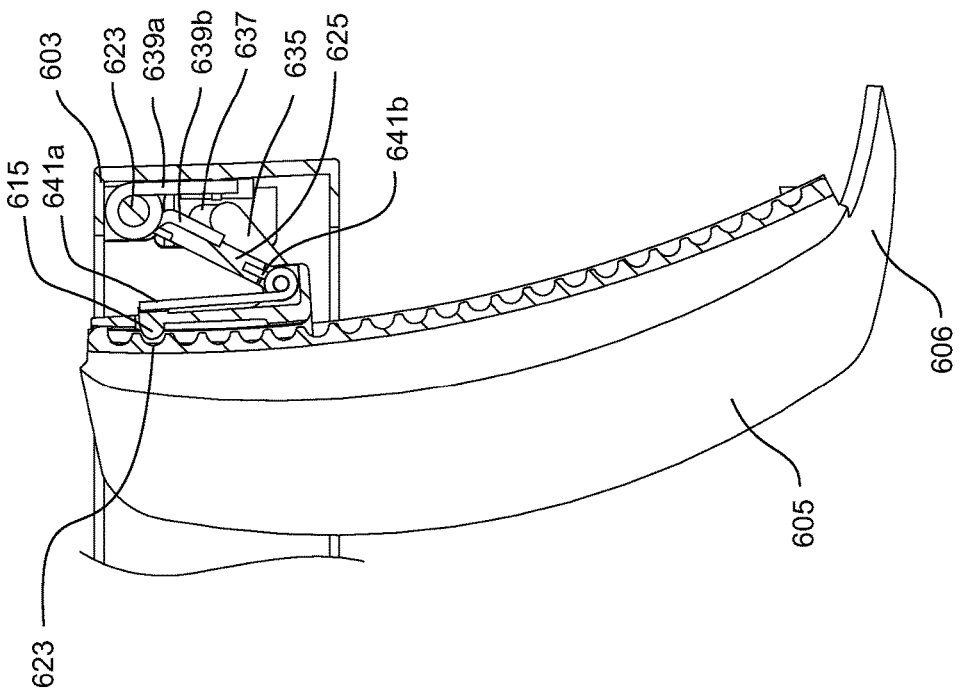
FIG. 81 is a section view corresponding to FIG. 77(a) but with the lumbar support panel adjusted to a lower position.

FIG. 79 shows the lumbar support member 605 adjusted to a high vertical and biased forward position with no rearward load applied to the lumbar support member 605. FIG. 80 shows the lumbar support member 605 in that arrangement tilted upwards upon application of a rearward force to a central or upper portion of the lumbar support member. It can be seen that the detent is biased further into engagement with a notch 623 when the upper end of the lumbar support member 605 is tilted rearward. FIG. 81 shows the lumbar support member 605 adjusted to a low vertical and biased forward position with no rearward load applied to the lumbar support member 605. FIG. 82 shows the lumbar support member 605 in that arrangement tilted downwards upon application of a rearward force to a central or lower portion of the lumbar support member.

The shape of a preferred form lumbar support member 605 can be seen in plan view in FIG. 74 and section views in FIGS. 76 to 82. The lumbar support member 605 is forwardly concave in horizontal section, to curve around the back of a user, and forwardly convex in vertical section to accommodate rearward curvature of a user's back. An elongate substantially vertical recess 605' is provided in a central region of the lumbar support member 605, to provide clearance for a user's spine.

The mounting member 603 positions the lumbar support member 605 behind a rear part 551 of the user support surface of the back portion 501, 501'. In the absence of a rearward load on the back portion 501, 501' of the chair, the lumbar support member 605 is spaced behind and out of contact with the rear part 551 of the user support surface back portion 501, 501'. The spacing is sufficiently small that upon application of a rearward force to the user support surface when a user leans into the back portion 501, 501', at least a part 551 of the back portion flexes rearward relative to the back frame 503 to contact the lumbar support member 605. The lumbar support member 605 provides support to the lumbar region of the user's back by providing additional resistance to rearward movement in the lumbar region.

In the form shown, the mounting member 603 is a rigid beam and is preferably curved, but alternatively may be u-shaped, for example. The ends of the mounting member 603 attach to the side members 504*a* of the back frame 503 so that the mounting member 603 extends rearwardly from the frame. In the embodiment shown, the mounting member 603 comprises two attachment mechanisms 609 at each end for attaching the mounting member to the frame side members 504*a*.

Figure 72:
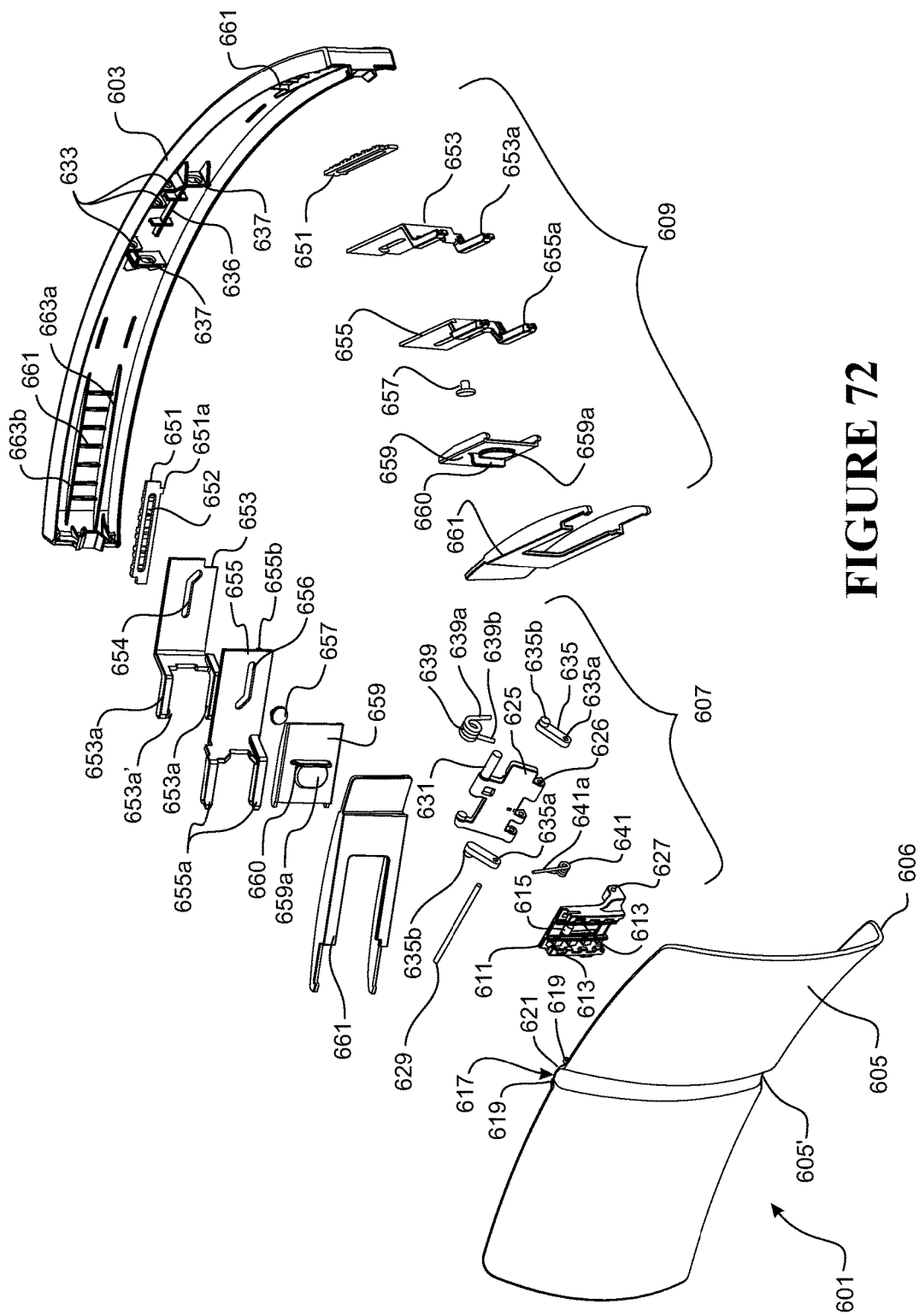
FIG. 72 is an exploded perspective view of the lumbar support assembly of FIG. 71.
Figure 83:
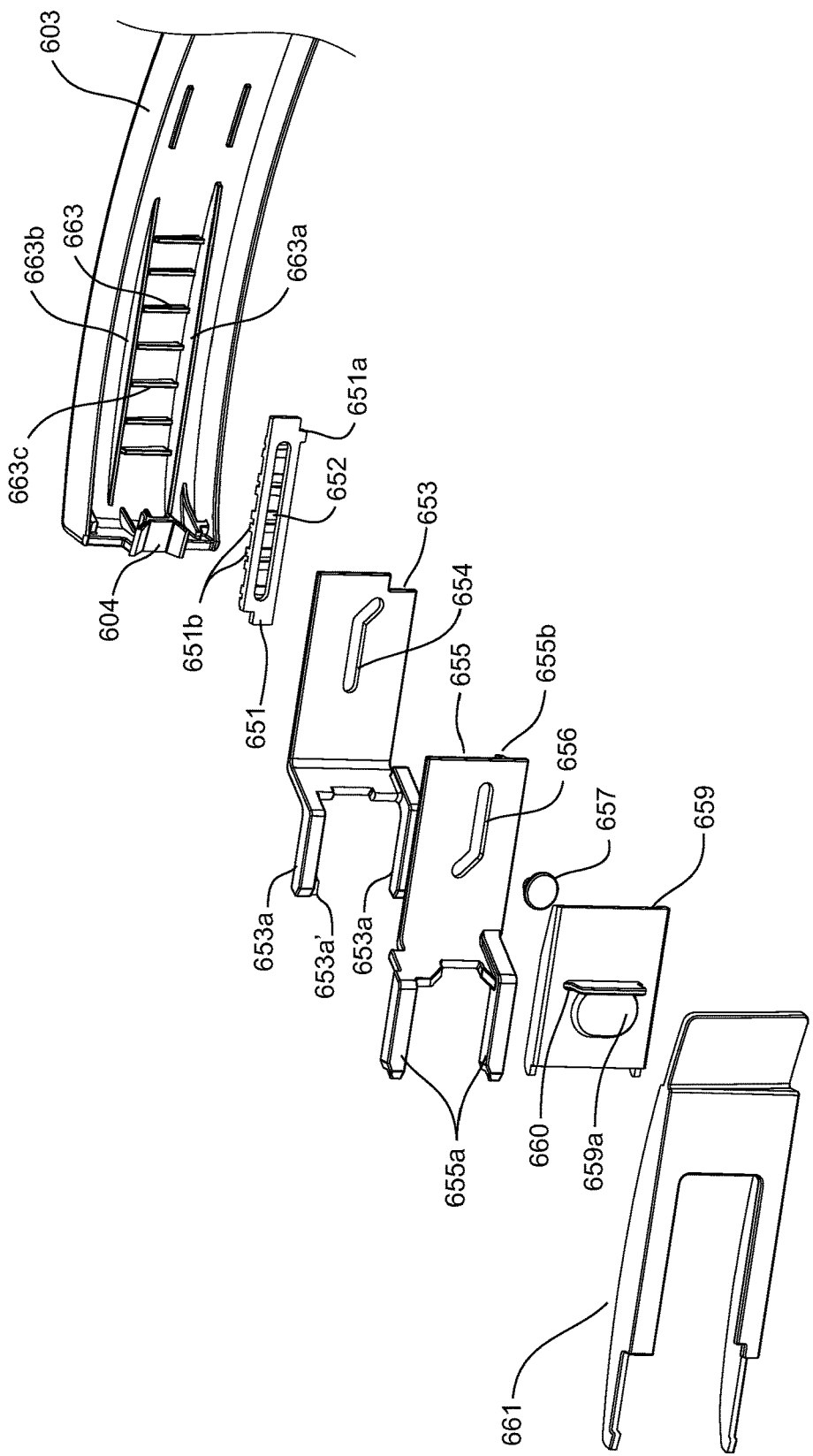
FIG. 83 is an exploded view of components of a preferred form attachment mechanism of the lumbar support assembly of FIGS. 71 to 82.

Components of the preferred form attachment mechanisms 609 are shown in the exploded view of FIG. 72, and in more detail in FIG. 83. The method of using one of the attachment mechanisms 609 is shown in FIGS. 84(*a*) to 84(*c*). Each attachment mechanism 609 comprises a lock shuttle 651, a first lock member 653 with lock hook(s) 653*a* having lock projections 653*a'*, a second lock member 655 with lock pin(s) 655*a*, a guide pin 657, a lock slider 659, and a lock retainer cover 661. The first lock member 653 could have one, two, three, or more lock hooks, with the second lock member 655 having a corresponding number of lock pins 655*a*. A lock mechanism channel 663 with lower and upper horizontal guide ribs 663*a*, 663*b* is provided in the front face of the mounting member 603 toward each end of the mounting member.

The lock mechanisms 609 are selectively moveable between a retracted unlocked position in which they do not project significantly, or at all, beyond the ends of the mounting member 603, and a projecting locking position where they project beyond the ends of the mounting member 603 to attach the mounting member 603 to the frame side members 504*a*. The lock slider 659 is provided with a suitable region for grasping, such as a forwardly directed projection 660 for example, to enable a user to actuate the locking mechanism.

In the assembled mounting member/locking mechanism, the lock shuttle 651 is positioned in the lock mechanism channel 663. The lock shuttle 651 is slidable vertically between the lower and upper horizontal guide ribs 663*a*, 663*b*, but is not slidable horizontally. The lock shuttle has rearward channels 651*b* that engage with vertical ribs 663*c* in the channel to enable the vertical sliding movement of the shuttle.

The first lock member 653 is positioned in front of the shuttle, with its lock hook(s) 653*a* directed toward the end of the mounting member 603. The second lock member 655 is positioned in front of the first lock member, with its lock pin(s) 655*a* directed toward the end of the mounting member. A protrusion 655*b* on the second lock member 655 is positioned inwardly along the beam from a protrusion 651*a* on the shuttle, to act as an inhibitor to outward movement of the second lock member 655. The guide pin 657 extends through the aligned slots in the second lock member, first lock member, and lock shuttle. The lock slider 659 is positioned in front of the second lock member, and has rearwardly projecting walls that surround the first lock member and second lock member. The head of the guide pin 657 is positioned in a cavity 659a in the lock slider 659, which is preferably vertically elongate to enable vertical movement of the guide pin 657 relative to the lock slider.

The lock retainer cover 661 is positioned in front of the lock slider 659, and has walls that generally surround the other components of the locking mechanism. The lock retainer cover 661 is fixed to the mounting member 603 via any suitable means, such as clips, adhesive, and/or ultrasonic welding for example. The lock retainer cover keeps the lock mechanism assembled with the mounting member 603.

The assembly at each end of the mounting member 603 will be substantially the same, with the components being mirror images of each other.

It can be seen that the lock shuttle 651 has a substantially linear and substantially horizontal channel 652. The first lock member 653 has a channel 654 that has an inner angled portion to initially extend outwardly and upwardly from its innermost end, and then has a substantially linear and substantially horizontal portion. The second lock member 655 has a channel 656 that initially extends substantially linearly and substantially horizontally outwardly from its innermost end, and then has an outer angled portion that extends outwardly and upwardly. The guide pin 657 extends through the channels 652, 654, 656 as discussed above.

Figure 84A:
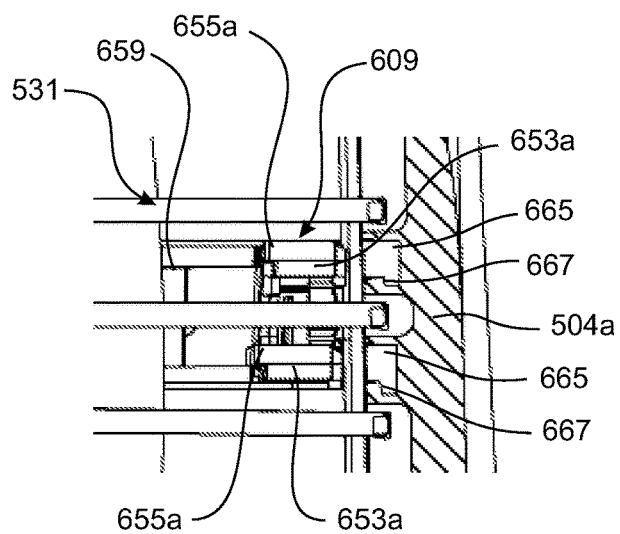
FIG. 84(a) is a front partial section view showing a first stage of attachment of the lumbar support assembly of FIGS. 71 to 83 to the back frame of the chair.
Figure 84B:
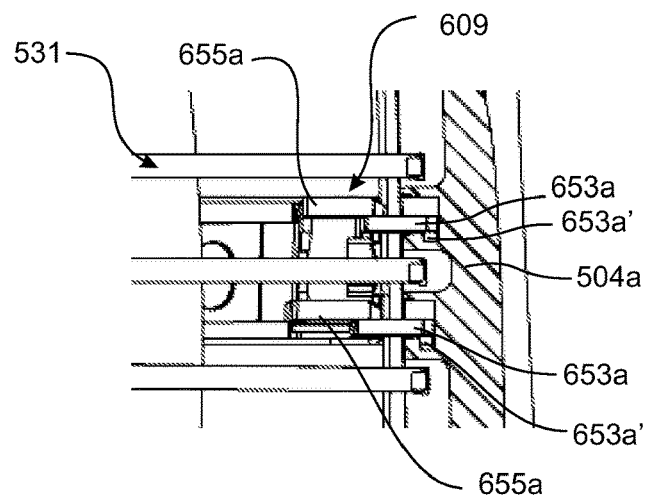
FIG. 84(b) is a front partial section view similar to FIG. 84(a) but showing a second stage of attachment of the lumbar support assembly to the back frame of the chair.
Figure 84C:
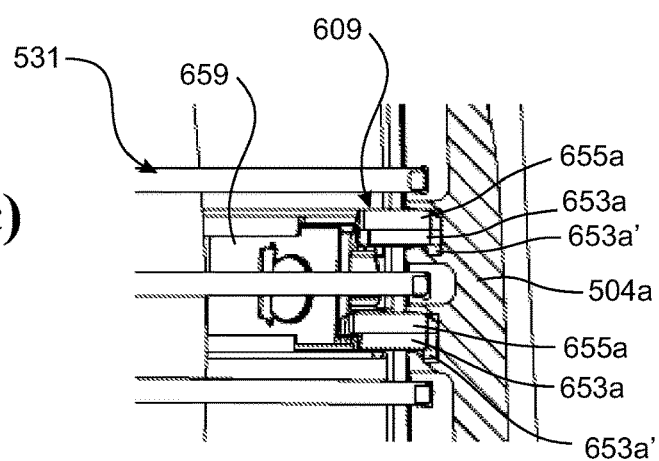
FIG. 84(c) is a front partial section view similar to FIG. 84(a) but showing a final stage of attachment of the lumbar support assembly to the back frame of the chair.

To attach the mounting member 603 to the frame side members 504a, the mounting member 603 is placed behind the back support 531 and generally aligned with locking apertures or recesses 665 in the frame side members 504a. The ends of the mounting member 603 are provided with locator features 604 to locate the ends of the mounting member in a desired position relative to one of the transverse straps 553. The recesses 665 are provided with engagement shoulders 667. The lock sliders 659 are initially in their innermost positions so that the lock mechanisms 609 are in their retracted unlocked positions as shown in FIG. 84(a). The lock shuttle 651 will be in its lowest vertical position in the lock mechanism channel 663 in the mounting member 603.

During initial outward movement of the lock sliders 659, the guide pins 657 are located in the inner angled portions of the slots 654 of first lock members 653 and slide along the horizontal portions of the slots 656 of the second lock members. The first lock members 653 move outwardly so that their lock hooks 653a are positioned in the recesses 665. The engagement of the protrusion 651a on the shuttle with the protrusion 655b on the second lock member will inhibit or prevent outward movement of the second lock member 655 during initial outward movement of the first lock member 653. There is sufficient clearance between the lock hooks 653a and the entrances to the recesses 665 that the lock hooks 653a can be clear of the engagement shoulders 667, but then manually moved down into position behind the shoulders to the position shown in FIG. 84(b).

Further outward movement of the lock sliders 659 causes the guide pins 657 to be located in the angled outer portions of the slots 656 in the second lock members 655, and to slide along the linear horizontal portion of the slots 654 in the first lock members 653. As the guide pin 657 is lifted in the slots 654, 656, the guide pin also lifts the shuttle 651 in the lock mechanism channel 663, so that the protrusions 651a, 655b are disengaged and the second lock member can move outwardly. The vertically slidable shuttles 651 also assist with avoiding binding of the guide pins 657 in the slots. The lock pins 655a extend beside the the lock hooks 653a, to the position shown in FIG. 84(c). The lock projections 653a' are positioned outwardly of the engagement shoulders 667. There is insufficient clearance between the lock pins 655a and lock hooks 653a and the entrances to the recesses 665, for the lock projections 653a' to move sufficiently to clear the engagement shoulders 667. The mounting member 603 is thereby attached to the back frame.

To remove the mounting member 603 from the frame, the process is reversed. In particular, the user will move the lock sliders 659 inwardly which will initially retract the second lock members 655 so that the lock pins 655a move away from the lock hooks 653a. The mounting member 603 can then be moved vertically so that the lock projections 653a' can clear the engagement shoulders 667. Further inward movement of the lock sliders 659 will cause the lock hooks 653a to retract from the recesses 665 so that the mounting member 603 can be removed from the frame.

It will be appreciated that the mechanism could readily be inverted, so that the lock hooks 653a are upper members with upwardly directed lock projections 653a', and the lock pins 655a engage the undersides of the lock hooks 653a.

The lumbar support assembly is retrofittable to the back portion 501, 501' by an end user, and is preferably able to be removed from the back portion by the end user.

Rather than using the attachment mechanism described above, alternatively the mounting member 603 could be mounted to the frame side members 504a using clips. The clips may be u-shaped clips that wrap around the front side of the frame 503. To attach the mounting member 603 to the back frame, the mounting member is arranged behind the rear part 551 of the user support surface of the back portion, with the attachment clips in front of the frame and aligned with the side frame members. The mounting member 603 is then pulled rearward relative to the frame until the attachment clips snap into engagement with the frame. Suitable apertures would be provided in the side frame members 504a for receipt of the clips.

In alternative embodiments, the mounting member 603 may be attached to the back frame 503 using other attachment methods. For example, the mounting member 603 may be attached to the frame using fasteners such as screws, adhesive, or welded to the frame. Alternatively, the mounting member 603 and the back frame 503 may be integral. Preferably the mounting member 603 is fixed relative to the side members 504a, but alternatively the mounting member 603 may be adjustable relative to the frame.

Rather than a lumbar support assembly as described above, embodiments of the support assembly could be used to support other portions of the back or body from a back portion of a chair, for example as a head or neck support assembly positioned on a higher region of the back portion 501'.

The above describes preferred forms of the present invention, and modifications can be made thereto without departing from the scope of the present invention. For example, the preferred form features are described and shown with reference to a reclining office chair. However, it will be appreciated that many of the features can readily be incorporated into different types of chairs, such as meeting chairs, vehicle chairs, or theatre chairs for example. The supporting frame could be modified accordingly, so as to be fixed to the ground or a wall panel for example for a theatre chair.

Additionally, a number of the features described herein can be incorporated into chairs having different features. They need not all be incorporated into the same chair.

Other example modifications are listed in the 'Summary of the Invention' section.

The invention claimed is:

1. An injection moulded article suitable for strain orientation, the article comprising:
   a plurality of first elongate moulded straps formed in a first layer, wherein the first elongate moulded straps have a length, a first face, an opposite second face, and two sides, wherein the first face, the opposite second face, and the sides extend along at least a substantial part of the length of the first elongate moulded straps;
   a plurality of second elongate moulded straps formed in a second layer, so that at least some of the first elongate moulded straps overlap with at least some of the second elongate moulded straps, wherein the second elongate moulded straps have a length, a first face, an opposite second face, and two sides, wherein the first face, the opposite second face, and the sides extend along at least a substantial part of the length of the second elongate moulded straps, and wherein the first faces of said at least some of the first elongate moulded straps face the second faces of said at least some of the second elongate moulded straps in regions in which the first elongate moulded straps and the second elongate moulded straps overlap; and
   a plurality of moulded joiner members that are integrally injection moulded with the first elongate moulded straps and with the second elongate moulded straps, and that extend from and connect between the first faces of the first elongate moulded straps and the second faces of the second elongate moulded straps in the regions in which the first elongate moulded straps and the second elongate moulded straps overlap, wherein the plurality of first elongate moulded straps, the plurality of second elongate moulded straps, and the plurality of moulded joiner members form an integral continuous unitary structure as opposed to a structure formed by separate members that are connected together;
   wherein one of the layers of straps overlies the other of the layers of straps, and wherein the plurality of moulded joiner members form a gap between the first elongate moulded straps and the second elongate moulded straps in the regions in which the first elongate moulded straps and the second elongate moulded straps overlap;
   and wherein the first elongate moulded straps comprise necked regions adjacent the joiner members, to compensate for a reduction in strain orientation due to the additional material of the joiner members, wherein the necked regions are formed by notches or recesses extending into the sides of the first elongate moulded straps, wherein the notches or recesses are configured such that post-strain orientation, the sides of the first elongate moulded straps are substantially parallel along substantially their entire lengths.

2. The injection moulded article according to claim 1, wherein at least a portion of the first elongate moulded straps, at least a portion of the second elongate moulded straps, and at least a portion of the joiner members are suitable for strain orientation.

3. The injection moulded article according to claim 2, wherein the second elongate moulded straps comprise necked regions adjacent the joiner members, to compensate for a reduction in strain orientation due to the additional material of the joiner members.

4. The injection moulded article according to claim 3, wherein the necked regions are formed by notches or recesses extending into the sides of the second elongate moulded straps.

5. The injection moulded article according to claim 4, wherein the notches or recesses are configured such that post-strain orientation, the sides of the second elongate moulded straps are substantially parallel along substantially their entire lengths.

6. The injection moulded article according to claim 1, wherein the second elongate moulded straps comprise generally longitudinally extending straps, and wherein the first elongate moulded straps comprise generally transversely extending straps.

7. The injection moulded article according to claim 1, wherein the injection moulded article is substantially flat.

8. The injection moulded article according to claim 1, wherein the injection moulded article is moulded from a resin comprising a thermoplastic polyester elastomer, and wherein the resin is selected such that the injection moulded article has a hardness in the range of about 30D to 55D when tested in accordance with ASTM D2240.

9. The injection moulded article according to claim 1, wherein at least part of the article is capable of being stretched to at least about 400% of an initial dimension without failure, such that strain orientation occurs.

10. The injection moulded article according to claim 1, wherein the plurality of first elongate moulded straps, the plurality of second elongate moulded straps, and the plurality of moulded joiner members are injection moulded together to form the integral continuous unitary structure.

11. A method of assembling a support, comprising:
    providing a frame;
    providing an injection moulded article according to claim 1, wherein at least part of the injection moulded article has an as-moulded dimension less than a corresponding dimension of the frame;
    stretching said at least part of the injection moulded article so as to have a stretched dimension greater than the corresponding dimension of the frame and such that strain orientation of at least a portion of the first elongate moulded straps and at least a portion of the second elongate moulded straps occurs;
    relaxing said at least part of the article so as to have a post-relaxation dimension between the as-moulded dimension and the stretched dimension;
    and supporting the article from the frame.

12. The method according to claim 11, wherein the frame comprises an opening that is at least partly bounded by frame members, and the method comprises supporting the article from the frame with part of the article extending across the opening, to form a compliant suspended support surface.

13. The method according to claim 11, wherein the second elongate moulded straps comprise generally longitudinally extending straps, and wherein the first elongate moulded straps comprise generally transversely extending straps.

14. The method according to claim 13, comprising stretching and relaxing the generally longitudinally extending straps before stretching and relaxing the generally transversely extending straps, or comprising stretching and relaxing the generally transversely extending straps before stretching and relaxing the generally longitudinally extending straps.

15. The method according to claim 13, comprising stretching and relaxing the generally transversely extending straps concurrently with stretching and relaxing the generally longitudinally extending straps.

16. The method according to claim 11, wherein the step of stretching at least part of the article results in stretching of the joiner members such that strain orientation of the joiner members occurs.

17. The method according to claim 16, wherein the joiner members are strain oriented in both a longitudinal direction and a transverse direction.

18. The method according to claim 1, wherein the second elongate moulded straps comprise necked regions adjacent the joiner members to compensate for a reduction in strain orientation due to the additional material of the joiner members.

19. The method according to claim 11, wherein the necked regions are formed by notches or recesses extending into sides of the second elongate moulded straps in the relaxed article adjacent the joiner members, and wherein the sides of the second elongate moulded straps are substantially parallel along substantially their entire lengths.

20. The method of assembling a back portion for a chair or a seat portion of a chair, the method being as claimed in claim 11.

21. An injection moulded article suitable for strain orientation, the article comprising:
a plurality of first elongate moulded straps formed in a first layer, wherein the first elongate moulded straps have a length, a first face, an opposite second face, and two sides, wherein the first face, the opposite second face, and the sides extend along at least a substantial part of the length of the first elongate moulded straps;
a plurality of second elongate moulded straps formed in a second layer, so that at least some of the first elongate moulded straps overlap with at least some of the second elongate moulded straps, wherein the second elongate moulded straps have a length, a first face, an opposite second face, and two sides, wherein the first face, the opposite second face, and the sides extend along at least a substantial part of the length of the second elongate moulded straps, and wherein the first faces of said at least some of the first elongate moulded straps face the second faces of said at least some of the second elongate moulded straps in regions in which the first elongate moulded straps and the second elongate moulded straps overlap; and
a plurality of moulded joiner members that are integrally injection moulded with the first elongate moulded straps and with the second elongate moulded straps, and that extend from and connect between the first faces of the first elongate moulded straps and the second faces of the second elongate moulded straps in the regions in which the first elongate moulded straps and the second elongate moulded straps overlap, wherein the plurality of first elongate moulded straps, the plurality of second elongate moulded straps, and the plurality of moulded joiner members form an integral continuous unitary structure as opposed to a structure formed by separate members that are connected together,
wherein the joiner members have dimensions that are smaller than a distance between the sides of the first elongate moulded straps and are located within bounds defined by the sides of the first elongate moulded straps so that the joiner members are not visible when the article is viewed in an orthogonal direction toward the second faces of the first elongate moulded straps wherein one of the layers of straps overlies the other of the layers of straps, and wherein the plurality of moulded joiner members form a gap between the first elongate moulded straps and the second elongate moulded straps in the regions in which the first elongate moulded straps and the second elongate moulded straps overlap, and wherein the first elongate moulded straps comprise necked regions adjacent the joiner members, to compensate for a reduction in strain orientation due to the additional material of the joiner members, wherein the necked regions are formed by notches or recesses extending into the sides of the first elongate moulded straps, wherein the notches or recesses are configured such that post-strain orientation, the sides of the first elongate moulded straps are substantially parallel along substantially theft entire lengths.

22. The injection moulded article according to claim 21, wherein the article is a back support for mounting to a back frame of a chair, and wherein said joiner members are not visible when viewed in an orthogonal direction toward a rear surface of the article.

\* \* \* \* \*